US012624289B2

(12) United States Patent
Manabe et al.

(10) Patent No.: US 12,624,289 B2
(45) Date of Patent: May 12, 2026

(54) LIQUID-CRYSTALLINE MEDIUM

(71) Applicant: MERCK PATENT GMBH, Darmstadt (DE)

(72) Inventors: Atsutaka Manabe, Darmstadt (DE); Rocco Fortte, Darmstadt (DE); Harald Hirschmann, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 18/133,098

(22) Filed: Apr. 11, 2023

(65) Prior Publication Data

US 2023/0323207 A1 Oct. 12, 2023

(30) Foreign Application Priority Data

Apr. 12, 2022 (EP) .................................... 22167885

(51) Int. Cl.
*C09K 19/30* (2006.01)
*C09K 19/04* (2006.01)
*C09K 19/54* (2006.01)

(52) U.S. Cl.
CPC ...... *C09K 19/3098* (2013.01); *C09K 19/3003* (2013.01); *C09K 19/542* (2013.01); *C09K 2019/0414* (2013.01); *C09K 2019/3009* (2013.01); *C09K 2019/301* (2013.01); *C09K 2019/548* (2013.01)

(58) Field of Classification Search
CPC ...................................................... C09K 19/30
See application file for complete search history.

(56) References Cited

U.S. PATENT DOCUMENTS

| | | | | |
|---|---|---|---|---|
| 8,871,952 | B2 | 10/2014 | Lietzau et al. | |
| 11,359,142 | B2 | 6/2022 | Manabe et al. | |
| 2018/0100104 | A1* | 4/2018 | Goebel .................. | C09K 19/42 |
| 2021/0139779 | A1 | 5/2021 | Manabe et al. | |

FOREIGN PATENT DOCUMENTS

| | | | | | |
|---|---|---|---|---|---|
| DE | 102010027099 | A1 | | 1/2012 | |
| EP | 3354710 | B1 | * | 12/2020 | ........... C07D 211/46 |
| EP | 3763802 | A1 | | 1/2021 | |
| EP | 3839009 | A1 | * | 6/2021 | ......... C09K 19/0403 |
| TW | 1724013 | B | * | 4/2021 | ............. C09K 19/46 |
| WO | 2010099853 | A1 | | 9/2010 | |
| WO | WO-2016146240 | A1 | * | 9/2016 | ......... C09K 19/3483 |
| WO | WO-2020002401 | A1 | * | 1/2020 | ......... C09K 19/3098 |

OTHER PUBLICATIONS

English Machine Translation of TW 1724013 B (Year: 2021).*

M.F. Schieckel and K. Fahrenschon, "Deformation of nematic liquid crystals with vertical orientation in electrical fields", Appl. Phys. Lett. 19 (1971), pp. 391-393; https://doi.org/10.1063/1.1653743.

J.F. Kahn; "Electric-Field-Induced Orientational Deformation of Nematic Liquid Crystals: Tunable Birefringence" (Appl. Phys. Lett. 20 (1972), pp. 1193; https://doi.org/10.1063/1.1654107.

G. Labrunie and J. Robert "Transient behavior of the electrically controlled birefringence in a nematic liquid crystal" (J. Appl. Phys. 44 (1973), pp. 4869 ; https://doi.org/10.1063/1.1662055.

J. Robert and F. Clerc "Liquid Crystal Matrices for TV and Colored Graphic Displays" (SID 80 Digest Techn. Papers (1980), pp. 30.

J. Duchene; "Multiplexed liquid crystal matrix displays" (Displays 7 (1986), pp. 3-11.

H. Schad; "Reflective-Type LC Matrix-Display for High Multiplexing Rates" (SID 82 Digest Techn. Papers (1982), pp. 244.

* cited by examiner

*Primary Examiner* — Chanceity N Robinson

(74) *Attorney, Agent, or Firm* — Csaba Henter; MILLEN, WHITE, ZELANO & BRANIGAN

(57) ABSTRACT

A liquid-crystal material (LC media) containing thiophene compounds which are stabilized by sterically hindered amines or amine derivatives (HALS, hindered amine light stabilizers), where the LC media contains one or more compounds of formula 13

13

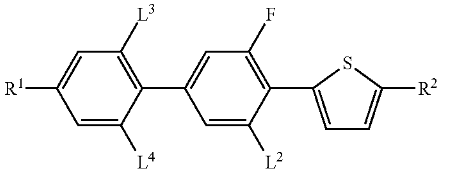

and one or more compounds of formula H

H

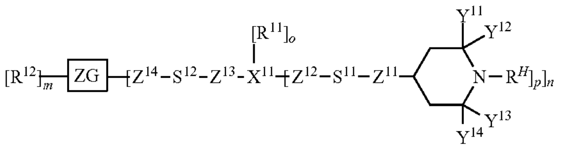

and liquid-crystal displays (LC displays) which contain these LC materials.

15 Claims, No Drawings

LIQUID-CRYSTALLINE MEDIUM

The present invention relates to a liquid-crystal material (LC media) comprising thiophene derivatives which are stabilised by sterically hindered amines or amine derivatives (HALS, hindered amine light stabilisers), and to liquid-crystal displays (LC displays) which contain these LC materials.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS (in-plane switching) cells.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$, and values for the dielectric anisotropy $\Delta\varepsilon$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the IPS or FFS effect.

TN, VA, IPS and FFS cells, in particular, are currently areas of application of commercial interest for the media according to the invention.

The liquid-crystal materials must have good chemical and thermal stability and good stability to electric fields and electromagnetic radiation. Furthermore, the liquid-crystal materials should have low viscosity and give rise to short addressing times, low threshold voltages and high contrast in the cells.

They should furthermore have a suitable mesophase, for example a nematic mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:

1. MOS (metal oxide semiconductor) or other diodes on silicon wafers as substrate.
2. Thin-film transistors (TFTs) on a glass plate as substrate.

The TFT matrix is applied to the inside of one glass plate of the display, while the other glass plate carries the transparent counter electrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulatormetal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff, Paris; STROMER, M., Proc. Eurodisplay 84, September 1984: Design of Thin Film Transistors for Matrix Addressing of Television Liquid Crystal Displays, pp. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The MLC displays from the prior art thus do not satisfy today's requirements.

For TV and video applications, MLC displays having short response times are required. Such short response times can be achieved, in particular, if liquid-crystal media having low values for the viscosity, in particular the rotational viscosity $\gamma_1$, are used. However, diluting additives generally lower the clearing point and thus reduce the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:

- extended nematic phase range (in particular down to low temperatures)
- ability to switch at extremely low temperatures (outdoor use, automobiles, avionics)
- increased resistance to UV radiation (longer life)
- low threshold voltage.

Using the media available from the prior art, backlight is not possible to achieve these advantages while simultaneously retaining the other parameters.

The prior art, for example the specifications WO 2010/099853 A1 and DE 10 2010 027 099 A1, discloses thiophene-containing LC media. WO 2010/099853 A1 discloses compounds containing a thiophene-2,5-diyl unit which is linked directly to a 2- and/or 6-substituted 1,4-phenylene unit.

The object on which WO 2010/099853 A1 was based was the development of novel materials for use in LC displays. This object was achieved by the provision of compounds of the general formula

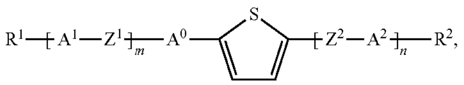

where $A^0$ denotes a 2,6-difluoro-1,4-phenylene unit, $A^1$ and $A^2$, besides other meanings, denote a 1,4-phenylene or 1,4-cyclohexylene unit, and $Z^1$ and $Z^2$ denote a bridging element or a single bond.

Specific examples described are, for example, the following compounds (see WO 2010/099853 A1):

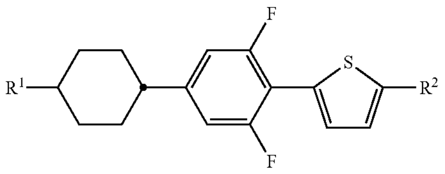

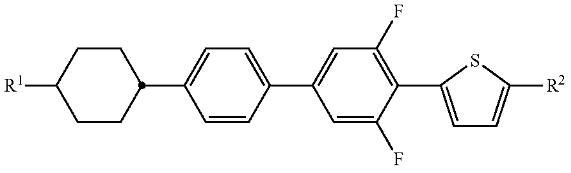

For many practical applications in liquid-crystal displays, the known liquid-crystalline media comprising thiophene compounds are not sufficiently stable. In particular, exposure to UV radiation, but also even irradiation with the usual backlighting, results in an impairment, in particular of the electrical properties. Thus, for example, the conductivity increases significantly.

DE 10 2010 027 099 A1 describes LC media which comprise the compounds disclosed in WO 2010/099853 and bithienyl derivatives of the formula

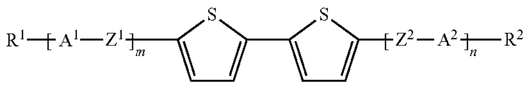

as stabiliser. These bithienyl derivatives are preferably employed here in combination with thiophene 1,1-dioxide derivatives of the formula

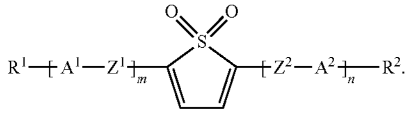

In both the above formulae, $A^1$ and $A^2$ denote, for example, 1,4-phenylene or 1,4-cyclohexylene and $Z^1$ and $Z^2$, besides other meanings, denote, for example, a single bond. Specific examples described are the following compounds (see DE 10 2010 027 099 A1):

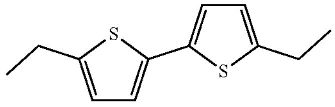

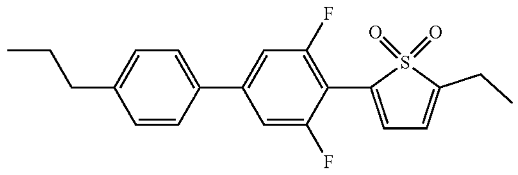

The use of so-called "hindered amine light stabilisers", HALS for short, has already been proposed for the stabilisation of liquid-crystal mixtures.

HALS with various substituents on the nitrogen atom are compared with respect to their pKB values in Ohkatsu, Y., *J. of Japan. Petroleum Institute,* 51, 2008, pages 191-204. The following types of structural formulae are disclosed there.

| Type | Active group of the stabiliser |
|---|---|
| "HALS" | 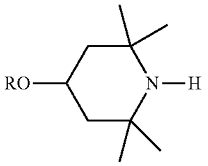 |
| "R-HALS" or "NR-HALS" | 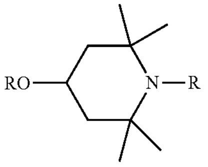 |

-continued

| Type | Active group of the stabiliser |
| --- | --- |
| "NOR-HALS" | 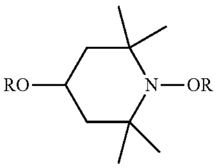 |

Nematic liquid-crystal mixtures having negative dielectric anisotropy which comprise a small amount of TINUVIN® 770 as stabilisers are also proposed, for example, in WO 2009/129911 A1. However, the corresponding liquid-crystal mixtures in some cases have inadequate properties for some practical applications. Inter alia, they sometimes do not have adequate stability against exposure to irradiation by typical CCFL (gold cathode fluorescent lamp) backlight or exhibit problems with the LTS (low-temperature stability).

The use of various stabilisers in liquid-crystalline media is described, for example, in JP (S)55-023169 (A), JP (H)05-117324 (A), WO 02/18515 A1 and JP (H) 09-291282 (A).

TINUVIN® 123, a compound of the formula

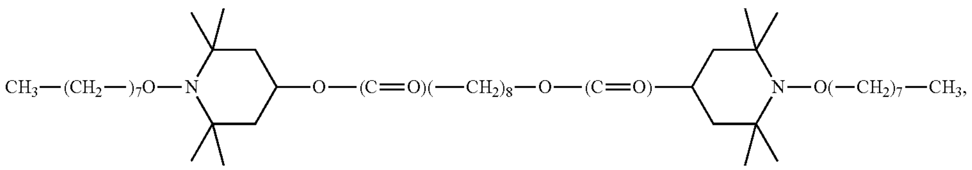

has also been proposed for stabilisation purposes.

Mesogenic compounds containing one or two HALS units are disclosed in EP 1 1784 442 A1.

EP 3 271 440 A1 discloses mesogenic compounds of the following formula

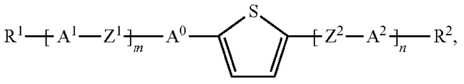

wherein $A^0$ i.a. denotes a 2,6-difluoro-1,4-phenylene unit, $A^1$ and $A^2$, besides other meanings, denote a 1,4-phenylene or 1,4-cyclohexylene unit, and $Z^1$ and $Z^2$ denote e.g. a bridging element or a single bond together with HALS stabilizers of the following formula

II

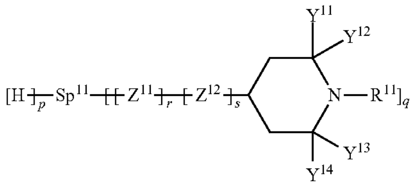

in which q i.a. denotes 1 or 2. However, even though the stabilization of thiophene compounds have been significantly improved as proven by a comparison of mixtures containing compounds of formula II with mixtures not containing such compounds, there is still a demand for a higher level of stabilization, in particular in terms of the VHR.

The complexity of the mechanisms of action and the fact that LC media are composed of up to ten or even more individual substances which are chemically different from one another result in the choice of a suitable light stabiliser being extremely difficult, even for the person skilled in the art, in view of the multiplicity of available materials.

The compound TEMPOL, of the following formula:

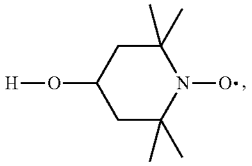

TEMPOL is known; it is mentioned, for example, in Miéville, P. et al., *Angew. Chem.* 2010, 122, pages 6318-6321. It is commercially available from various manufacturers and is employed, for example, as polymerisation inhibitor and, in particular in combination with UV absorbers, as light or UV protection in formulations for precursors of polyolefins, polystyrenes, polyamides, coatings and PVC.

DE 102011117937.6 describes liquid-crystal mixtures having negative dielectric anisotropy which comprise TINUVIN® 770, a compound of the formula

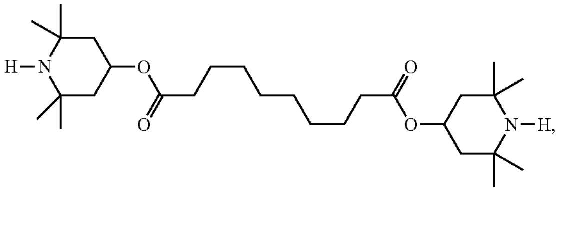

for stabilisation.

DE 102011119144.9 and PCT/EP2011/005692 describe liquid-crystal mixtures which comprise, inter alia, HALS N-oxides for stabilisation.

It was an object of the invention to provide media, in particular for TN, VA or IPS displays of this type, which have the desired properties indicated above and do not exhibit the disadvantages indicated above, or only do so to a lesser extent. In particular, the LC media should have fast response times and low rotational viscosities at the same time as high dielectric anisotropy and high birefringence. In addition, the LC media should have a high clearing point, a broad nematic phase range and a low threshold voltage.

A further object of the invention was to provide thiophene-containing LC media which do not exhibit the disadvantages mentioned above, or only do so to a small extent.

Surprisingly, it has been found that the objects indicated above can be achieved by using thiophene derivatives in combination with HALS in LC media, in particular in LC media in LC displays with active addressing, and in TN, VA, IPS or FFS displays. The combination of thiophene derivatives with HALS indicated below results in LC media having the desired properties indicated above.

On the basis of the prior art, the person skilled in the art would not have expected that the use of thiophene derivatives according to the invention in nematic LC media having an inherently untwisted phase, in particular in LC media having positive dielectric anisotropy, and in TN, VA, IPS or FFS displays, with addition of HALS as light stabilisers can result in an improvement in the properties, i.e. in particular in fast response times and low rotational viscosities at the same time as high dielectric anisotropy, high birefringence and high specific resistance with excellent light stability.

The present invention thus relates to an LC medium, characterised in that it comprises one or more compounds of the formula I

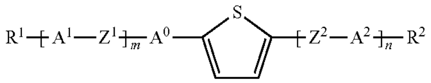

I in which the individual radicals have the following meanings:

$R^1$ and $R^2$ denote H, F, Cl, Br, —CN, —NCS or straight-chain or branched alkyl having 1 to 12 C atoms, in which, in addition, one or more $CH_2$ groups, including terminal C atoms, may each be replaced, independently of one another, by —CH═CH—, —C≡C—,

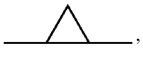,
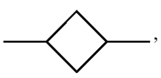,
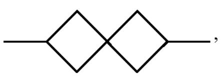,

-continued

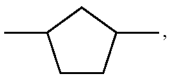,

—O—, —S—, —CO—, —CO—O—, —O—CO—, in such a way that O or S atoms are not linked directly to one another, and in which, in addition, one or more H atoms may be replaced by F or Cl, $A^0$, $A^1$ and $A^2$ each, independently of one another, denote phenylene-1,4-diyl, in which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl, in which, in addition, one or two non-adjacent $CH_2$ groups may be replaced, independently of one another, by O and/or S and one or more H atoms may be replaced by F, cyclohexene-1,4-diyl, bicyclo[1.1.1]pentane-1,3-diyl, bicyclo[2.2.2]octane-1,4-diyl, spiro[3.3]heptane-2,6-diyl, tetrahydropyran-2,5-diyl or 1,3-dioxane-2,5-diyl, where $A^0$ preferably denotes 2,6-difluoro-1,4-phenylene and $A^1$ preferably denotes 1,4-cyclohexylene, 1,4-phenylene, 2-fluoro-1,4-phenylene, particularly preferably 1,4-phenylene, $Z^1$ and $Z^2$ each, independently of one another, denote —$CF_2O$—, —$OCF_2$—, —$CH_2O$—, —$OCH_2$—, —CO—O—, —O—CO—, —$C_2H_4$—, —$C_2F_4$—, —$CF_2CH_2$—, —$CH_2CF_2$—, —CFHCFH—, —$CFHCH_2$—, —$CH_2CFH$—, —$CF_2CFH$—, —$CFHCF_2$—, —CH═CH—, —CF═CH—, —CH═CF—, —CF═CF—, —C≡C— or a single bond, and m and n each, independently of one another, denote 0, 1, 2 or 3, where m+n is preferably 1, 2 or 3, particularly preferably 1, and one or more compounds of the formula H

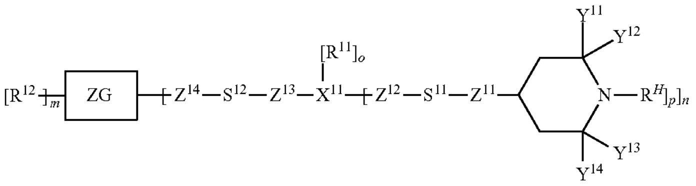

H in which $R^H$ denotes H, $O^-$, $CH_3$, OH or $OR^S$, preferably H or $O^-$;

$R^S$ denotes H, alkyl having 1 to 12 C atoms or alkenyl having 2 to 12 C atoms;

$R^{11}$ on each occurrence, independently of one another, denotes H, F, a straight-chain or branched alkyl chain having 1-20 C atoms, in which one —$CH_2$— group or, if present, a plurality of —$CH_2$— groups may be replaced by —O— or —C(═O)—, but two adjacent —$CH_2$— groups cannot be replaced by —O—, and one or, if present, a plurality of —$CH_2$— groups may be replaced by —CH═CH— or —C≡C—, and in which one H atom or a plurality of H atoms may be replaced by F, $OR^{13}$, $N(R^{13})(R^{14})$ or $R^{15}$, $R^{11}$ preferably denotes H or alkyl, particularly preferably alkyl, especially preferably n-alkyl and very particularly preferably n-butyl, $R^{12}$ on each occurrence, independently of one another, denotes a straight-chain or branched alkyl chain having 1-20 C atoms, in which one —$CH_2$— group or a plurality of —$CH_2$— groups may be replaced by —O— or —C(=O)—, but two adjacent —$CH_2$— groups cannot be replaced by —O—, a hydrocarbon radical which contains a cycloalkyl or alkylcycloalkyl unit and in which one —$CH_2$— group or a plurality of —$CH_2$— groups may be replaced by —O— or —C(=O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or an aromatic or heteroaromatic hydrocarbon radical, in which one H atom or a plurality of H atoms may be replaced by F, $OR^{13}$, $N(R^{13})(R^{14})$ or $R^{15}$, $R^{12}$ preferably denotes H, unbranched alkyl or branched alkyl, particularly preferably H or unbranched alkyl, $R^{13}$ on each occurrence, independently of one another, denotes a straight-chain or branched alkyl or acyl group having 1 to 10 C atoms, preferably n-alkyl, or an aromatic hydrocarbon or carboxylic acid radical having 6-12 C atoms, $R^{14}$ on each occurrence, independently of one another, denotes a straight-chain or branched alkyl or acyl group having 1 to 10 C atoms, preferably n-alkyl, or an aromatic hydrocarbon or carboxylic acid radical having 6-12 C atoms, $R^{15}$ on each occurrence, independently of one another, denotes a straight-chain or branched alkyl group having 1 to 10 C atoms, in which one —$CH_2$— group or a plurality of —$CH_2$— groups may be replaced by —O— or —C(=O)—, but two adjacent —$CH_2$— groups cannot be replaced by —O—, $S^{11}$ and $S^{12}$ on each occurrence, independently of one another, denote an alkylene group having 1 to 20 C atoms, which is branched or, preferably, straight-chain, preferably —($CH_2$—)$_n$ having 1-20 C atoms, preferably 1-10 C atoms, particularly preferably having 1 to 8 C atoms, in which one —$CH_2$— group or, if present, a plurality of —$CH_2$— groups may be replaced by —O— or —C(=O)—, but two adjacent —$CH_2$— groups cannot be replaced by —O—, and one or, if present, a plurality of —$CH_2$— groups may be replaced by —CH=CH— or —C≡C— and in which one H atom or a plurality of H atoms may be replaced by F, $OR^{13}$, $N(R^{13})(R^{14})$ or $R^{15}$, or denote a single bond, $X^{11}$ denotes C, $Y^{11}$ to $Y^{14}$ each, independently of one another, denote methyl or ethyl, particularly preferably all denote either methyl or ethyl and very particularly preferably methyl, $Z^{11}$ to $Z^{14}$ on each occurrence, independently of one another, denote —O—, —(C=O)—, —O—(C=O)—, —(C=O)—O—, —O—(C=O)—O—, —(N—$R^{13}$)—, —N—$R^{13}$—(C=O)— or a single bond if $S^{11}$ is a single bond, but both $Z^{11}$ and $Z^{12}$ do not simultaneously denote —O—, and, however, if $S^{12}$ is a single bond, both $Z^{13}$ and $Z^{14}$ do not simultaneously denote —O—, and, however, if —$X^{11}$[—$R^{11}$]$_o$— is a single bond, both $Z^{12}$ and $Z^{13}$ are not simultaneously —O—, $Z^{11}$ preferably denotes —O—, $Z^{13}$ preferably denotes a single bond, n*p denotes an integer from 3 to 10, preferably to 8, p denotes 1 or 2, o denotes (3-p), in the case where p=1, n denotes 3, 4, 5, 6 or 8, particularly preferably 4, 6 or 8, very particularly preferably 4 or 6, and m denotes (10-n), and In the case where p=2, n denotes an integer from 2 to 4, preferably 2 or 3, particularly preferably 3, and m denotes (4-n),

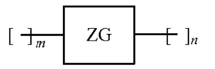

denotes an organic radical having (m+n) bonding sites, preferably having up to 4 bonding sites, preferably an alkanediyl, alkanetriyl or alkanetetrayl unit having 1 to 30 C atoms, in which, in addition to the m groups $R^{12}$ present in the molecule, but independently thereof, a further H atom may be replaced by $R^{12}$ or a plurality of further H atoms may be replaced by $R^{12}$, preferably an alkanetetrayl unit having one or two valences on each of the terminal C atoms, in which one —$CH_2$— group or a plurality of —$CH_2$— groups may be replaced by —O— or —(C=O)— in such a way that two O atoms are not bonded directly to one another, or a substituted or unsubstituted aromatic or heteroaromatic hydrocarbon radical having up to 10 valences, in which, in addition to the m groups $R^{12}$ present in the molecule, but independently thereof, a further H atom may be replaced by $R^{12}$ or a plurality of further H atoms may be replaced by $R^{12}$, and, in the case where p=1, —$X^{11}$[—$R^{11}$]$_o$— may alternatively also denote a single bond.

The invention furthermore relates to the use of the medium according to the invention in electro-optical devices, in particular in LC displays.

The invention furthermore relates to an LC display containing an LC medium according to the invention, in particular a TN, VA, IPS or FFS display.

Preference is given to media comprising the compounds of the formula I in which $A^0$ denotes phenylene-1,4-diyl, in which, in addition, one or two CH groups may be replaced by N and one or more H atoms may be replaced by halogen, CN, $CH_3$, $CHF_2$, $CH_2F$, $OCH_3$, $OCHF_2$, $CF_3$ or $OCF_3$, particularly preferably in which $A^0$ denotes

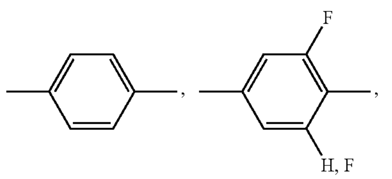

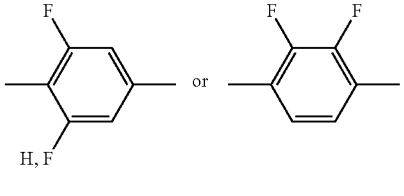

and very particularly preferably in which $A^0$ denotes

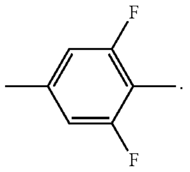

The preferred compounds of the formula I result in media having a particularly high clearing point, low rotational viscosity, a broad nematic phase, high birefringence and good stability.

In another preferred embodiment, one or more of $R^0$, $R^1$, or $R^2$ are selected from the group consisting of

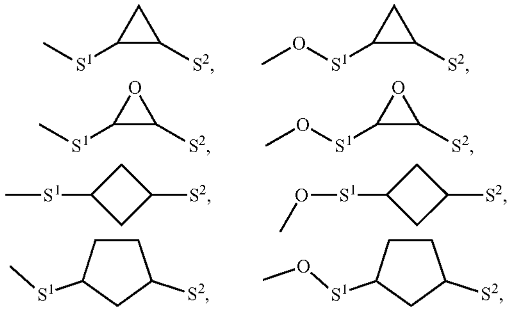

—$S^1$—F, —O—$S^1$—F, —O—$S^1$—O—$S^2$, wherein $S^1$ is $C_{1-12}$-alkylene or $C_{2-12}$-alkenylene and $S^2$ is H, $C_{1-12}$-alkyl or $C_{2-12}$-alkenyl, and very preferably one or more of $R^0$, $R^1$ and $R^2$ are selected from the group consisting of

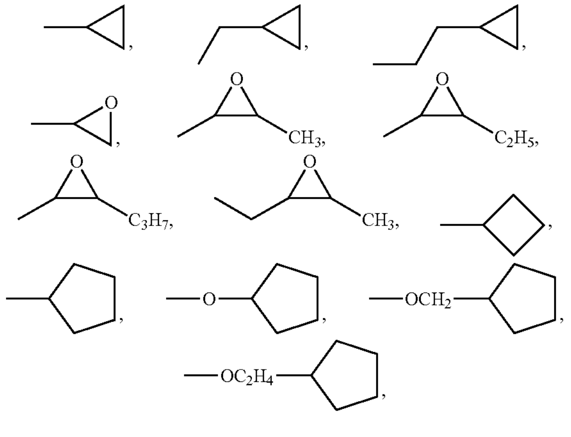

—$OCH_2OCH_3$, —$O(CH_2)_2OCH_3$, —$O(CH_2)_3OCH_3$, —$O(CH_2)_4OCH_3$, —$O(CH_2)_2F$, —$O(CH_2)_3F$, —$O(CH_2)_4F$.

Preference is furthermore given to compounds of the formula I in which m and n denote 0, 1 or 2, particularly preferably 0 or 1. Particular preference is given to compounds of the formula I in which n denotes 0, i.e. the thiophene ring is a terminal ring. Preference is furthermore given to compounds of the formula I in which m denotes 0, 1 or 2, preferably 1 or 2 and very particularly preferably 1.

$A^1$ and $A^2$ in formula I particularly preferably denote phenylene-1,4-diyl, which may also be mono- or polysubstituted by F, furthermore cyclohexane-1,4-diyl, tetrahydropyran-2,5-diyl or 1,3-dioxane-2,5-diyl.

$Z^1$ and $Z^2$ in formula I particularly preferably denote —$CF_2O$—, —$OCF_2$— or a single bond, in particular a single bond.

$A^1$ and $A^2$ in formula I particularly preferably denote

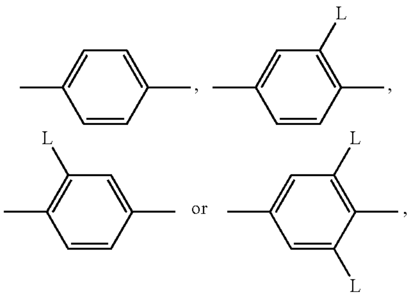

preferably unsubstituted 1,4-phenylene, in which L denotes halogen, $CF_3$ or CN, preferably F.

Preference is furthermore given to compounds of the formula I in which $R^1$ and $R^2$ each, independently of one another, denote H, F, Cl, Br, —CN, —SCN, —NCS, $SF_5$, halogen, or alkyl, alkenyl or alkynyl having 1 to 8, preferably 1 to 5, C atoms, each of which is optionally substituted by halogen, in particular by F.

Particularly preferred radicals $R^1$ and $R^2$ in formula I denote H, halogen, or alkyl, alkenyl, alkynyl or alkoxy having 1 to 12, preferably 1 to 8, C atoms, each of which is optionally substituted by halogen, in particular by F, particularly preferably H, F, alkyl, alkenyl or alkynyl having 1 to 8 C atoms. Preferably, at least one radical is not H, particularly preferably both radicals $R^1$ and $R^2$ are not H. $R^1$ is very particularly preferably equal to alkyl. $R^2$ is furthermore preferably H, alkyl or fluorine. Very particularly preferably, $R^1$ is alkyl and $R^2$ is H or alkyl. $R^1$, $R^2$ each, independently of one another, very particularly preferably denote unbranched alkyl having 1-5 C atoms. If $R^1$ and $R^2$ denote substituted alkyl, alkoxy, alkenyl or alkynyl, the total number of C atoms in the two groups $R^1$ and $R^2$ is preferably less than 10.

Preferred alkyl groups are, for example, methyl, ethyl, n-propyl, n-butyl, n-pentyl, n-hexyl, n-heptyl and n-octyl.

Preferred alkenyl groups are, for example, ethenyl, propenyl, butenyl and pentenyl.

Preferred alkynyl groups are, for example, ethynyl, propynyl, butynyl, pentynyl, hexynyl, heptynyl and octynyl.

Preferred alkoxy groups are, for example, methoxy, ethoxy, n-propoxy, n-butoxy, n-pentoxy, n-hexoxy, n-heptoxy, n-octoxy.

Halogen preferably denotes F or Cl.

Particularly preferred compounds of the formula I are those selected from the following sub-formulae:

I1

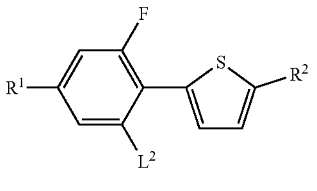

-continued
I2
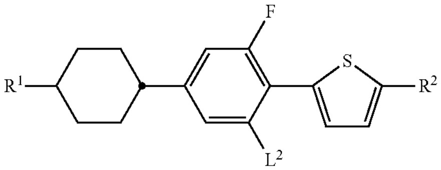
I3
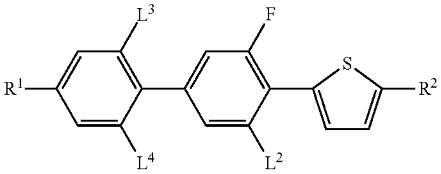
I4
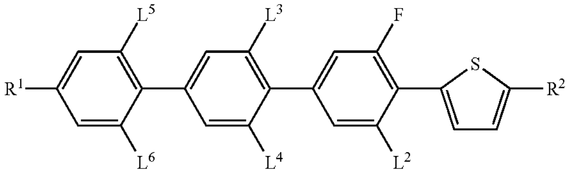
I5
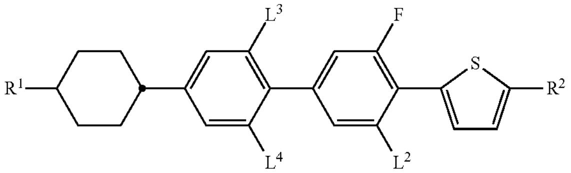
I6
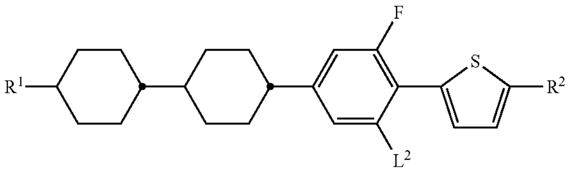
I7
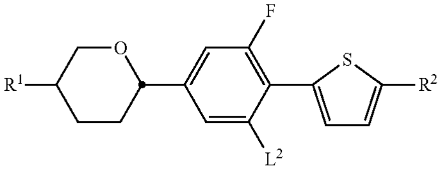
I8
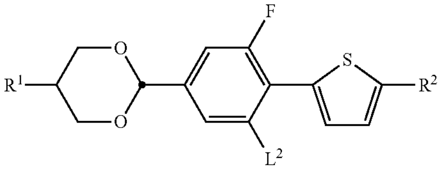
I9
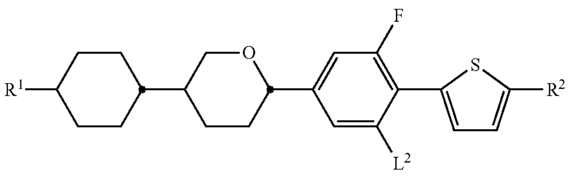
-continued
I10
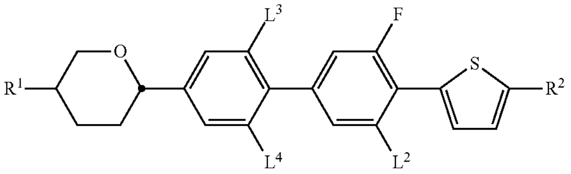
I11
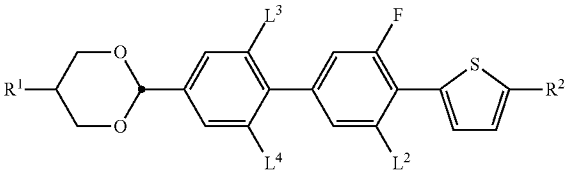
I12
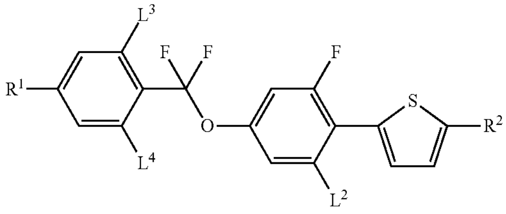
I13
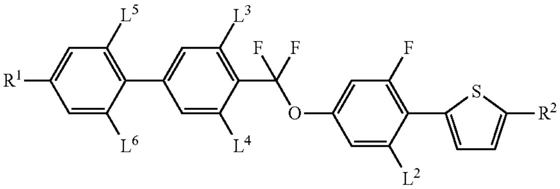
I14
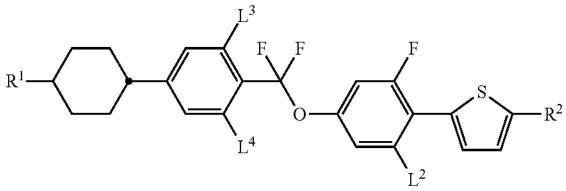
I15
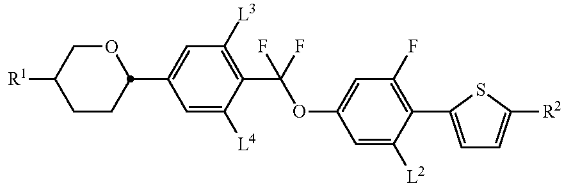
I16
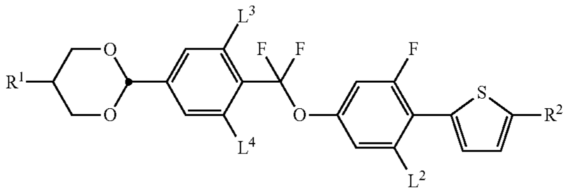
in which $R^1$ and $R^2$ have the meanings indicated above and below, and $L^1$ to $L^6$ independently denote H or F. $R^1$ and $R^2$ therein preferably denote optionally fluorinated alkyl, alkenyl, alkynyl or alkoxy having 1 to 12 C atoms, particularly preferably optionally fluorinated alkyl, alkenyl or alkynyl having 1 to 5 C atoms. $L^2$ in the formulae preferably denotes F. In the formulae I3 to I11, $L^3$ and $L^4$ preferably denote H. In the formulae I12 to I16, $L^3$ and $L^4$ preferably denote F. Preferred media according to the invention comprise compounds selected from the formulae I3 and I5.

In the formula I and its more defined formulae above and below the group $R^1$ preferably is straight-chain or branched alkyl having 1 to 12 C atoms, in which, in addition, one or more $CH_2$ groups, including terminal C atoms, may each be replaced, independently of one another, by —CH═CH—, —C≡C—,

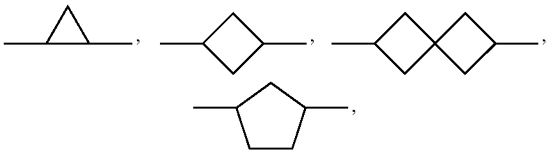

—O—, —S—, —CO—, —CO—O—, —O—CO—, in such a way that O or S atoms are not linked directly to one another, and in which, in addition, one or more H atoms may be replaced by F or Cl, more preferably alkyl with 1 to 7 C atoms or alkenyl with 2 to 7 C atoms, cyclopentylmethyl or cyclopentyl.

In the formula I and its more defined formulae above and below the group $R^2$ preferably is straight-chain or branched alkyl having 1 to 12 C atoms, in which, in addition, one or more $CH_2$ groups, including terminal C atoms, may each be replaced, independently of one another, by —CH═CH—, —C≡C—,

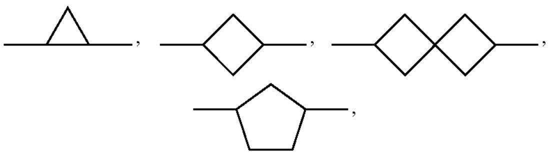

—O—, —S—, —CO—, —CO—O—, —O—CO—, in such a way that O or S atoms are not linked directly to one another, a group —$CF_3$, —$OCF_3$ or F, more preferably methyl, ethyl, n-propyl, n-butyl, $CF_3$ or F, most preferably methyl, ethyl or propyl.

Additionally, LC media comprising the following compounds of Formula I are particularly preferred:

I-3-1

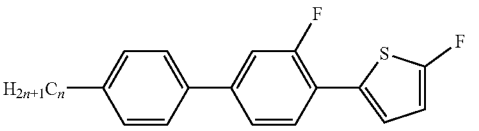

I-3-2

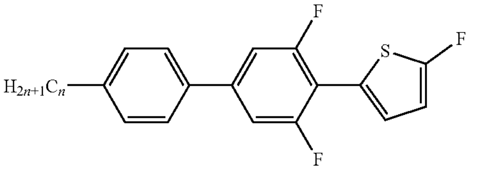

-continued

I-3-3

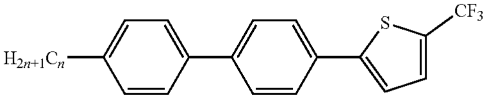

I-3-4

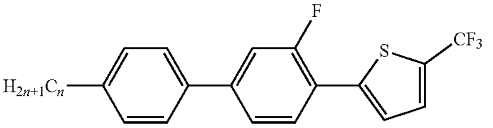

I-3-5

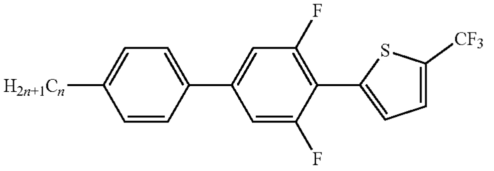

I-3-6

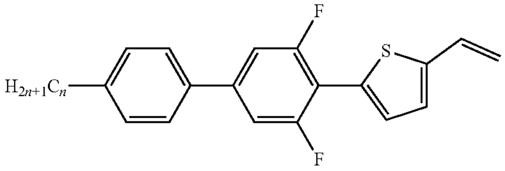

I-3-7

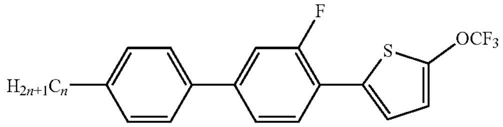

I-3-8

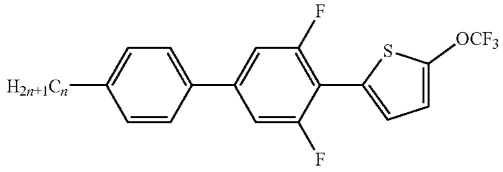

I-3-9

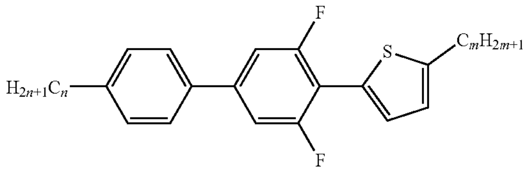

I-3-10

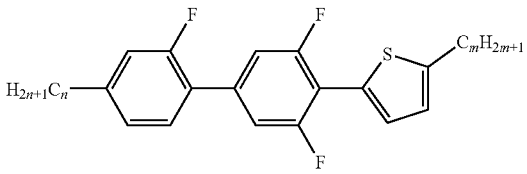

I-3-11

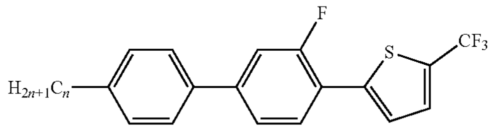

-continued
I-3-12
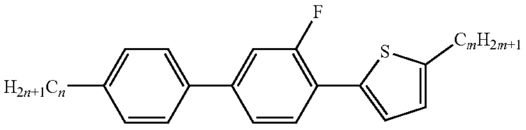
Mostly preferred compounds of Formula I include, in particular, one or more of the following:
I-3-9-1
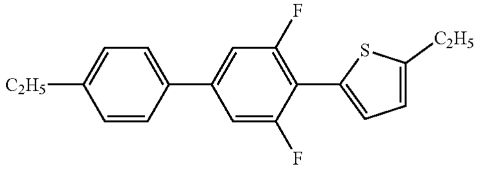
I-3-9-2
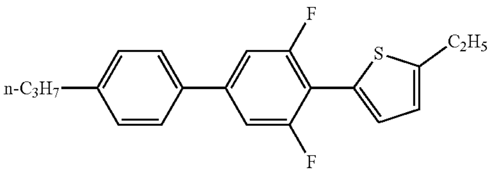
I-3-9-3
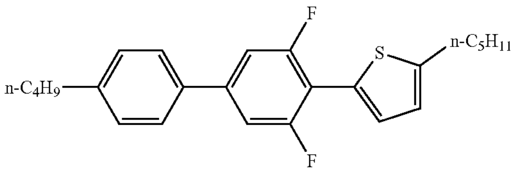
I-3-9-4
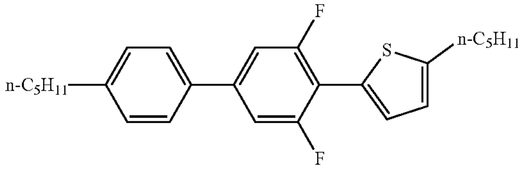
I-3-9-5
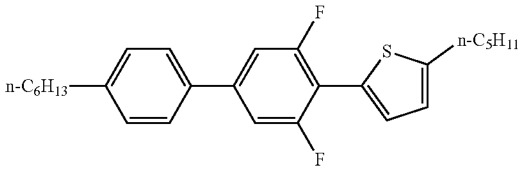
I-3-9-6
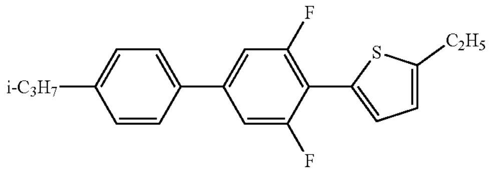
As a further possibility, the following compounds of Formula I can be used:
I-3-22-1
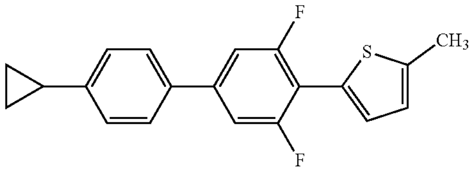
I-3-22-2
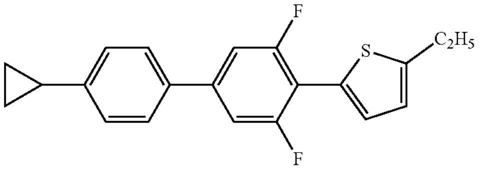
I-3-22-3
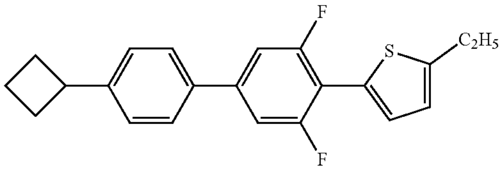
I-3-22-4
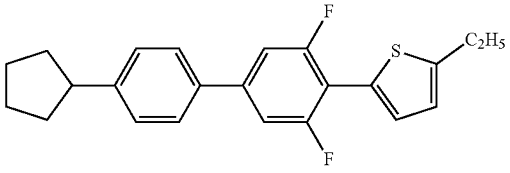
I-3-22-5
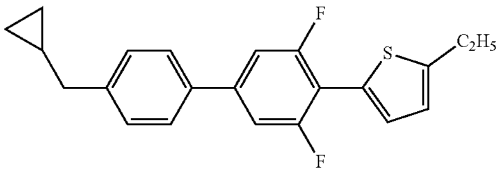
I-3-22-6
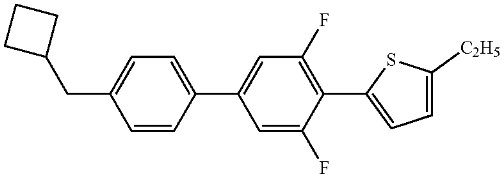
I-3-6-1
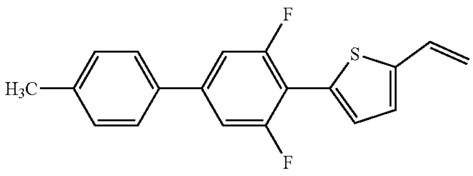
I-3-6-2
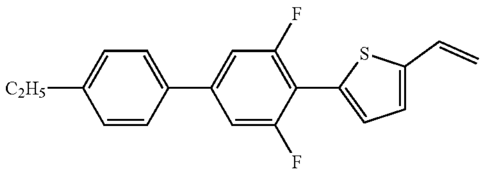

-continued

I-3-6-3

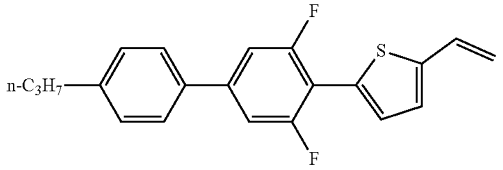

I-3-6-4

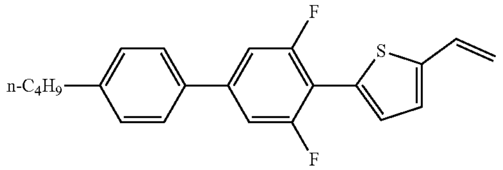

I-3-6-5

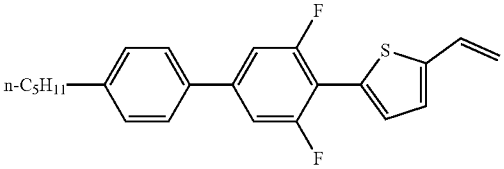

The compounds of the formula I can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The synthesis of suitable thiophenes of the formula I is known, for example, from WO 2009/129915 A1, WO 2010/099853 A1 and WO 2010/094455 A1.

In formula H, aryl denotes an aromatic or heteroaromatic hydrocarbon group having 4 to 40 C atoms, comprising one, two, three or four aromatic rings including condensed rings that may be linked directly or via an alkylene linking group having 1 to 12 C atoms, in which one or more H atoms are optionally replaced with alkyl or alkoxy having 1 to 6 C atoms or alkenyl having 2 to 6 C atoms, or with CN, $CF_3$ or halogen, and in which one or more $CH_2$ groups may each, independently of one another, be replaced by —O—, —S—, —NH—, —N($C_1$-$C_4$-alkyl)-, —CO—, —CO—O—, —O—CO—, —O—CO—O—, —CH═CH— or —C≡C— in such a way that O or S atoms are not linked directly to one another.

Preferred aryl groups are benzene, naphthalene, anthracene, biphenyl, m-terphenyl, p-terphenyl, and (phenylalkyl) benzene in which alkyl is straight chain alkyl having 1 to 12 C atoms.

In the compounds of the formula H, the groups $N(R^{13})(R^{14})$ may preferably also be amines.

Preference is further given to compounds of formula H, wherein p is 2,

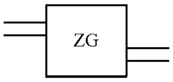

is an organic radical having 4 bonding sites, preferably an alkanetetrayl unit having 1 to 30 C atoms, in which, in addition to the m groups $R^{12}$ present in the molecule, but independently thereof, a further H atom may be replaced by $R^{12}$ or a plurality of further H atoms may be replaced by $R^{12}$, preferably an alkanetetrayl unit having one or two valences on each of the two terminal C atoms, in which one —$CH_2$— group or a plurality of —$CH_2$— groups may be replaced by —O— or —(C═O)— in such a way that two O atoms are not bonded directly to one another, or a substituted or unsubstituted aromatic or heteroaromatic hydrocarbon radical having up to 8 valences, in which, in addition to the m groups $R^{12}$ present in the molecule, but independently thereof, a further H atom may be replaced by $R^{12}$ or a plurality of further H atoms may be replaced by $R^{12}$,

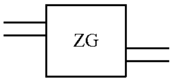

denotes

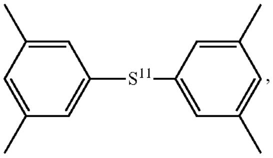,

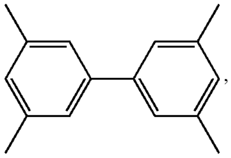, (biphenyl-1,1′,3,3′-tetrayl)

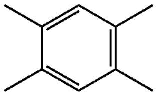, (benzene-1,2,4,5-tetrayl)

or —$CH_2$—(CH—)—$[CH_2]_q$—(CH—)—$CH_2$— (where q∈{0, 1, 2, 3, to 16}) or >CH—$[CH_2]_r$—CH< (where r∈{0, 1, 2, 3, 4, 5 to 18}),

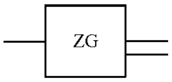

denotes

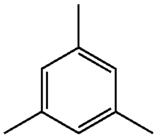,

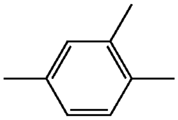

(benzene-1,3,5-triyl) (benzene-1,2,4-triyl)

or >CH—$[CH_2]_r$—$CH_2$— (where r∈{0, 1, 2, 3, 4, 5 to 18}) or

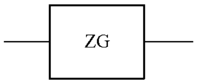

denotes $-CH_2-[CH_2]_r-CH_2-$ (where r∈{0, 1, 2, 3, 4, 5 to 18}), octane-1,8-diyl, heptane-1,7-diyl, hexane-1,6-diyl, pentane-1,5-diyl, butane-1,4-diyl, propane-1,3-diyl, ethane-1,2-diyl, or

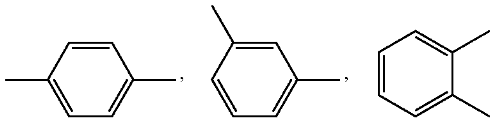

, , or (1,4-phenylene) (1,3-phenylene) (1,2-phenylene)

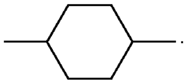

(1,4-cyclohexylene)

In a preferred embodiment of the present invention, in the compounds of the formula H,

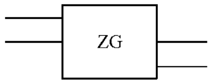

denotes

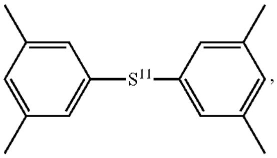

,

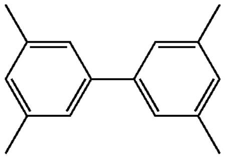

or

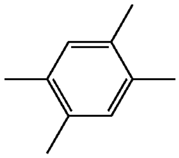

(biphenyl-1-1′,3,3′-tetrayl) (benzene-1,2,4,5-tetrayl)

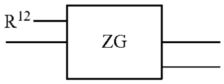

denotes

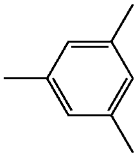

or

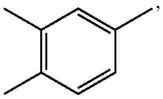

, (benzene-1,3,5-triyl) (benzene-1,2,4-triyl)

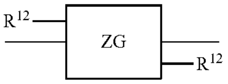

denotes $-(CH_2-)_2$, $-(CH_2-)_3$, $-(CH_2-)_4$, $-(CH_2-)_5$, $-(CH_2-)_6$, $-(CH_2-)_7$, $-(CH_2-)_8$, i.e. ethane-1,2-diyl, propane-1,3-diyl, butane-1,4-diyl, pentane-1,5-diyl, hexane-1,6-diyl, heptane-1,7-diyl, octane-1,8-diyl,

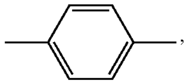

, (1,4-phenylene)

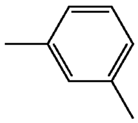

,

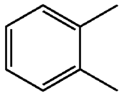

or (1,2-phenylene)

(1,3-phenylene)

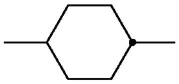

(trans-1,4-cyclohexylene)

and/or $-Z^{12}-S^{11}-Z^{11}-$ on each occurrence, independently of one another, denotes $-O-$, $-S^1-O-$, $-O-S^1-O-$, $-(C{=}O)-O-S^{11}-C-$, $-O-(C{=}O)-S^1-O-$, $-O-(C{=}O)-S^1-(C{=}O)-O-$, $-O-S^{11}-(C{=}O)-C-$, $-(C{=}O)-O-S^{11}-(C{=}O)-C-$, or $-(N-R^{13})-S^{11}-O-$, $-N-R^{13}-(C{=}O)-S^{11}-(C{=}O)-O-$ or a single bond, preferably $-C-$, $-S^1-O-$, $-O-S^1-C-$, $-(C{=}O)-O-S^{11}-O-$, $-O(C{=}O)-S^{11}-O-$ or $-O-S^{11}-(C{=}O)-O-$, and/or $R^{11}$, if present, denotes alkyl, alkoxy or H, preferably H or alkyl, and/or $R^{12}$ denotes H, methyl, ethyl, propyl, isopropyl or 3-heptyl, or cyclohexyl.

In a preferred embodiment of the present application, in the compounds of the formula H,

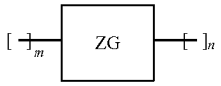

denotes a group selected from the group of the formulae

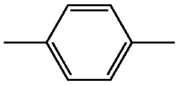

,

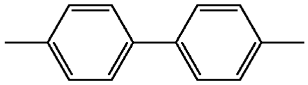

,

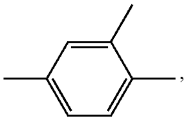

,

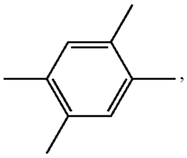

,

-continued

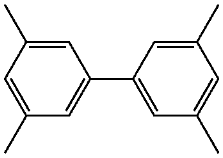,
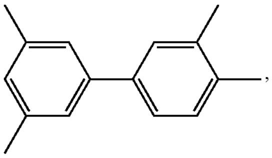,

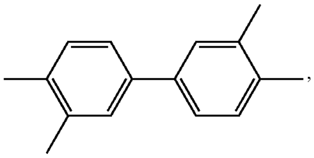, or

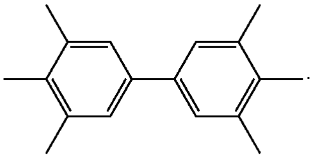.

In a preferred embodiment of the present application, in the compounds of the formula H,

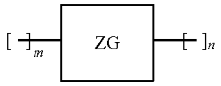

denotes a group selected from the group of the formulae

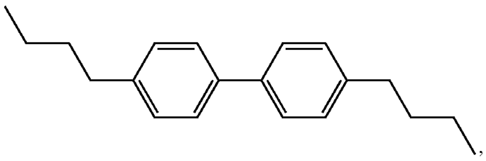,

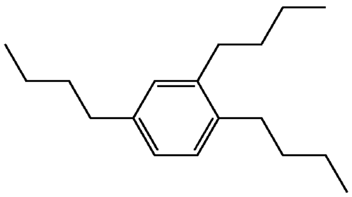 or

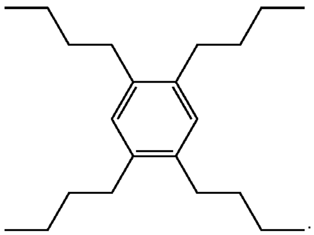.

in a preferred embodiment of the present application, in the compounds of the formula I in which p preferably denotes 1,

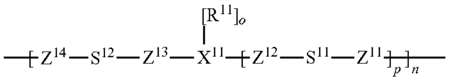

denotes

—$Z^{12}$—$S^{11}$—$Z^{11}$—, preferably —O—$S^{11}$—O—, —$S^{11}$—O— or —O—$S^{11}$—, particularly preferably —O—$S^{11}$—O—.

In a preferred embodiment of the present application, in the compounds of the formula H, the group

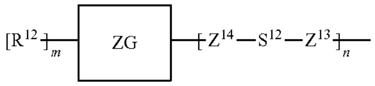

preferably denotes a group selected from the group of the formulae

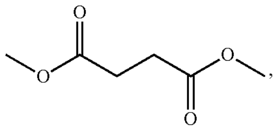,

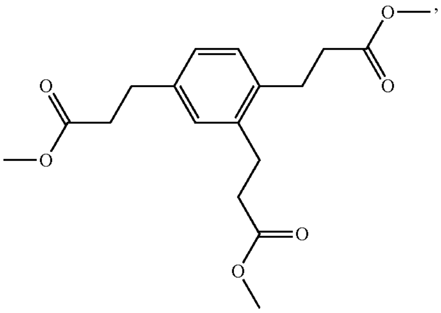,

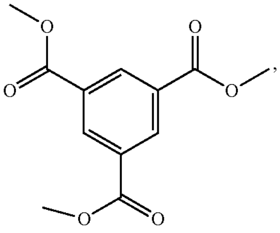,

-continued
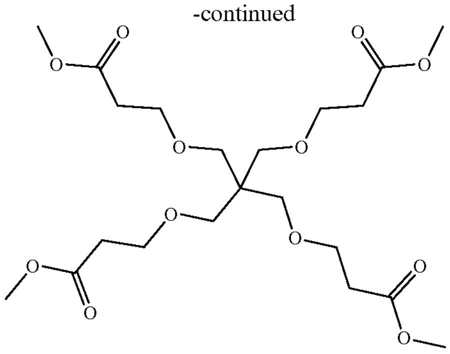
or
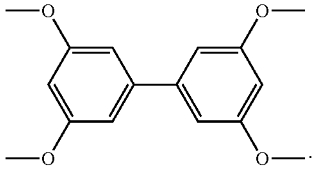
In a further preferred embodiment of the present application, which may be identical to or different from those described above, in the compounds of the formula I,
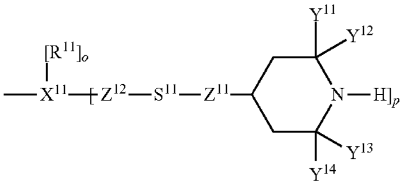
preferably denotes a group selected from the group of the formulae
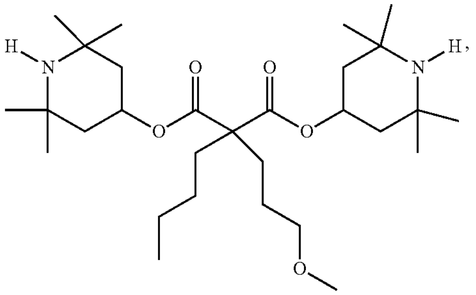
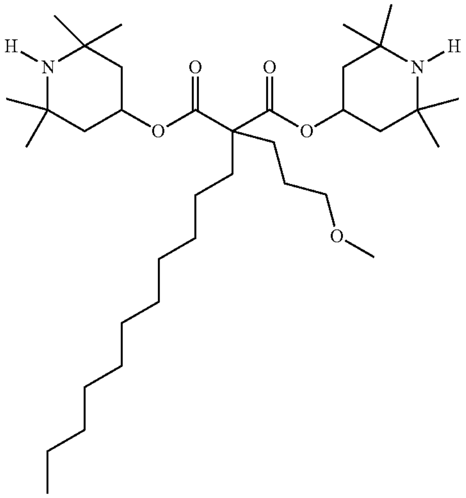
and
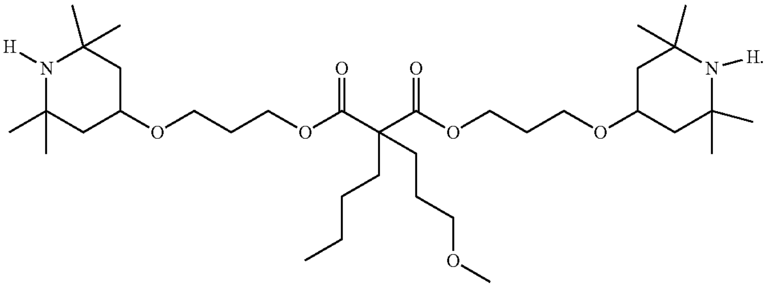

In a further preferred embodiment of the present invention, which may be identical to or different from those described above, in the compounds of the formula H, the group

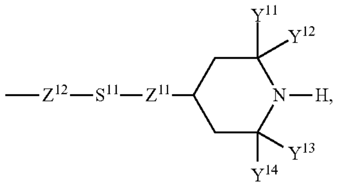

on each occurrence, independently of one another, denotes

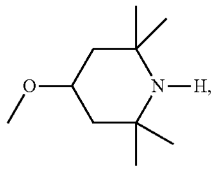
,
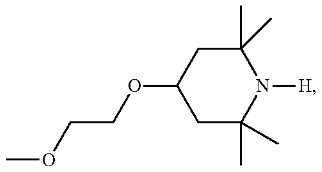
,

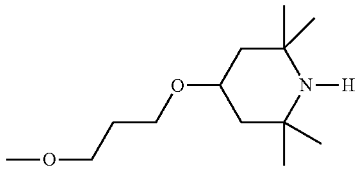
or

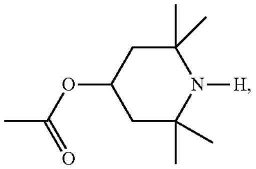
, preferably

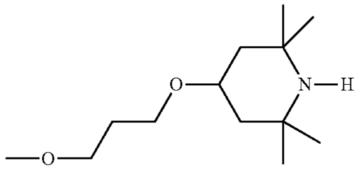
or

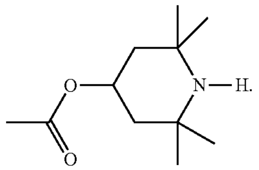
.

In a particularly preferred embodiment of the present invention, in the compounds of the formula H, all groups

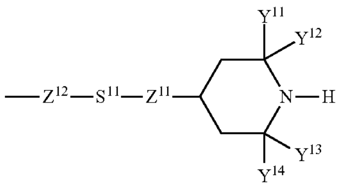

present have the same meaning.

In a preferred embodiment of the present invention, the media according to the invention comprise in each case one or more compounds of the formula H selected from the following group of the compounds of the formulae H-1 to H-13, preferably selected from the group of the compounds of the formulae H-3, H-5, H-6, H-7, H-8, H-9, H-10, H-12 and H-13, particularly preferably selected from the group of the compounds of the formulae H-6 to H-9 and very particularly preferably of the formula H-9,

H-1

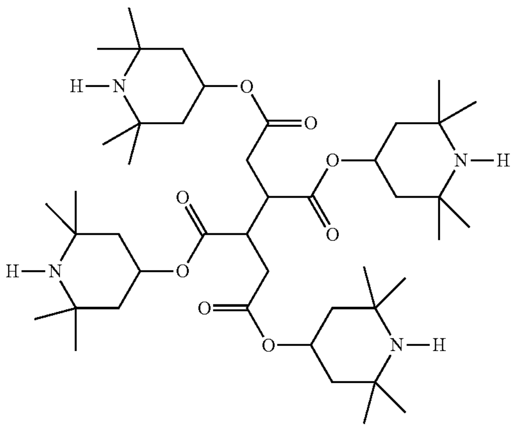

-continued
H-2
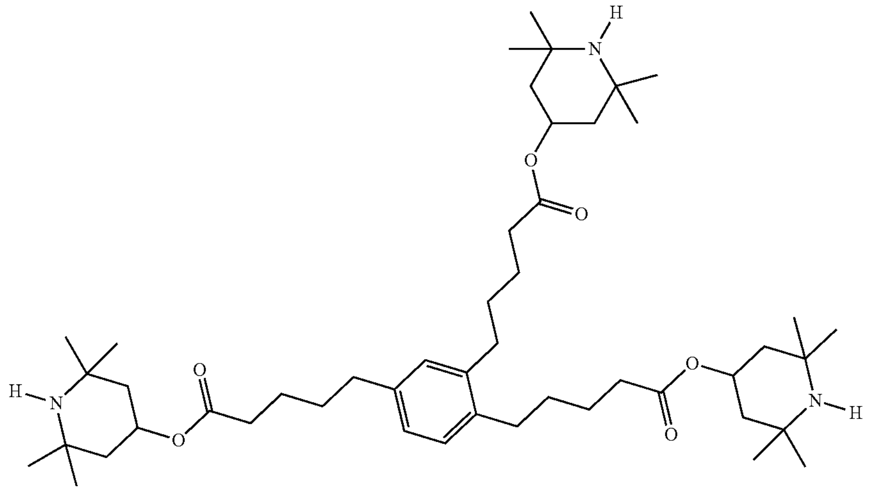
H-3
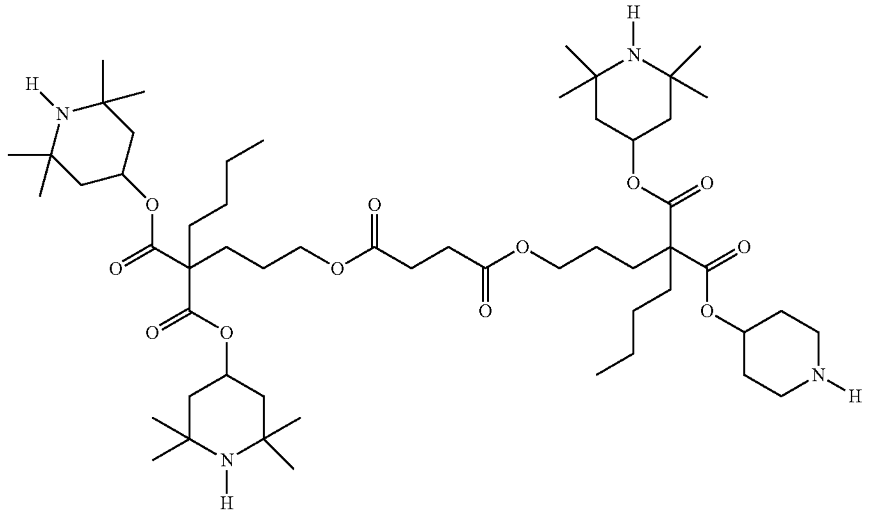
H-4
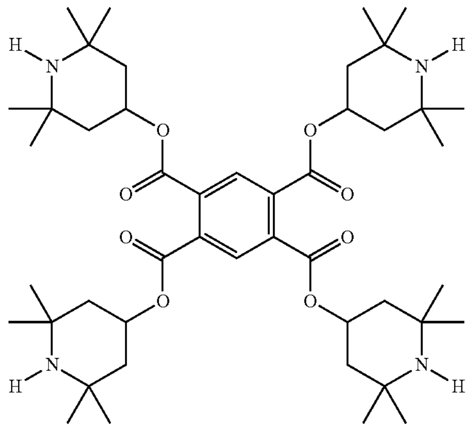

-continued
H-5
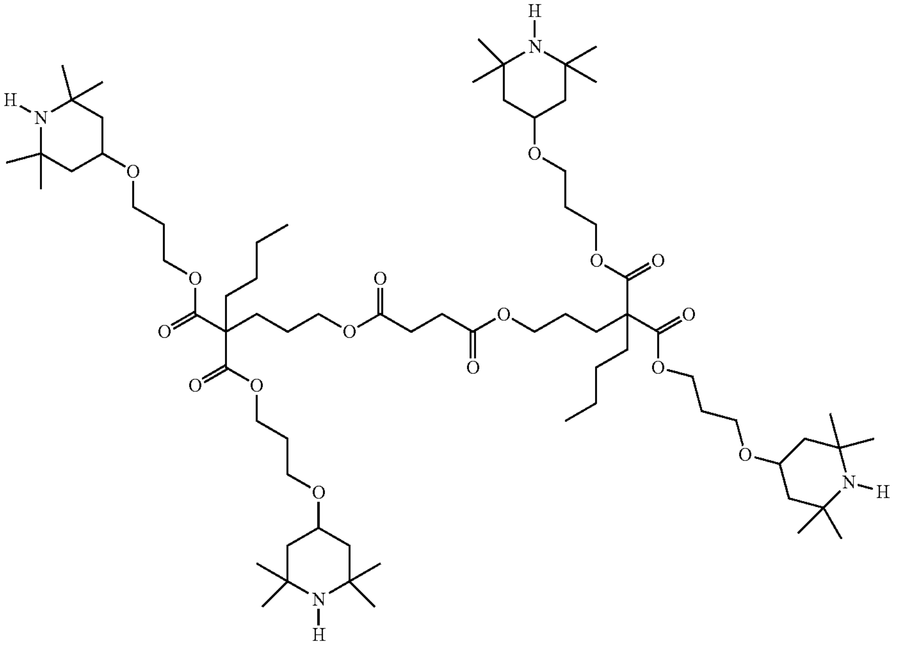
H-6
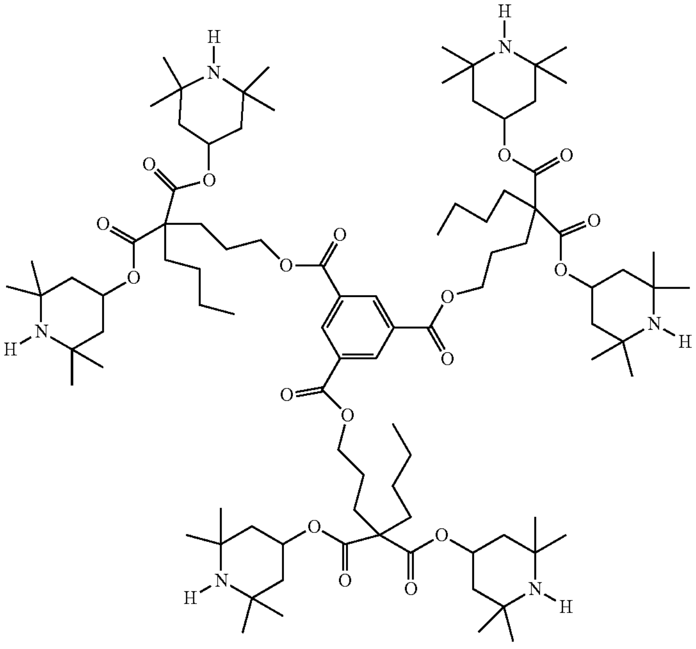
and

-continued
H-7
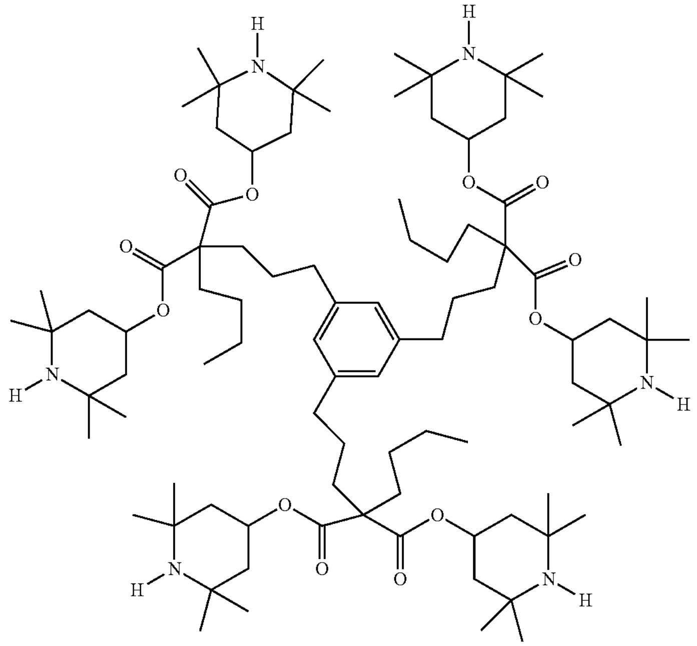
H-8
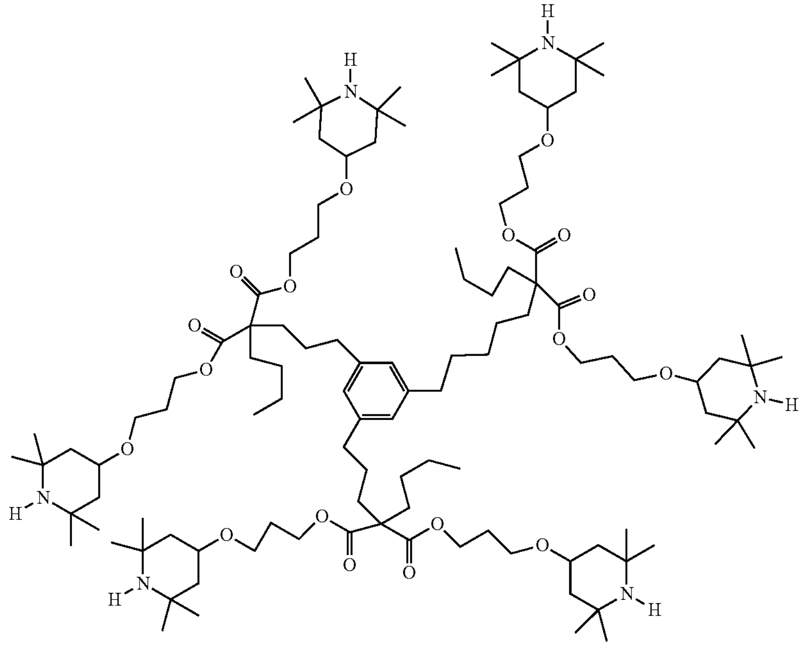

-continued
H-9
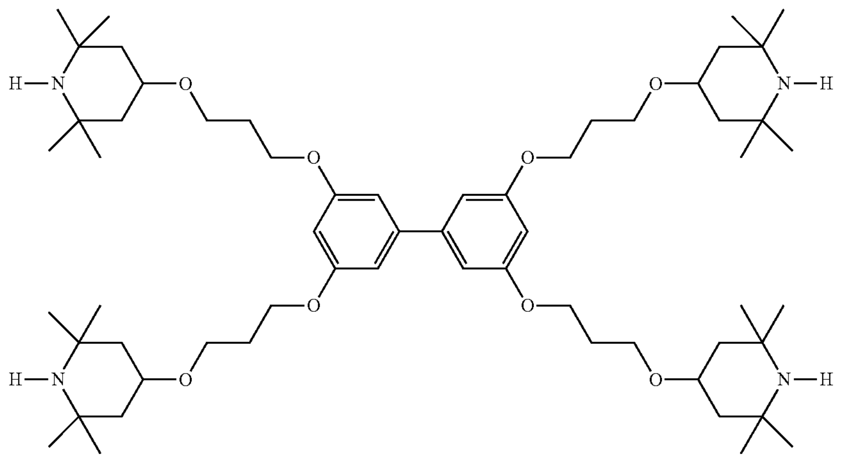
H-10
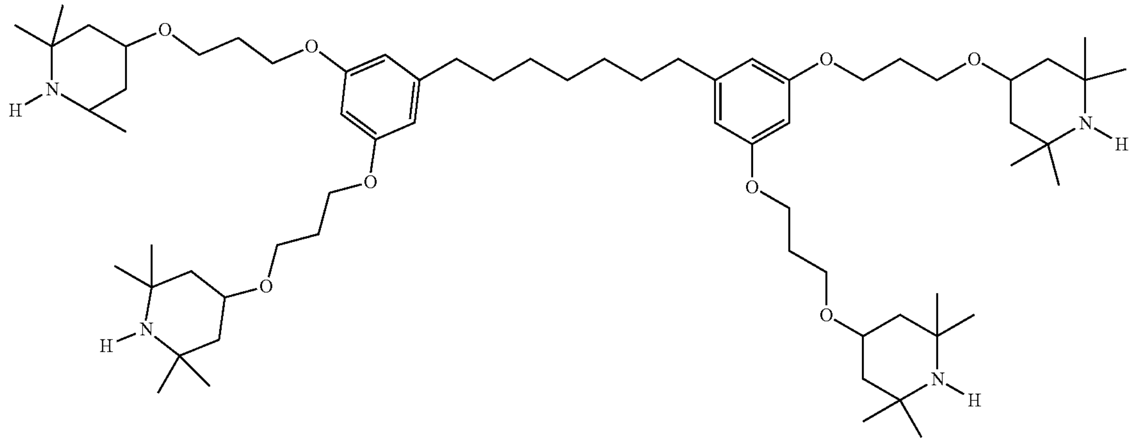
H-11
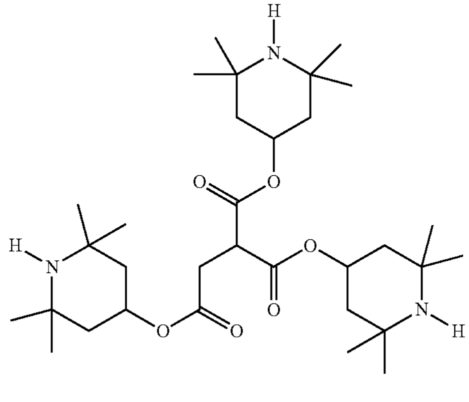

-continued

H-12

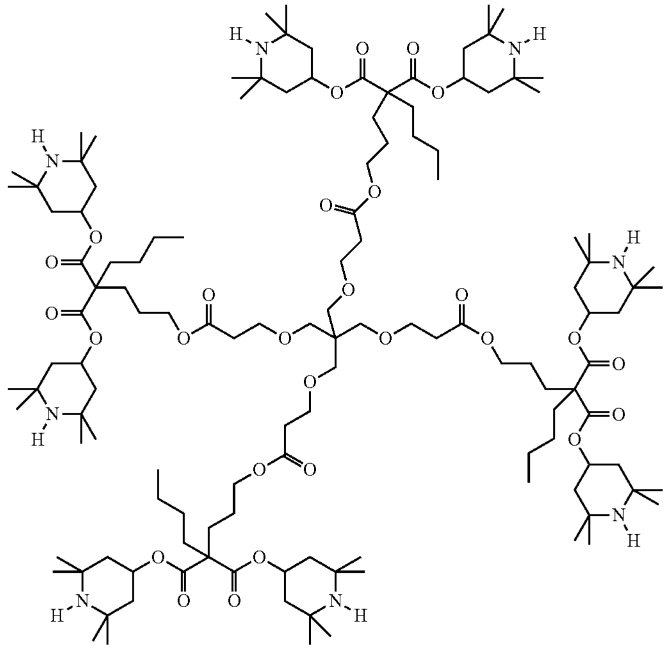

H-13

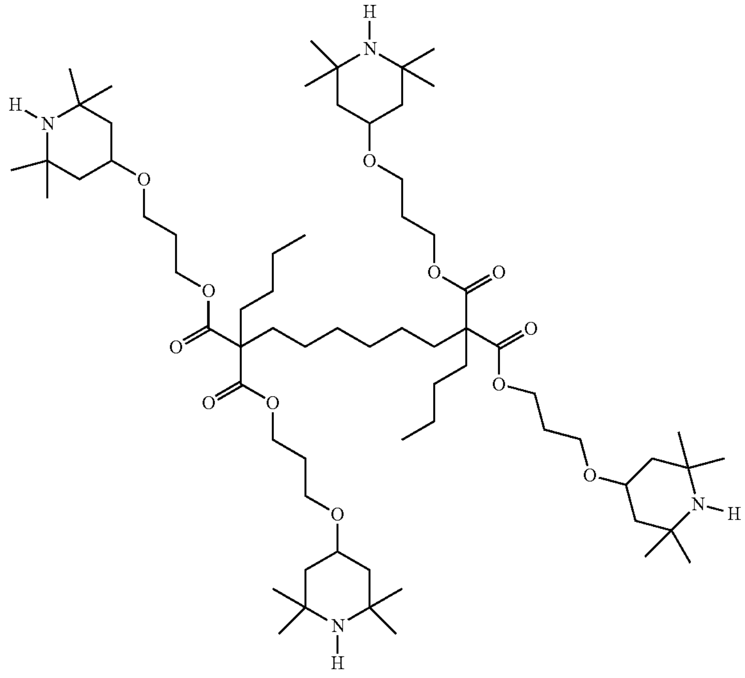

In an even more preferred embodiment of the present invention, the media according to the invention comprise in each case one or more compounds of the formula H selected from the group of the following compounds of the formulae H-1 and/or H-3 to H-7 and/or H-8 and/or H-9.

In an even more preferred embodiment of the present invention, the media according to the invention comprise in each case one or more compounds of the formula H selected from the group of the following compounds of the formulae H-8 and/or H-9.

In a further preferred embodiment of the present invention, the media according to the invention comprise at least in each case one or more compounds of the formula H in which p denotes 1 and n denotes 3, 4, 5 or 6, preferably 4, and the groups —$Z^{11}$—$S^{11}$—$Z^{12}$— denote ω-bisoxyalkylene, i.e. —O—$S^{11}$—O—, these media have excellent stability.

The compounds of the formula H can advantageously and preferably be prepared in accordance the disclosure given in U.S. application Ser. No. 15/883,976.

The medium preferably comprises in total 10 ppm to 3000 ppm, preferably 50 ppm to 2000 ppm and very particularly preferably 100 to 1000 ppm of compounds of the formula H.
Preferably, the medium according to the invention comprises a compound selected from the group of compounds of the formulae ST-1 to ST-18:
ST-1
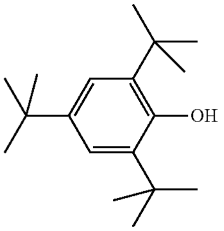
ST-2
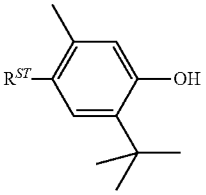
ST-3
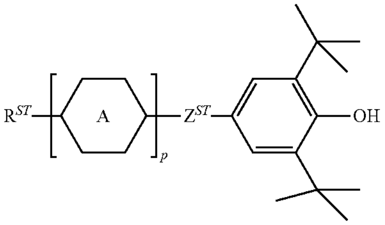
ST-4
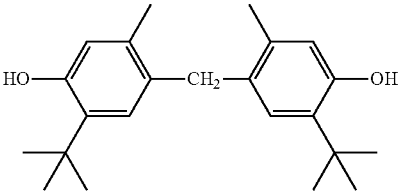
ST-5
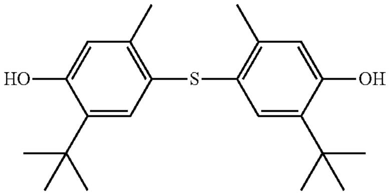
ST-6
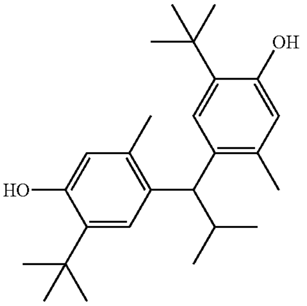
ST-7
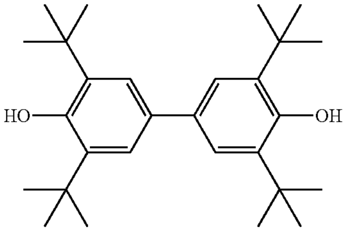
ST-8
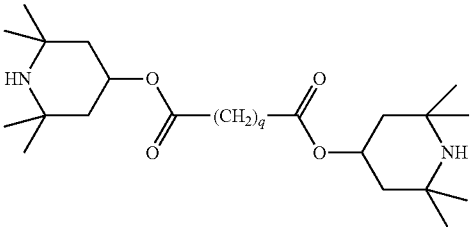
ST-9
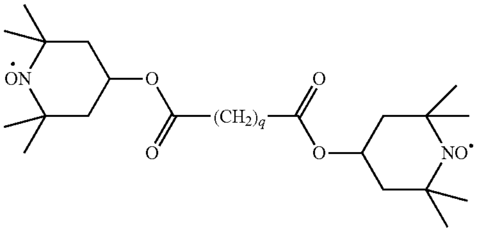
ST-10
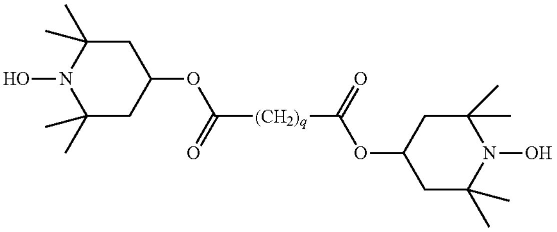

-continued

ST-11

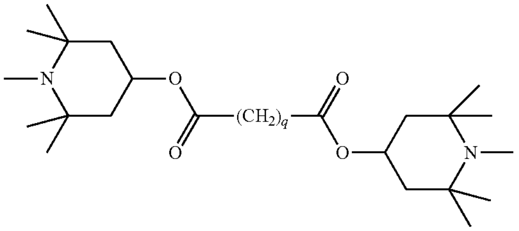

ST-12

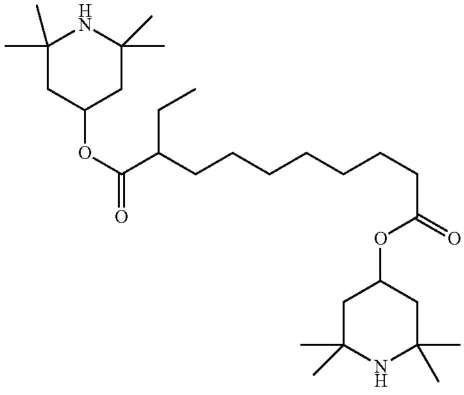

ST-13

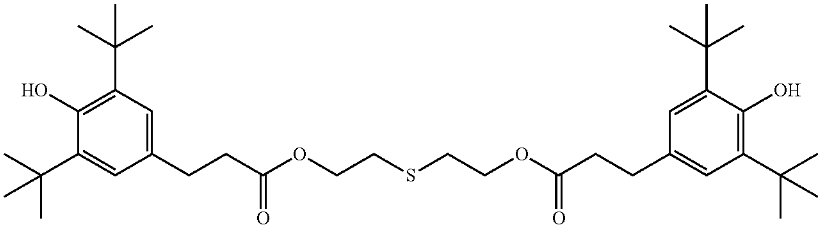

ST-14

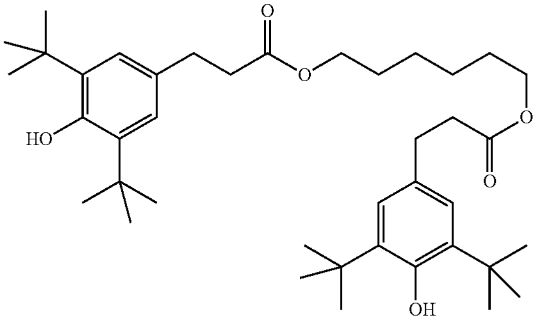

ST-15

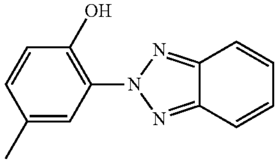

in which $R^{ST}$ denotes H, an alkyl or alkoxy radical having 1 to 15 C atoms, where, in addition, one or more $CH_2$ groups in these radicals may each be replaced, independently of one another by —C≡C—, —$CF_2O$—, —$OCF_2$—, —CH═CH—,

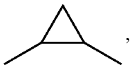, 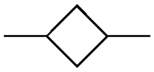, 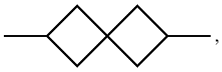, 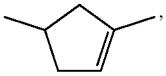, 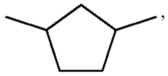,

—O—, —CO—O—, —O—CO— in such a way that O atoms are not linked directly to one another, and in which, in addition, one or more H atoms may be replaced by halogen,

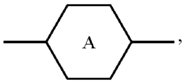, on each occurrence, identically or differently, denotes

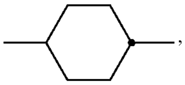, or 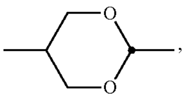, $Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—, —$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CH_3$, $CF_3$ or $CHF_2$, p denotes 0, 1 or 2, q denotes 1, 2, 3, 4, 5, 6, 7, 8, 9 or 10.

Of the compounds of the formula ST, special preference is given to the compounds of the formulae ST-3 and in particular:

ST-1

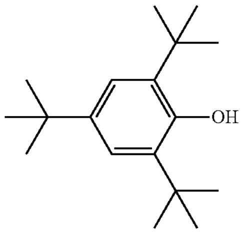

ST-3a

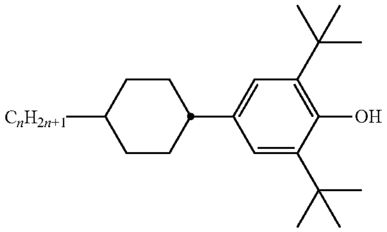

in which n=1, 2, 3, 4, 5, 6 or 7, preferably n=3

ST-3b

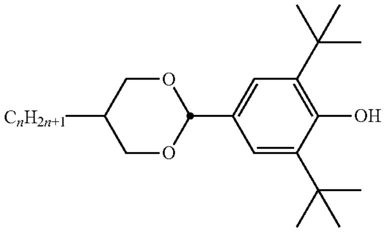

in which n=1, 2, 3, 4, 5, 6 or 7, preferably n=3

ST-3c

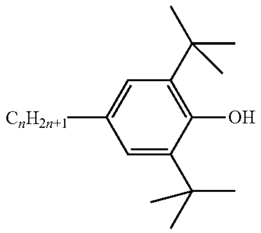

in which n=1, 2, 3, 4, 5, 6 or 7, preferably n=1 or 7

ST-8-1

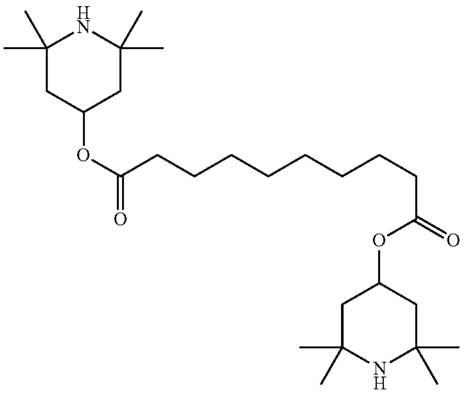

ST-9-1

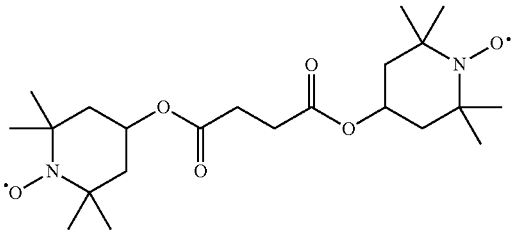

ST-12

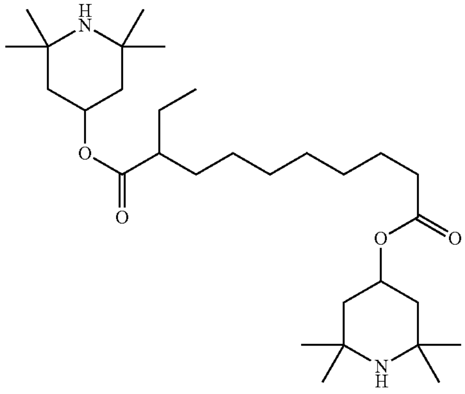

ST-15

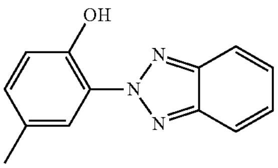

In the compounds of the formulae ST-3a and ST-3b, n preferably denotes 3. In the compounds of the formula ST-2a, n preferably denotes 7.

Very particularly preferred mixtures according to the invention comprise one or more stabilizers from the group of the compounds of the formulae ST-2a-1, ST-3a-1, ST-3b-1, ST-8-1, ST-9-1 and ST-12:

ST-3a-1

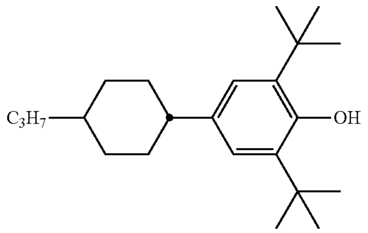

ST-3b-1

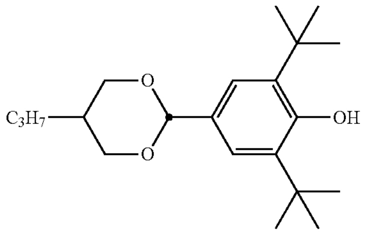

ST-3c-1

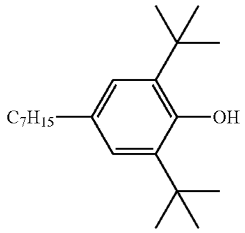

ST-8-1

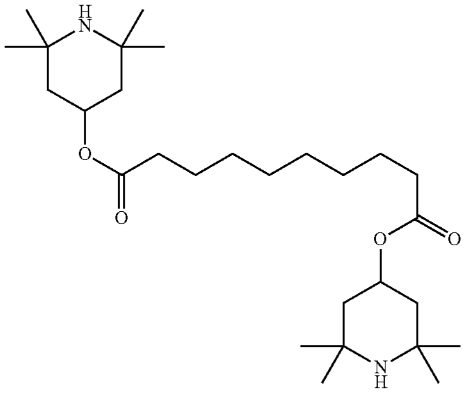

ST-9-1

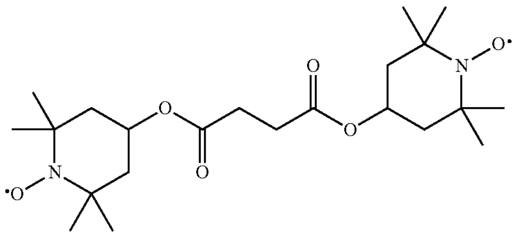

-continued

ST-12

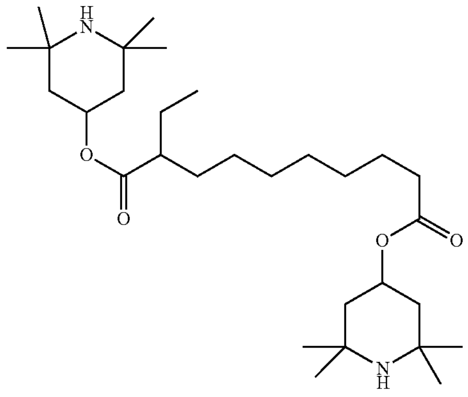

The compounds of the formulae ST-1 to ST-19 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-15, the concentration correspondingly increases to 0.01-1% in the case of two compounds, based on the mixtures.

However, the total proportion of the compounds of the formulae ST-1 to ST-15, based on the mixture according to the invention, should not exceed 3%.

Particularly preferred LC media according to the invention are indicated below:

LC medium which additionally comprises one or more, preferably dielectrically positive, compounds selected from the group of compounds of formulae II and III, preferably of compounds having a dielectric anisotropy of greater than 3 each, preferably one or more compounds of formula II:

II

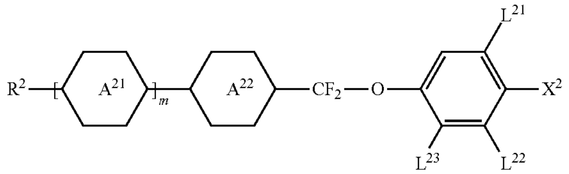

III

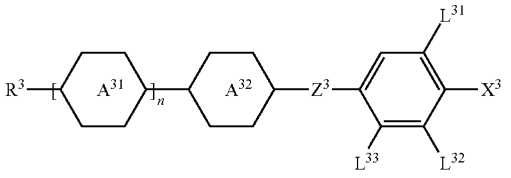

in which $R^2$ an alkyl radical having 1 to 15 C atoms, wherein one or more $CH_2$ groups, including terminal C atoms, in this radical may each be replaced, independently of one another, by —C≡C—, —CH═CH—,

, 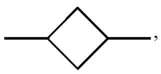, 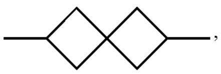,

-continued

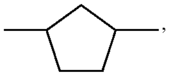,

—O—, —S—, —(CO)—O—, —O—(CO)— in such a way that O or S atoms are not linked directly to one another, and in which, in addition, one or more H atoms may be replaced by F or Cl, or H, preferably denotes alkyl, alkoxy, fluorinated alkyl or fluorinated alkoxy having 1 to 7 C atoms, alkenyl, alkenyloxy, alkoxyalkyl, fluorinated alkenyl having 2 to 7 C atoms, cycloalkyl with 3 to 5 C atoms, cyclalkylalkyl, cycloalkylalkoxy and most preferably alkyl, cyclopropyl, cyclopentyl or alkenyl,

 and 

on each appearance, independently of one another, denote

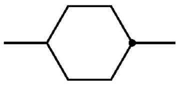, 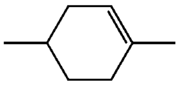,

, 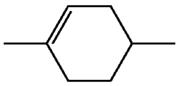,

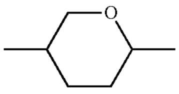, 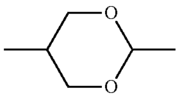,

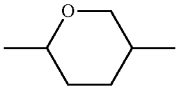, 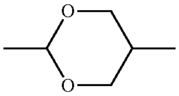,

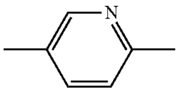, 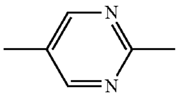,

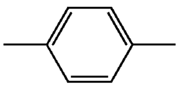, 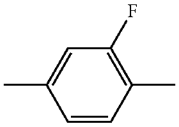,

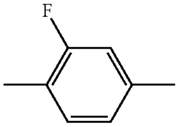, 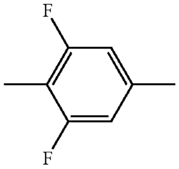 or

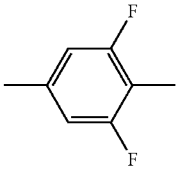, preferably

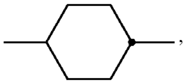, 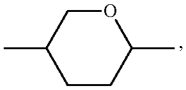,

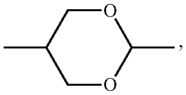, 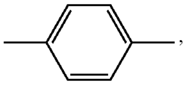,

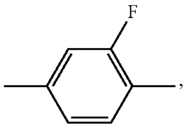, 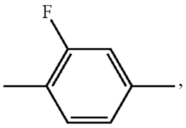, or

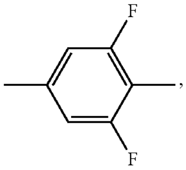, $L^{21}$ and $L^{22}$ denote H or F, $L^{23}$ H or $CH_3$, preferably H, $X^2$ denotes halogen, halogenated alkyl or alkoxy having 1 to 3 C atoms or halogenated alkenyl or alkenyloxy having 2 or 3 C atoms, preferably F, Cl, $—OCF_3$, $—O—CH_2CF_3$, $—O—CH{=}CH_2$, $—O—CH{=}CF_2$ or $—CF_3$, very preferably F, Cl, $—O—CH{=}CF_2$ or $—OCF_3$, m denotes 0, 1, 2 or 3, preferably 1 or 2 and particularly preferably 2, $R^3$ an alkyl radical having 1 to 15 C atoms, wherein one or more $CH_2$ groups, including terminal C atoms, in this radical may each be replaced, independently of one another, by —C≡C—, —CH═CH—,

 and 

—O—, —S—, —(CO)—O—, —O—(CO)— in such a way that O or S atoms are not linked directly to one another, and in which, in addition, one or more H atoms may be replaced by F or Cl, or H, preferably denotes alkyl, alkoxy, fluorinated alkyl or fluorinated alkoxy having 1 to 7 C atoms, alkenyl, alkenyloxy, alkoxyalkyl, fluorinated alkenyl having 2 to 7 C atoms, cycloalkyl with 3 to 5 C atoms, cyclalkylalkyl, cycloalkylalkoxy and most preferably alkyl, cyclopropyl, cyclopentyl or alkenyl,

, 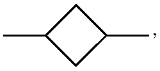, 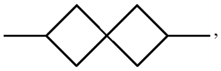, 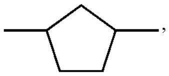, on each appearance, independently of one another, are

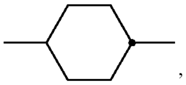, 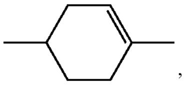, 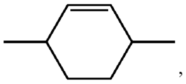, 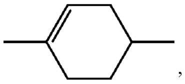, 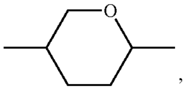, 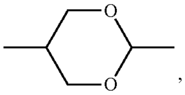, 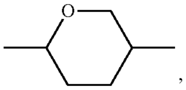, 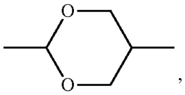, 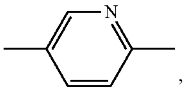, 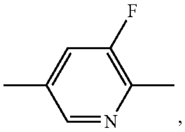, 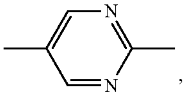, 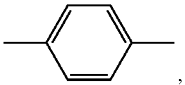, 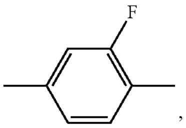, 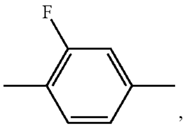, 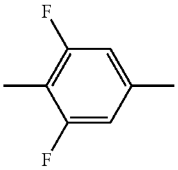 or 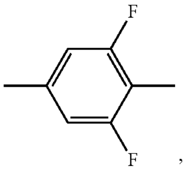, preferably

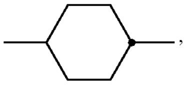, 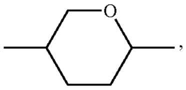, 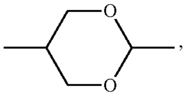, 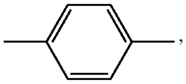, 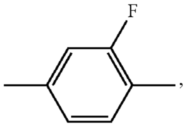, 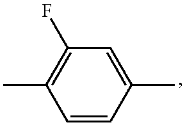, or 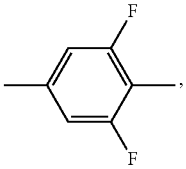, $L^{31}$ and $L^{32}$, independently of one another, denote H or F, preferably $L^{31}$ denotes F, $L^{33}$ H or $CH_3$, preferably H, $X^3$ denotes halogen, halogenated alkyl or alkoxy having 1 to 3 C atoms or halogenated alkenyl or alkenyloxy having 2 or 3 C atoms, F, Cl, $—OCF_3$, $—OCHF_2$, $—O—CH_2CF_3$, $—O—CH{=}CF_2$, $—O—CH{=}CH_2$ or $—CF_3$, very preferably F, Cl, $—O—CH{=}CF_2$, $—OCHF_2$ or $—OCF_3$, $Z^3$ denotes $—CH_2CH_2—$, $—CF_2CF_2—$, —COO—, trans-CH═CH—, trans-CF═CF—, $—CH_2O—$ or a single bond, preferably $—CH_2CH_2—$, —COO—, trans-CH═CH— or a single bond and very preferably —COO—, trans-CH═CH— or a single bond, and n denotes 0, 1, 2 or 3, preferably 1, 2 or 3 and particularly preferably 1, d) optionally, preferably obligatory, one or more dielectrically neutral compounds selected from the group of formulae IV and V:

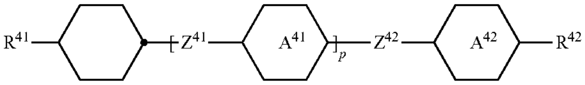
IV

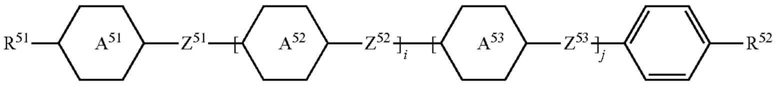
V in which $R^{41}$ and $R^{42}$, independently of one another, have the meaning indicated above for $R^3$ under formula III, preferably $R^{41}$ denotes alkyl and $R^{42}$ denotes alkyl, cyclopropyl, cyclopentyl or alkoxy or $R^{41}$ denotes alkenyl and $R^{42}$ denotes alkyl,

 and 

independently of one another and, if

occurs twice, also these independently of one another, denote

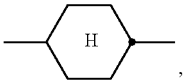, 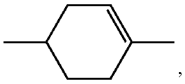,
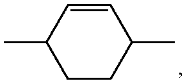, 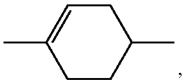,
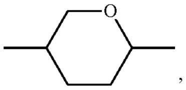, 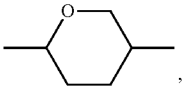,
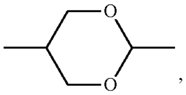, 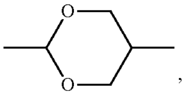,
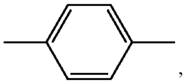, 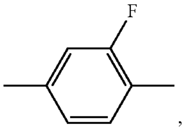,
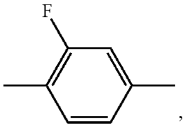, 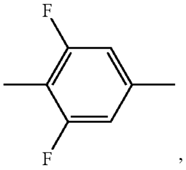,
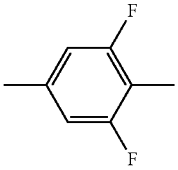 or 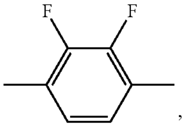, preferably one or more of

 and 

denotes or denote,

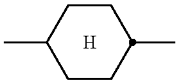

$Z^{41}$ and $Z^{42}$, independently of one another and, if $Z^{41}$ occurs twice, also these independently of one another, denote —$CH_2CH_2$—, —COO—, trans-CH═CH—, trans-CF═CF—, —$CH_2O$—, —$CF_2O$—, —C≡C— or a single bond, preferably one or more thereof denotes/denote a single bond, p denotes 0, 1 or 2, preferably 0 or 1, and $R^{51}$ and $R^{52}$, independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

 to , if present, each, independently of one another, denote

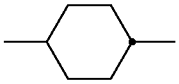, 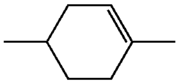,
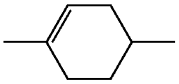, 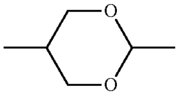,
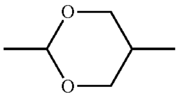, 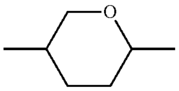,
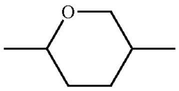, 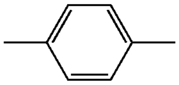,
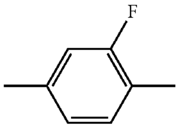 or 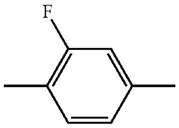, preferably

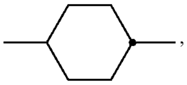, 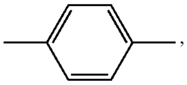,
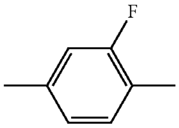, 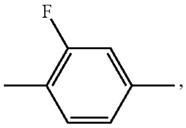, $Z^{51}$ to $Z^{53}$ each, independently of one another, denote $—CH_2—CH_2—$, $—CH_2—O—$, $—CH═CH—$, $—C≡C—$, $—COO—$ or a single bond, preferably $—CH_2—CH_2—$, $—CH_2—O—$ or a single bond and particularly preferably a single bond, i and j each, independently of one another, denote 0 or 1, (i+j) preferably denotes 0, 1 or 2, more preferably 0 or 1, wherein the respective rings, and preferably the phenylene rings, optionally may each be substituted by one or two alkyl groups, preferably by methyl and/or ethyl groups, preferably by one methyl group, and e) again optionally, either alternatively or additionally, one or more dielectrically negative compounds selected from the group of formulae VI to IX:

VI

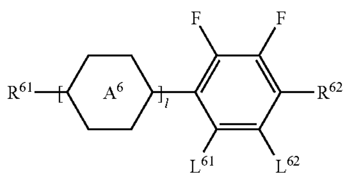

VII

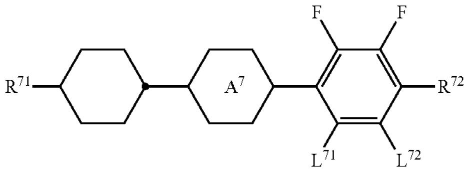

VIII

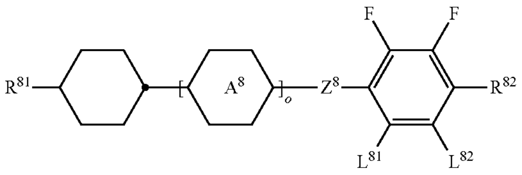

IX

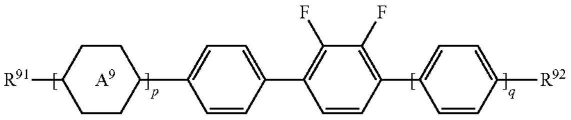

wherein $R^{61}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms, an unsubstituted alkoxy radical having 1 to 6 C atoms, an unsubstituted alkenyloxy radical having 2 to 6 C atoms or $C_{3-5}$-cycloalkyl$(CH_2)_{0-1}$, $R^{62}$ denotes an unsubstituted alkyl radical having 1 to 7 C atoms, an unsubstituted alkoxy radical having 1 to 6 C atoms, $C_{3-5}$-cycloalkyloxy or an unsubstituted alkenyloxy radical having 2 to 6 C atoms, and $L^{61}$, $L^{62}$ independently H or methyl, preferably H, I denotes 0 or 1, $R^{71}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms or $C_{3-5}$-cycloalkyl-$(CH_2)_{0-1}$, $R^{72}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms, and $L^{71}$, $L^{72}$ independently H or methyl, preferably H,

 and 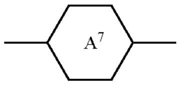

independently denote

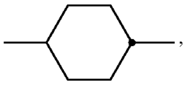, 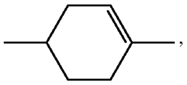, or 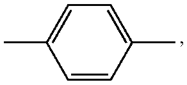, $R^{81}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms or $C_{3-5}$-cycloalkyl-$(CH_2)_{0-1}$, $R^{82}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, an unsubstituted alkenyloxy radical having 2 to 6 C atoms, preferably having 2, 3 or 4 C atoms, or $C_{3-5}$-cycloalkyloxy, $L^{81}$, $L^{82}$ independently H or methyl, preferably H,

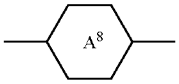

denotes

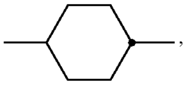, 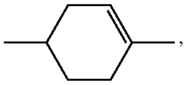, or 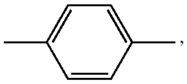, preferably or

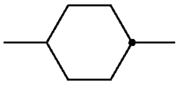 or 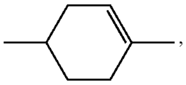, more preferably

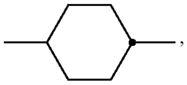

$Z^8$ denotes —(C═O)—C—, —$CH_2$—O—, —$CF_2$—O— or —$CH_2$—$CH_2$—, preferably

—(C═O)—C— or —$CH_2$—O—, and denotes 0 or 1, $R^{91}$ and $R^{92}$ independently of one another have the meaning given for $R^{72}$ above, $R^{91}$ preferably denotes an alkyl radical having 2 to 5 C atoms, preferably having 3 to 5 C atoms, $R^{92}$ preferably denotes an alkyl or alkoxy radical having 2 to 5 C atoms, more preferably an alkoxy radical having 2 to 4 C atoms, or an alkenyloxy radical having 2 to 4 C atoms.

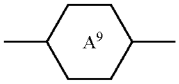

denotes

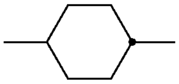 or 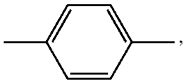, p and q independently of each other denote 0 or 1, and (p+q) preferably denotes 0 or 1, in case

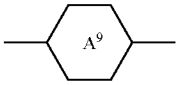

denotes

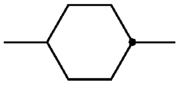 or 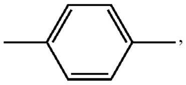, alternatively, preferably p=q=1, f) optionally, preferably obligatory, one or more compounds of formula X, preferably in a concentration in the range from 1% to 30%, more preferably in the range from 2% to 20%, particularly preferably in the range from 3% to 10%,

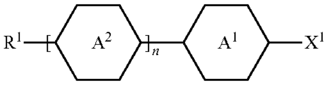

X in which

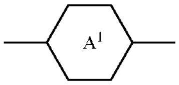

denotes

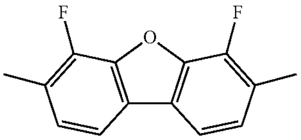 or

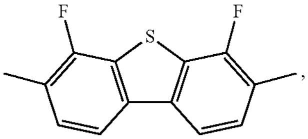,

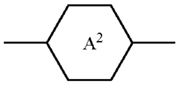

denotes, in each occurrence independently of one another,

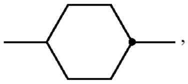, 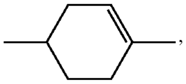, 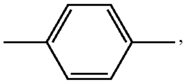,

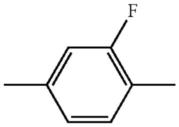 or 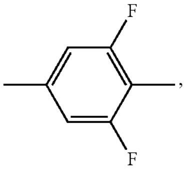, preferably

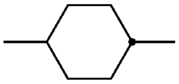 or 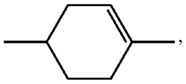, n denotes 1 or 2, preferably 1, $R^1$ denotes alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms, $C_{3-5}$-cycloalkyl, $C_{3-5}$-cycloalkyl-alkyl, $C_{3-5}$-cycloalkyl-alkyloxy, preferably alkyl, alkoxy, alkenyl or alkenyloxy, more preferably alkyl, alkenyl, alkoxy or alkenyloxy, and, most preferably alkyl, and $X^1$ denotes F, Cl, fluorinated alkyl, fluorinated alkenyl, fluorinated alkoxy or fluorinated alkenlyoxy, the latter four groups preferably having 1 to 4 C atoms, more preferably F, Cl, $CF_3$ or $OCF_3$, wherein the respective rings, and preferably the phenylene rings, optionally may each be substituted by one or two alkyl groups, preferably by methyl and/or ethyl groups, preferably by one methyl group, and g) again optionally, preferably obligatory, either alternatively or additionally, one or more compounds of formula XI:

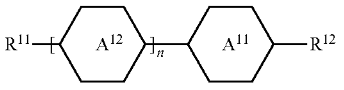

XI in which

denotes

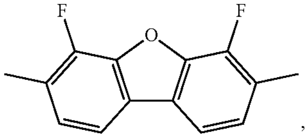
,
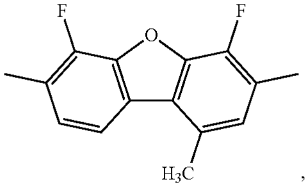
,
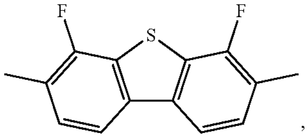
,
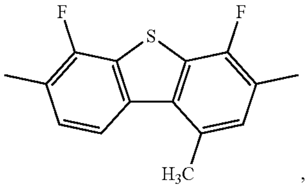
,
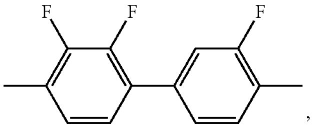
,
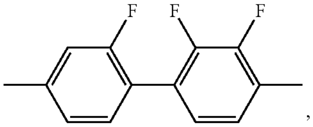
,
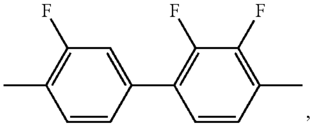
,
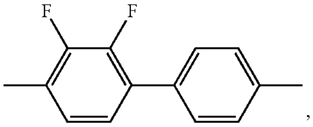
, -continued

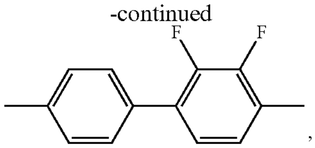
,
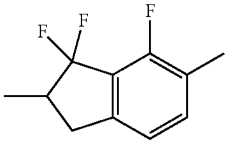
or
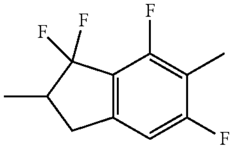

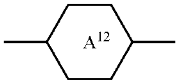

denotes

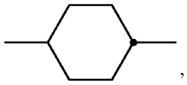
,
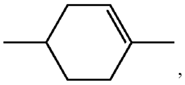
,
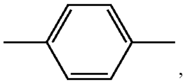
,
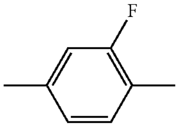
or
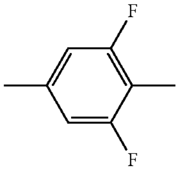
, preferably

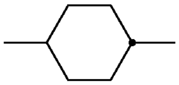
,
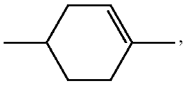
,
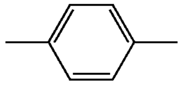
or
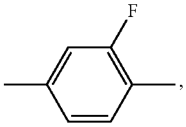
, n denotes 0 or 1, $R^{11}$ and $R^{12}$ independently of each other denote alkyl, alkoxy, fluorinated alkyl or fluorinated alkoxy, preferably having 1 to 7 C atoms, wherein one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl having 2 to 7 C atoms and preferably alkyl, alkoxy, alkenyl or alkenyloxy, most preferably alkyl, alkoxy or alkenyloxy, and $R^{11}$ alternatively denotes $R^1$ and $R^{12}$ alternatively denotes $X^1$, $R^1$ denotes alkyl, alkoxy, fluorinated alkyl or fluorinated alkoxy, preferably having 1 to 7 C atoms, wherein one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl, preferably having 2 to 7 C atoms and preferably alkyl or alkenyl, and $X^1$ denotes F, Cl, fluorinated alkyl, fluorinated alkenyl, fluorinated alkoxy or fluorinated alkenyoxy, the latter four groups preferably having 1 to 4 C atoms, more preferably F, Cl, $CF_3$ or $OCF_3$, wherein the respective rings, and preferably the phenylene rings, optionally may each be substituted by one or two alkyl groups, preferably by methyl and/or ethyl groups, preferably by one methyl group, from which the compounds of formula X are excluded.

Optionally the media according to the present application comprise one or more compounds of more compounds of formula L, preferably in a concentration in the range from 1% to 40%, more preferably in the range from 2% to 30%, particularly preferably in the range from 3% to 20%,

L

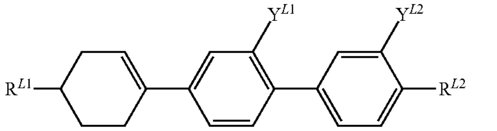

in which $R^{L1}$ and $R^{L2}$, independently of one another, denote, an alkyl radical having 1 to 15 C atoms, wherein one or more $CH_2$ groups, preferably one $CH_2$ group, in these radicals may each be replaced, independently of one another, by —C≡C—, —$CF_2$O—, —O$CF_2$—, —O—, —(CO)—O—, —O—(C═O)—, cyclo-propylene, 1,3-cyclobutylene, 1,3-cyclopentylene, 1,3-cyclo-pentenylene, preferably by cyclopropylene or 1,3-cyclopentylene, preferably one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl having 2 to 7 C atoms and preferably alkyl or alkenyl, wherein one —$CH_2$— group may be replaced by cyclo-propylene, 1,3-cyclobutylene, 1,3-cyclopentylene, 1,3-cyclo-pentenylene, preferably by cyclopropylene or 1,3-cyclo-pentenylene, in such a way that 0 atoms are not linked directly to one another, and in which one or more H atoms may be replaced by halogen, and $Y^{L1}$ and $Y^{L2}$, identically or differently, denote H, F or Cl, preferably at least one of $Y^{L1}$ and $Y^{L2}$ is H, preferably $Y^{L2}$ is H, and most preferably $Y^{L1}$ and $Y^{L2}$ are H.

The liquid-crystalline media in accordance with the present application preferably have a nematic phase.

Throughout this application and especially for the definition of $R^1$, $R^2$, $R^3$, $R^{41}$, $R^{51}$, $R^{L1}$, etc. and $R^{L2}$ alkyl means an alkyl group, which may be straight-chain or branched. Each of these radicals is preferably straight-chain and preferably has 1, 2, 3, 4, 5, 6, 7 or 8 C atoms and is accordingly preferably methyl, ethyl, n-propyl, n-butyl, n-pentyl, n-hexyl or n-heptyl.

In case alkyl means a branched alkyl group it preferably means 2-alkyl, 2-methylalkyl or 2-(2-ethyl)-alkyl, preferably 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy 4-methylhexyl, 2-hexyl, 2-octyl, 2-nonyl, 2-decyl and 2-dodecyl. Most preferred of these groups are 2-hexyl and 2-octyl.

Respective branched groups which lead to chiral compounds are also called chiral groups in this application. Particularly preferred chiral groups are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Throughout this application and especially for the definition of RD alkenyl means an alkenyl group, which may be straight-chain or branched and preferably is straight chain and preferably has 2, 3, 4, 5, 6 or 7 or 8 C atoms. Preferably it is vinyl, 1-E-alkenyl or 3-E-alkenyl, most preferably it is vinyl, 1-E-propenyl, 1-E-butenyl, 1-E-pentenyl, 3-butenyl order 3-E-pentenyl.

The compounds of the general formula PY, T and II to IX are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and are suitable for the said reactions. Use can be made here of variants which are known per se, but are not mentioned here in greater detail.

The compounds of formula Py may be synthesized as disclosed in EP 2137154 A2 and as in the synthesis examples.

The compounds of general formula T are preferably synthesized as disclosed in WO 2012/013281 A1.

The invention furthermore relates to a liquid-crystal display containing a liquid-crystalline medium according to the invention, in particular an IPS or FFS display, particularly preferably a FFS or SG-FFS display.

The invention furthermore relates to a liquid-crystal display of the IPS or FFS type comprising a liquid-crystal cell consisting of two substrates, where at least one substrate is transparent to light and at least one substrate has an electrode layer, and a layer, located between the substrates, of a liquid-crystalline medium comprising a polymerised component and a low-molecular-weight component, where the polymerised component is obtainable by polymerisation of one or more polymerisable compounds in the liquid-crystalline medium between the substrates of the liquid-crystal cell, preferably with application of an electrical voltage and where the low-molecular-weight component is a liquid-crystal mixture according to the invention as described above and below.

The displays in accordance with the present invention are preferably addressed by an active matrix (active matrix LCDs, AMDs for short), preferably by a matrix of thin-film transistors (TFTs). However, the liquid crystals according to the invention can also be used in an advantageous manner in displays having other known addressing means.

The invention furthermore relates to a process for the preparation of a liquid-crystalline medium according to the invention by mixing one or more compounds of formula Py or its subformulae with one or more low-molecular-weight liquid-crystalline compounds, or a liquid-crystal mixture and optionally with further liquid-crystalline compounds and/or additives.

The following meanings apply above and below:

The term "FFS" is, unless indicated otherwise, used to represent FFS and SG-FFS displays.

The term "mesogenic group" is known to the person skilled in the art and is described in the literature, and denotes a group which, due to the anisotropy of its attracting and repelling interactions, essentially contributes to causing a liquid-crystalline (LC) phase in low-molecular-weight or polymeric substances. Compounds containing mesogenic groups (mesogenic compounds) do not necessarily have to have a liquid-crystalline phase themselves. It is also possible for mesogenic compounds to exhibit liquid-crystalline phase behaviour only after mixing with other compounds and/or after polymerisation. Typical mesogenic groups are, for example, rigid rod- or disc-shaped units. An overview of the terms and definitions used in connection with mesogenic or liquid-crystalline compounds is given in Pure Appl. Chem. 73(5), 888 (2001) and C. Tschierske, G. Pelzl, S. Diele, Angew. Chem. 2004, 116, 6340-6368.

The term "spacer group" or "spacer" for short, also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

For the purposes of this invention, the term "liquid-crystalline medium" is intended to denote a medium which comprises a liquid-crystal mixture and one or more polymerisable compounds (such as, for example, reactive mesogens). The term "liquid-crystal mixture" (or "host mixture") is intended to denote a liquid-crystalline mixture which consists exclusively of unpolymerisable, low-molecular-weight compounds, preferably of two or more liquid-crystalline compounds and optionally further additives, such as, for example, chiral dopants or stabilisers.

Particular preference is given to liquid-crystal mixtures and liquid-crystalline media which have a nematic phase, in particular at room temperature.

In a preferred embodiment of the present invention, the liquid-crystal medium comprises one or more compounds, preferably having a dielectric anisotropy of greater than 20, selected from formula Py-A and more preferably from the group of the compounds of the formulae Py-1 to Py-5:

Py-A

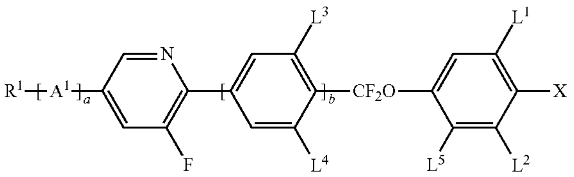

alternatively

Py-1

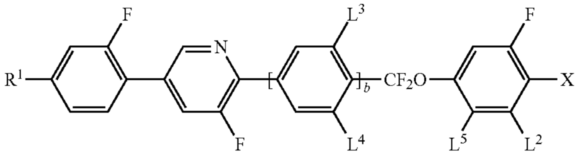

Py-2

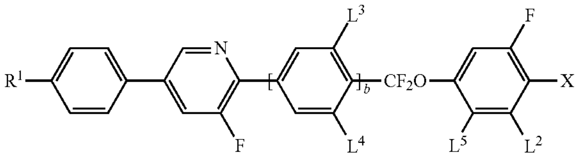

Py-3

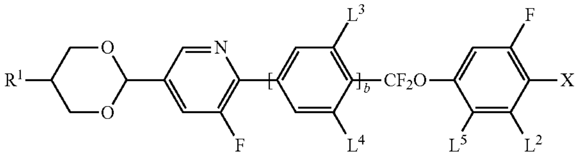

Py-4

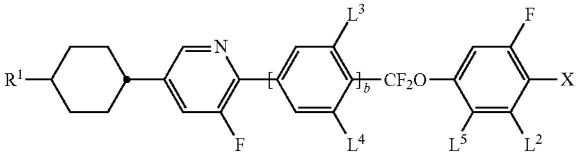

Py-5

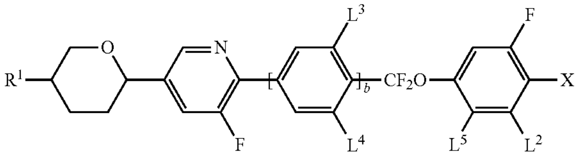

in which $R^1$ an alkyl radical having 1 to 15 C atoms, wherein one or more $CH_2$ groups, including terminal C atoms, in this radical may each be replaced, independently of one another, by —C≡C—, —CH=CH—,

, 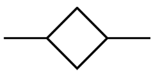,

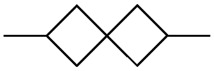, 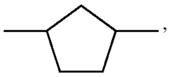,

—O—, —S—, —(CO)O—, —O—(CO)— in such a way that O or S atoms are not linked directly to one another, and in which, in addition, one or more H atoms may be replaced by F or Cl, or H, $A^1$ on each appearance, independently of one another, denotes

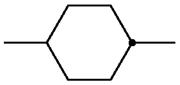, 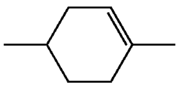,

-continued

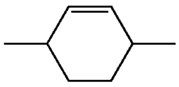 , 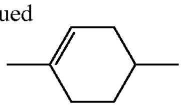 ,

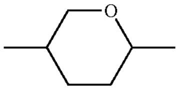 , 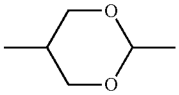 ,

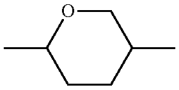 , 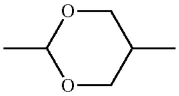 ,

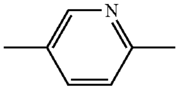 , 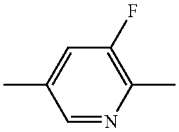 ,

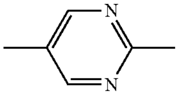 ,  ,

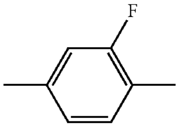 , 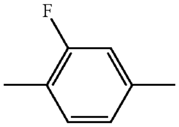 ,

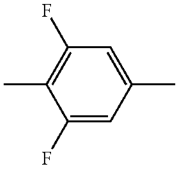 or 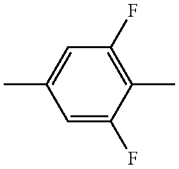 , preferably

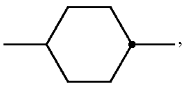 , 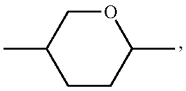 ,

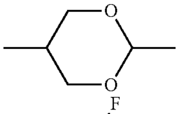 , 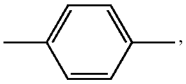 ,

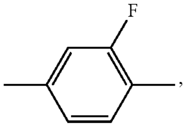 , 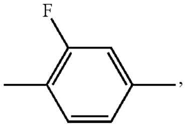 , or

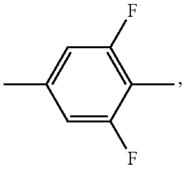 , $Z^1$ independently of one another, identically or differently, denotes a single bond, —$CH_2O$—, —(CO)O—, —$CF_2O$—, —$CH_2CH_2CF_2O$—, —$CF_2CF_2$—, —$CH_2CF_2$—, —$CH_2CH_2$—, —$(CH_2)_4$—, —CH═CH—, —CH═CF—, —CF═CF— or —C≡C—, where asymmetrical bridges may be oriented to both sides, $L^1$, $L^2$, $L^3$, $L^4$ independently H, F or Cl, $L^5$ H, $CH_3$ or $CH_2CH_3$, preferably H, X F, Cl, —$CF_3$, —$OCF_3$, —CN or —SCN, a denotes 0, 1 or 2, preferably 1, b denotes 0, 1 or 2, preferably 1, and where a+b is ≤3, is preferably equal to 1, 2 or 3, particularly preferably 1 or 2.

Particular preference is given here to compounds of formula Py or Py-A in which a+b is 1, 2 or 3. In particular, b is 1 and a is 1. The group $A^1$ here preferably denotes

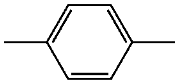 or 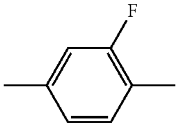 , particularly preferably

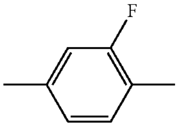 .

In the formulae Py, Py-A and Py-1 to Py-5 compounds are preferred, wherein independently:

b is 1, $L^2$ is F, $L^3$ is H or F, preferably F, and $L^4$ is F, $L^5$ is H, $R^1$ is an alkyl radical having 1 to 7 C atoms, wherein one or more $CH_2$ groups, including terminal C atoms, in this radical may each be replaced, independently of one another, by —C≡C—, —CH═CH—,

 , 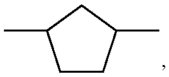 , or —O— in such a way that O atoms are not linked directly to one another, and in which, in addition, one or more H atoms may be replaced by F, preferably an alkyl radical having 2 to 7 C atoms.

In a preferred embodiment of the present invention, the liquid-crystal medium comprises one or more, preferably dielectrically positive, compounds, preferably having a dielectric anisotropy of greater than 3, selected from the group of the compounds of the formulae II-1 and II-2:

II-1

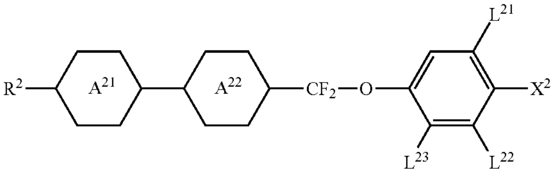

II-2

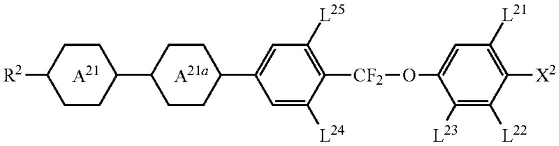

in which the parameters have the respective meanings indicated above under formula II, and $L^{24}$ and $L^{25}$, independently of one another, denote H or F, preferably $L^{24}$ denotes F, and

has one of the meanings given for

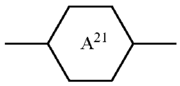

and, in the case of formulae II-1 and II-2, $X^2$ preferably denotes F or $OCF_3$, particularly preferably F, and, in the case of formula II-2,

and
, independently of one another, preferably denote

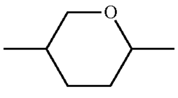
or
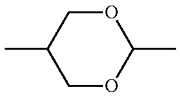
, and/or selected from the group of the compounds of the formulae III-1 and III-2:

III-1

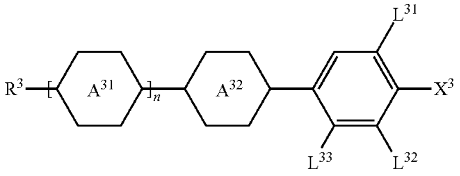

III-2

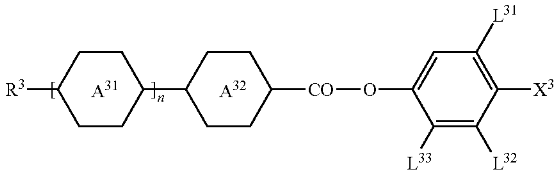

in which the parameters have the meanings given under formula III, and the media in accordance with the present invention may comprise, alternatively or in addition to the compounds of the formulae III-1 and/or III-2, one or more compounds of the formula III-3

III-3

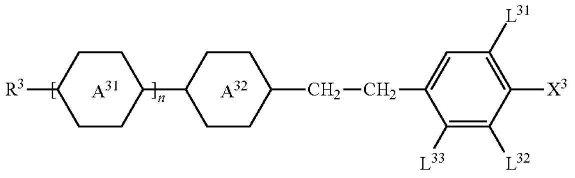

in which the parameters have the respective meanings indicated above, and the parameters $L^{31}$ and $L^{32}$, independently of one another and of the other parameters, denote H or F.

The liquid-crystal medium preferably comprises compounds selected from the group of the compounds of the formulae II-1 and II-2 in which $L^{21}$ and $L^{22}$ and/or $L^{24}$ and $L^{25}$ both denote F.

In a preferred embodiment, the liquid-crystal medium comprises compounds selected from the group of the compounds of the formulae II-1 and II-2 in which $L^{21}$, $L^{22}$, $L^{24}$ and $L^{25}$ all denote F.

The liquid-crystal medium preferably comprises one or more compounds of the formula II-1. The compounds of the formula II-1 are preferably selected from the group of the compounds of the formulae II-1a to I-1e, preferably one or more compounds of formulae II-1a and/or I-1b and/or II-1d, preferably of formula II-1a and/or II-1d or II-1b and/or II-1d, most preferably of formula II-1d:

II-1a

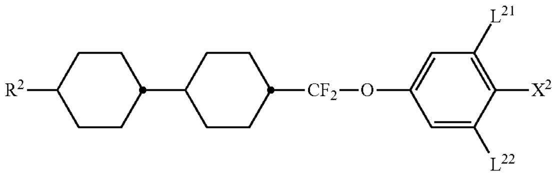

II-1b

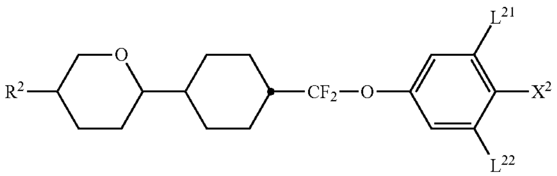

II-1c

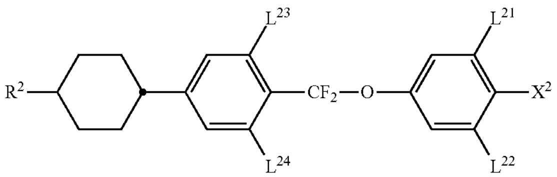

II-1d

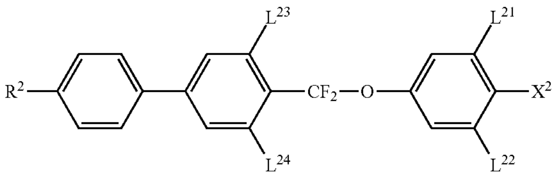

-continued

II-1e

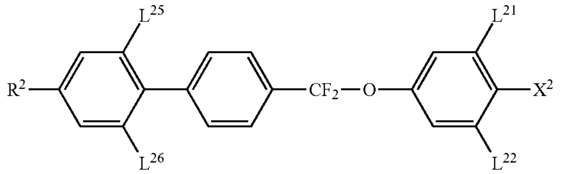

in which the parameters have the respective meanings indicated above, and $L^{25}$ and $L^{26}$, independently of one another and of the other parameters, denote H or F, and preferably in the formulae II-1a and II-1b, $L^{21}$ and $L^{22}$ both denote F, in the formulae II-1c and II-1d, $L^{21}$ and $L^{22}$ both denote F and/or $L^{23}$ and $L^{24}$ both denote F, and in formula II-1e, $L^{21}$, $L^{22}$ and $L^{23}$ denote F and wherein the respective rings, and preferably the phenylene rings, optionally may each be substituted by one or two alkyl groups, preferably by methyl and/or ethyl groups, preferably by one methyl group.

The liquid-crystal medium preferably comprises one or more compounds of the formula II-2, which are preferably selected from the group of the compounds of the formulae II-2a to II-2k, preferably one or more compounds each of formulae II-2a and/or II-2h and/or II-2j:

II-2a

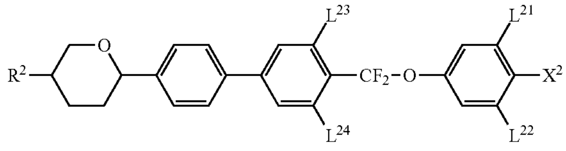

II-2b

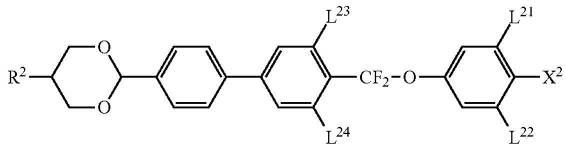

II-2c

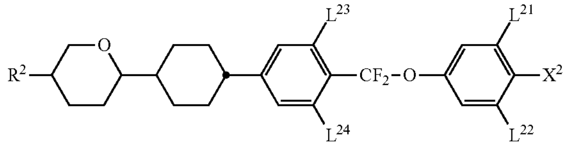

II-2d

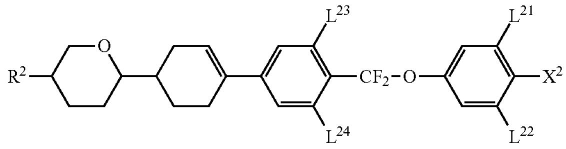

II-2e

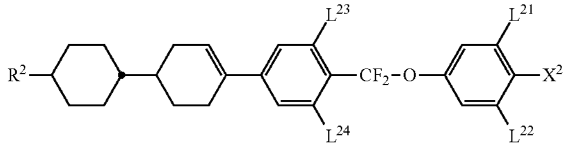

-continued

II-2f

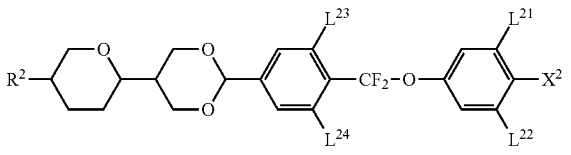

II-2g

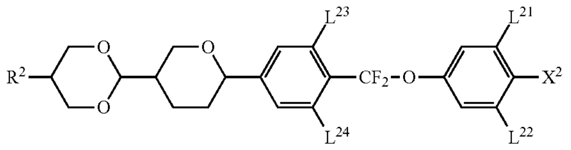

II-2h

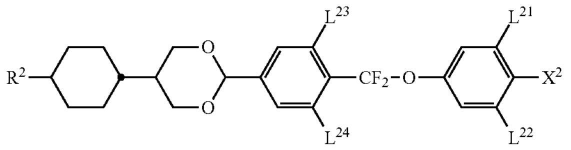

II-2i

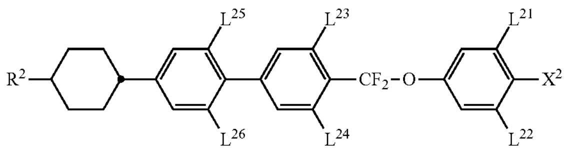

II-2j

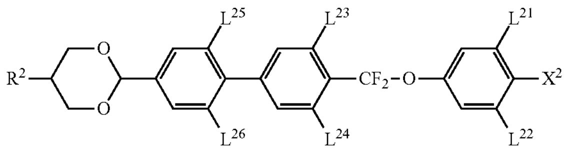

II-2k

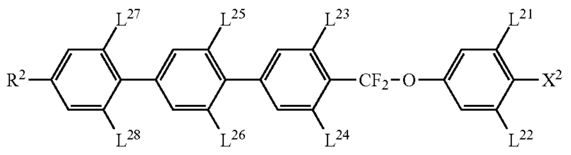

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H, and wherein the respective rings, and preferably the phenylene rings, optionally may each be substituted by one or two alkyl groups, preferably by methyl and/or ethyl groups, preferably by one methyl group.

The liquid-crystal medium preferably comprises compounds selected from the group of the compounds of the formulae II-2a to II-2k in which $L^{21}$ and $L^{22}$ both denote F and/or $L^{23}$ and $L^{24}$ both denote F.

In a preferred embodiment, the liquid-crystal medium comprises compounds selected from the group of the compounds of the formulae II-2a to II-2k in which $L^{21}$, $L^{22}$, $L^{23}$ and $L^{24}$ all denote F.

Especially preferred compounds of the formula II-2 are the compounds of the following formulae, particularly preferred of formulae II-2a-1 and/or II-2h-1 and/or II-2k-2:

II-2a-1

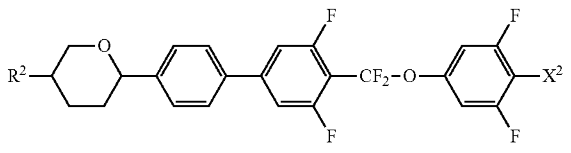

II-2a-2

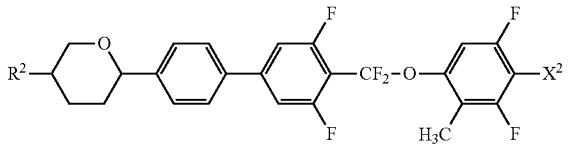

II-2c-1

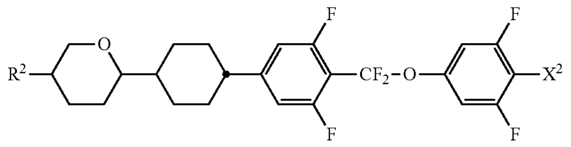

II-2d-1

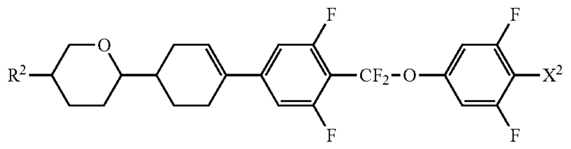

II-2e-1

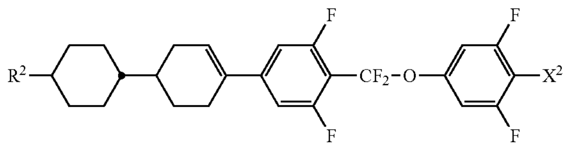

II-2f-1

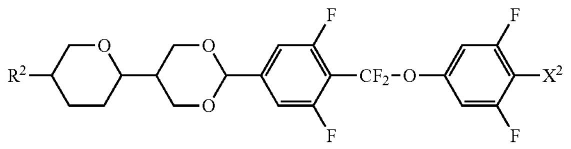

II-2h-1

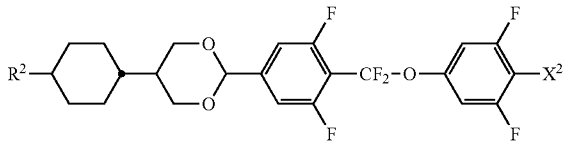

II-2i-1

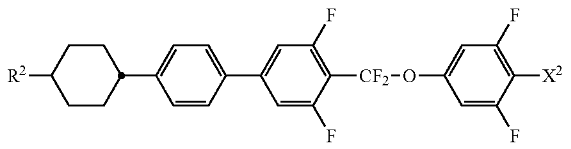

II-2i-2

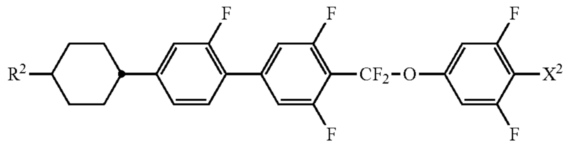

-continued

II-2j-1

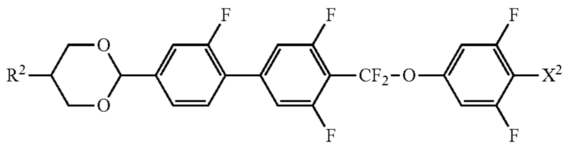

II-2k-1

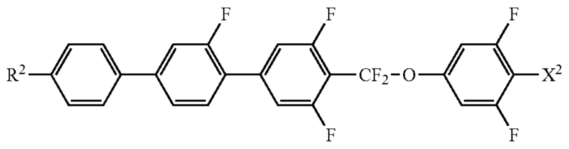

II-2k-2

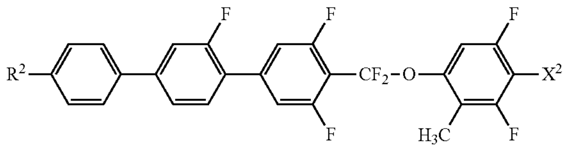

II-2k-2

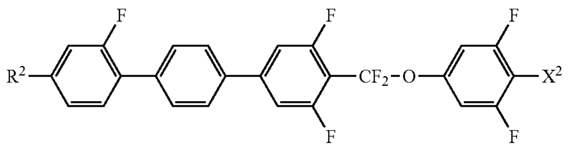

in which $R^2$ and $X^2$ have the meanings indicated above, and $X^2$ preferably denotes F.

The liquid-crystal medium preferably comprises one or more compounds of the formula III-1. The compounds of the formula III-1 are preferably selected from the group of the compounds of the formulae III-1a to III-1j, preferably from formulae III-1d, III-1g, III-1h, III-1j, III-1 k and III-1m:

III-1a

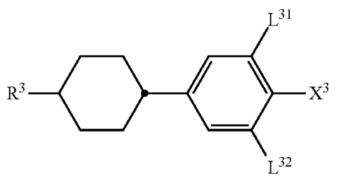

III-1b

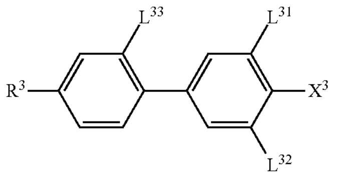

III-1c

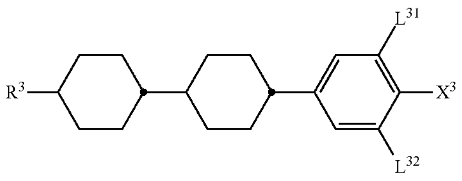

-continued

III-1d

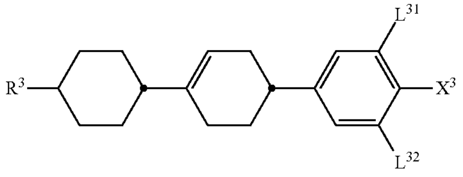

III-1e

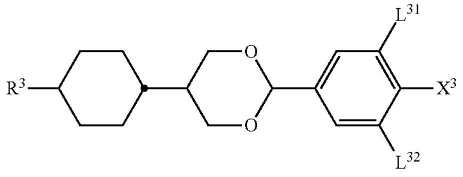

III-1f

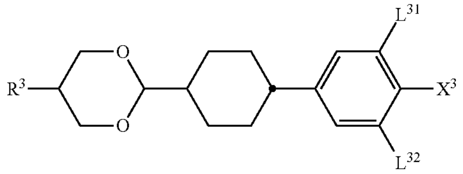

III-1g

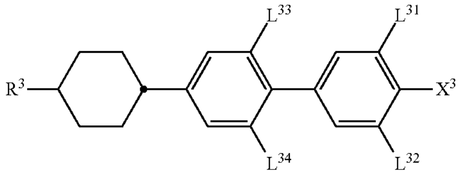

III-1h

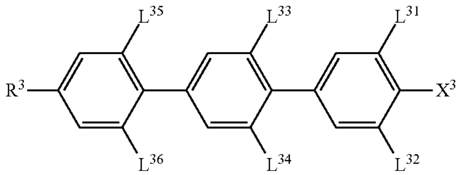

III-1i

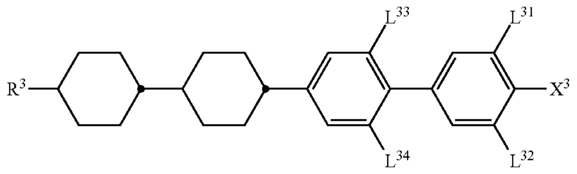

III-1j

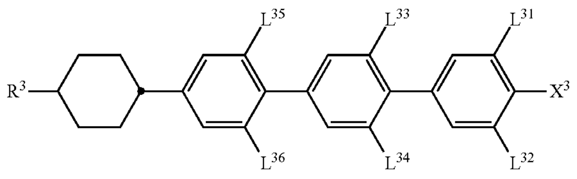

III-1k

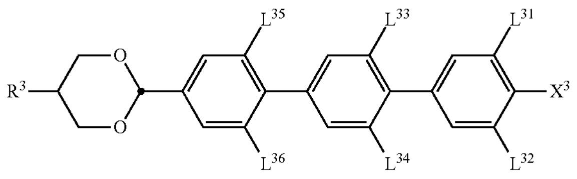

-continued

III-1m

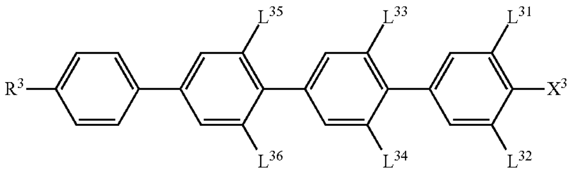

in which the parameters have the meanings given above and preferably in which $X^3$ denotes F, Cl, halogenated alkyl or alkoxy having 1 to 3 C atoms or halogenated alkenyl or alkenyloxy having 2 or 3 C atoms, F, Cl, $—OCF_3$, $—OCHF_2$, $—O—CH_2CF_3$, $—O—CH{=}CF_2$, $—O—CH{=}CH_2$ or $—CF_3$, preferably denotes F, $—OCF_3$, or $—CF_3$, $L^{33}$ and $L^{34}$, independently of one another, denote H or F, $L^{35}$ and $L^{36}$, independently of one another, denote H or F, preferably H.

The liquid-crystal medium preferably comprises one or more compounds of the formula III-1c, which are preferably selected from the group of the compounds of the formulae III-1c-1 to III-1c-5, preferably of formulae III-1c-1 and/or III-1c-2, most preferably of formula III-1c-1:

III-1c-1

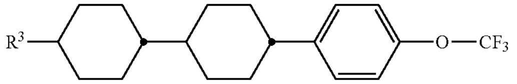

III-1c-2

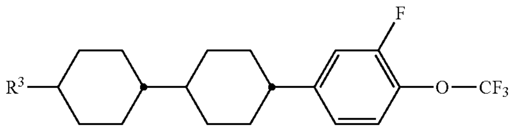

III-1c-3

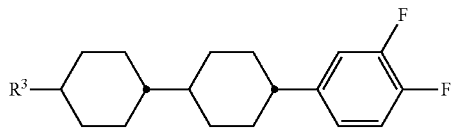

III-1c-4

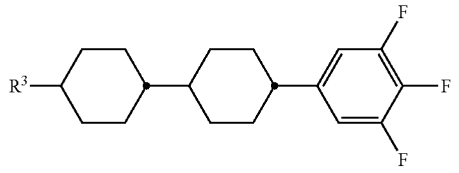

III-1c-5

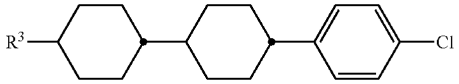

in which $R^3$ has the meaning indicated above and wherein the respective rings, and preferably the phenylene rings, optionally may each be substituted by one or two alkyl groups, preferably by methyl and/or ethyl groups, preferably by one methyl group.

The liquid-crystal medium preferably comprises one or more compounds of the formula III-1d, which are preferably selected from the group of the compounds of the formulae III-1d-1 to III-1d-2, preferably of formulae III-1d-1:

III-1d-1

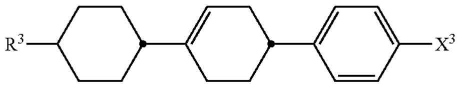

III-1d-2

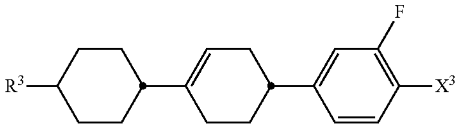

in which $R^3$ is defined as above, and $X^3$ is $CF_3$, F or $OCF_3$, preferably $CF_3$.

The liquid-crystal medium preferably comprises one or more compounds of the formula III-1f, which are preferably selected from the group of the compounds of the formulae III-1g-1 to III-1g-6, preferably of formulae III-1f-1 and/or III-1g-2 and/or III-1g-3 and/or III-1g-6, more preferably of formula III-1g-3 and/or III-1g-6, more preferably of formula III-1g-6:

III-1g-1

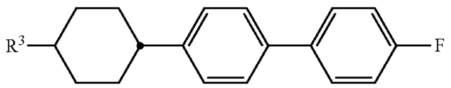

III-1g-2

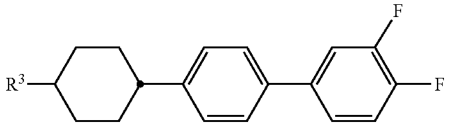

III-1g-3

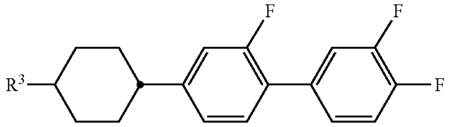

III-1g-4

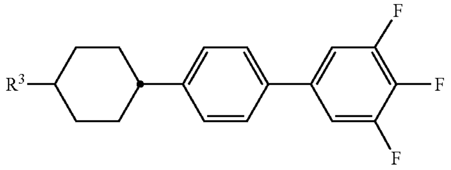

III-1g-5

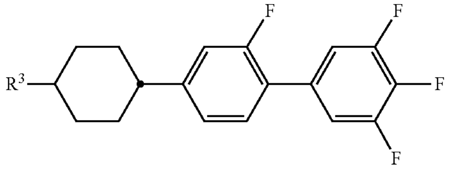

III-1g-6

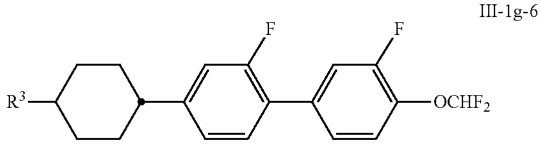

in which $R^3$ has the meaning indicated above and wherein the respective rings, and preferably the phenylene rings, optionally may each be substituted by one or two alkyl groups, preferably by methyl and/or ethyl groups, preferably by one methyl group.

The liquid-crystal medium preferably comprises one or more compounds of the formula III-1g, which are preferably selected from the group of the compounds of the formulae III-1 h-1 to III-1 h-5, preferably of formula III-1 h-3:

III-1h-1

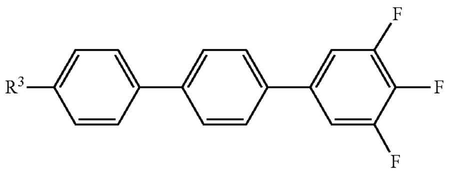

III-1h-2

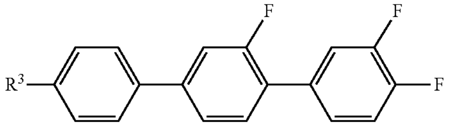

III-1h-3

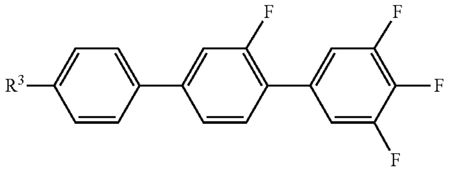

III-1h-4

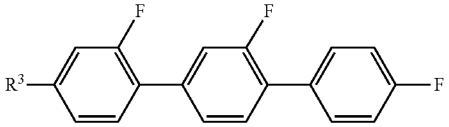

III-1h-5

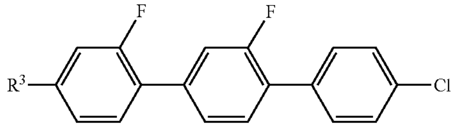

in which $R^3$ has the meaning indicated above and wherein the respective rings, and preferably the phenylene rings, optionally may each be substituted by one or two alkyl groups, preferably by methyl and/or ethyl groups, preferably by one methyl group.

The liquid-crystal medium preferably comprises one or more compounds selected from the formulae III-1j, III-1k and III-1m, which are preferably selected from the group of the compounds of the formulae III-1j-1, III-1k-1, III-1m-1, preferably of the formula III-1i-1:

III-1j-1

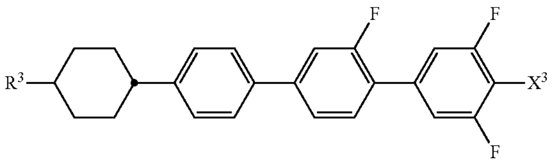

-continued

III-1k-1

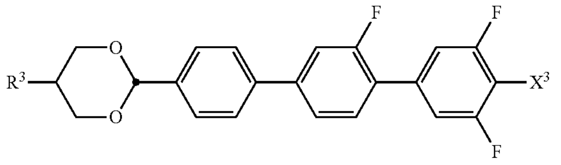

III-1m-1

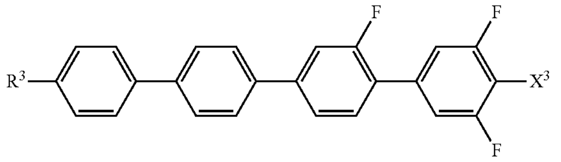

in which the parameters have the meanings given above, and $X^3$ preferably denotes F or $—OCF_3$.

The liquid-crystal medium preferably comprises one or more compounds of the formula III-1 k, which are preferably selected from the group of the compounds of the formulae III-1m-1 and III-1m-2, preferably of the formula III-1m-1:

III-1m-1

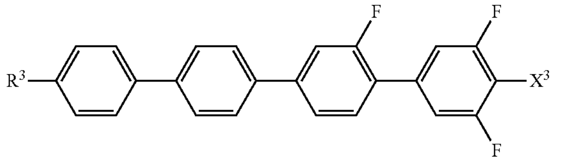

III-1m-2

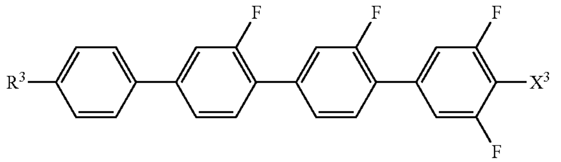

in which the parameters have the meanings given above and wherein the respective rings, and preferably the phenylene rings, optionally may each be substituted by one or two alkyl groups, preferably by methyl and/or ethyl groups, preferably by one methyl group.

The liquid-crystalline media in accordance with the present invention preferably comprise one or more dielectrically neutral compounds having a dielectric anisotropy in the range from −1.5 to 3, preferably selected from the group of the compounds of the formulae VI, VII, VIII and IX.

In the present application, the elements all include their respective isotopes. In particular, one or more H in the compounds may be replaced by D, and this is also particularly preferred in some embodiments. An increased degree of deuteration of the corresponding compounds enables, for example, detection and recognition of the compounds.

In the present application, alkyl particularly preferably denotes straight-chain alkyl, in particular $CH_3—$, $C_2H_5—$, $n-C_3H_7—$, $n-C_4H_9—$ or $n-C_{51}H_{11}—$, and alkenyl particularly preferably denotes $CH_2{=}CH—$, $E-CH_3—CH{=}CH—$, $CH_2{=}CH—CH_2—CH_2—$, $E-CH_3—CH{=}CH—CH_2—CH_2—$ or $E-(n-C_3H_7)—CH{=}CH—$.

In a preferred embodiment of the present invention, the media according to the invention in each case comprise one or more compounds of formula VI selected from the group of the compounds of the formulae VI-1 to VI-4, preferably one or more compounds each of formula VI-2,

VI-1

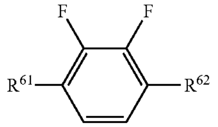

VI-2

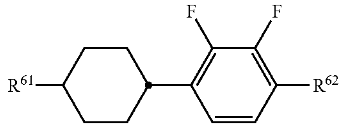

VI-3

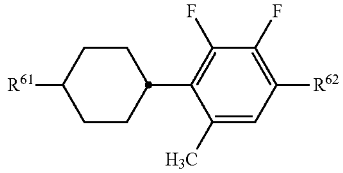

VI-4

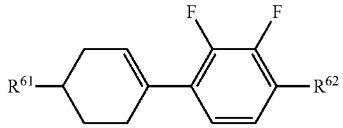

in which the parameters have the respective meanings given above under formula VI, and preferably in formula VI-1

$R^{61}$ and $R^{62}$ independently of each other denote methoxy, ethoxy, propoxy, butoxy (also or pentoxy, preferably ethoxy, butoxy or pentoxy, more preferably ethoxy or butoxy and, most preferably butoxy.

in formula VI-2

$R^{61}$ preferably denotes vinyl, 1-E-propenyl, but-4-en-1-yl, pent-1-en-1-yl or pent-3-en-1-yl and n-propyl or n-pentyl and $R^{62}$ denotes an unsubstituted alkyl radical having 1 to 7 C atoms, preferably having 2 to 5 C atoms, or, preferably, an unsubstituted alkoxy radical having 1 to 6 C atoms, particularly preferably having 2 or 4 C atoms and, most preferably, ethoxy.

In a preferred embodiment of the present invention, the media according to the invention in each case comprise one or more compounds of formula VII selected from the group of the compounds of the formulae VII-1 to VII-3, preferably one or more compounds each of the formulae VII-1 and one or more compounds of formula VII-2,

VII-1

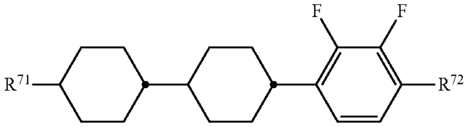

-continued

VII-2

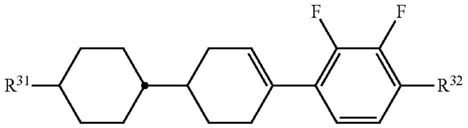

VII-3

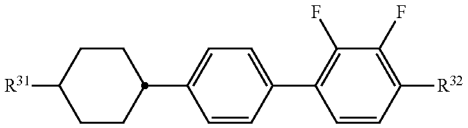

in which the parameters have the respective meanings given above under formula VII, and preferably $R^{71}$ denotes vinyl, 1-E-propenyl, but-4-en-1-yl, pent-1-en-1-yl or pent-3-en-1-yl, n-propyl or n-pentyl and $R^{72}$ denotes an unsubstituted alkyl radical having 1 to 7 C atoms, preferably having 2 to 5 C atoms, or, preferably, an unsubstituted alkoxy radical having 1 to 6 C atoms, particularly preferably having 2 or 4 C atoms and, most preferably, ethoxy, and wherein the respective rings, and preferably the phenylene rings, optionally may each be substituted by one or two alkyl groups, preferably by methyl and/or ethyl groups, preferably by one methyl group.

In a preferred embodiment of the present invention, the media according to the invention in each case comprise one or more compounds of formula VI-1 selected from the group of the following compounds:

VI-1a

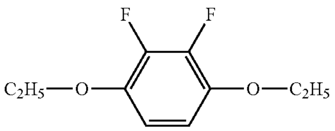

VI-1b

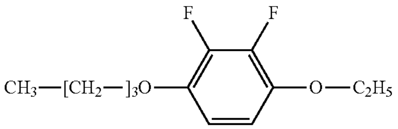

VI-1c

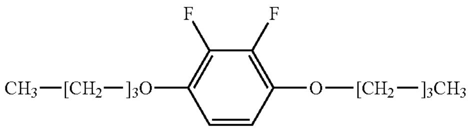

In a preferred embodiment of the present invention, the media according to the invention in each case comprise one or more compounds of formula VI-2 selected from the group of the following compounds:

VI-2a

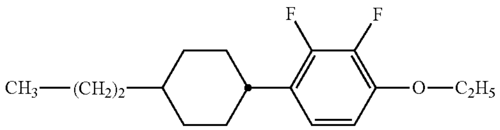

-continued

VI-2b

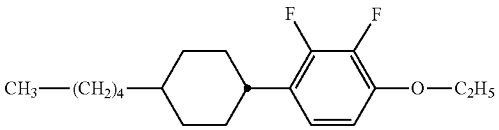

In a preferred embodiment of the present invention, the media according to the invention in each case comprise one or more compounds of formula VII-1 selected from the group of the following compounds:

VII-1a

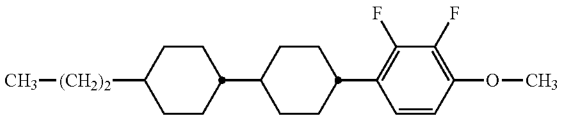

VII-1b

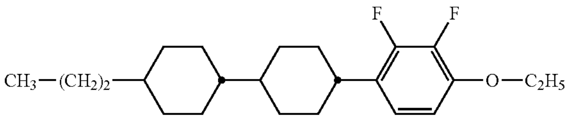

VII-1c

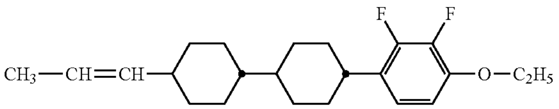

In a preferred embodiment of the present invention, the media according to the invention in each case comprise one or more compounds of formula VII-2 selected from the group of the following compounds:

VII-2a

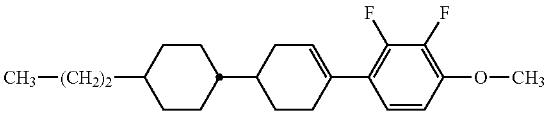

VII-2b

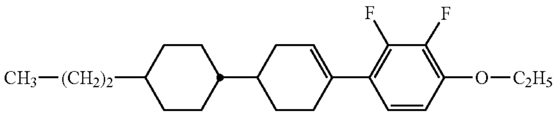

VII-2c

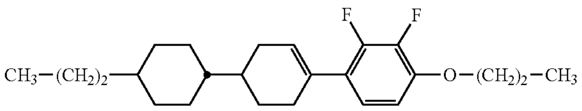

In addition to the compounds of formula Py or the preferred sub-formulae thereof, the media in accordance with the present invention may comprise one or more dielectrically negative compounds selected from the group of compounds of the formulae VI and VII preferably in a total concentration in the range from 5% or more to 90% or less, preferably from 10% or more to 80% or less, particularly preferably from 20% or more to 70% or less.

In a preferred embodiment of the present invention, the media according to the invention in each case comprise one or more compounds of formula VIII selected from the group of the compounds of the formulae VIII-1 to VIII-3, preferably one or more compounds each of the formulae VIII-1 and/or one or more compounds of formula VIII-3,

VIII-1

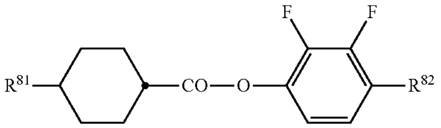

VIII-2

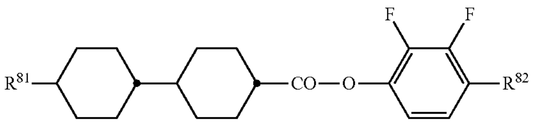

VIII-3

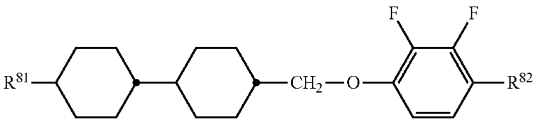

in which the parameters have the respective meanings given above under formula VIII, and preferably $R^{81}$ denotes vinyl, 1-E-propenyl, but-4-en-1-yl, pent-1-en-1-yl or pent-3-en-1-yl, ethyl, n-propyl or n-pentyl, alkyl, preferably ethyl, n-propyl or n-pentyl and $R^{82}$ denotes an unsubstituted alkyl radical having 1 to 7 C atoms, preferably having 1 to 5 C atoms or an unsubstituted alkoxy radical having 1 to 6 C atoms.

In formulae VIII-1 and VIII-2 $R^{82}$ denotes preferably alkoxy having 2 or 4 C atoms and, most preferably, ethoxy and in formula VIII-3 it denotes preferably alky, preferably methyl, ethyl or n-propyl, most preferably methyl.

In a further preferred embodiment, the medium comprises one or more compounds of formula IV, preferably of formula IVa IVa

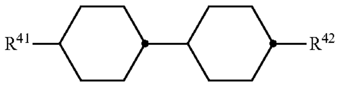

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms, an unsubstituted alkenyl radical having 2 to 7 C atoms, or an unsubstituted alkoxy radical having 1 to 6 C atoms, both preferably having 2 to 5 C atoms, an unsubstituted alkenyl radical preferably having 2, 3 or 4 C atoms, more preferably a vinyl radical or 1-propenyl radical and in particular a vinyl radical.

In a particularly preferred embodiment, the medium comprises one or more compounds of formula IV selected from the group of the compounds of the formulae IV-1 to IV-4, preferably of formula IV-1,

IV-1

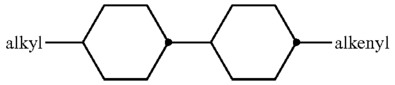

IV-2

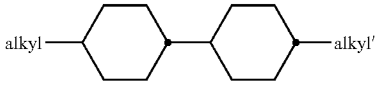

IV-3

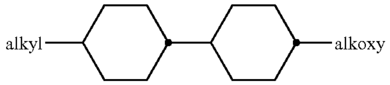

IV-4

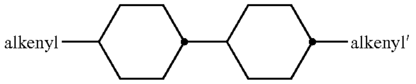

in which alkyl and alkyl', independently of one another, denote alkyl having 1 to 7 C atoms, preferably having 2 to 5 C atoms, alkenyl and alkenyl', independently of one another, denote alkenyl having 2 to 5 C atoms, preferably having 2 to 4 C atoms, particularly preferably 2 C atoms, alkenyl' preferably denotes alkenyl having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

In a particularly preferred embodiment, the media according to the invention comprise one or more compounds of formula IV-1 and/or one or more compounds of formula IV-2.

In a further preferred embodiment, the medium comprises one or more compounds of formula V.

In a further preferred embodiment the medium comprises one or more compounds of formula XI are selected from the group of compounds of formulae XI-1 and XI-2:

XI-1

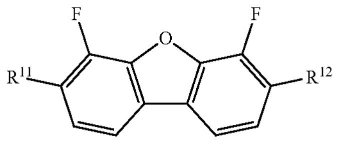

XI-2

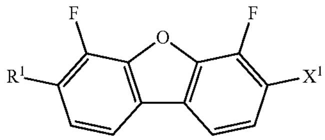

in which $R^{11}$ and $R^{12}$ independently of each other denote alkyl, alkoxy, fluorinated alkyl or fluorinated alkoxy, preferably having 1 to 7 C atoms wherein one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl having 2 to 7 C atoms and preferably alkyl, alkoxy, alkenyl or alkenyloxy, most preferably alkoxy or alkenyloxy, $R^1$ denotes alkyl, alkoxy, fluorinated alkyl or fluorinated alkoxy, preferably having 1 to 7 C atoms, wherein one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl having 2 to 7 C atoms and preferably alkyl or alkenyl, and $X^1$ denotes F, Cl, CN, NCS, fluorinated alkyl, fluorinated alkenyl, fluorinated alkoxy or fluorinated alkenlyoxy, the latter four groups preferably having 1 to 4 C atoms, preferably F, Cl, $CF_3$ or $OCF_3$, more preferably F, $CF_3$ or $OCF_3$ and, most preferably, $CF_3$ or $OCF_3$.

The media according to the invention preferably comprise the following compounds in the total concentrations indicated:

one or more compounds of formula H, in particular of formula H-1, especially H-1-1, optionally one or more compounds of formula ST, in particular of formula ST-15 and or ST-18 and 0-30% by weight of one or more compounds selected from the group of the compounds of formula Py and 0-60% by weight of one or more compounds of formula II, preferably selected from the group of the compounds of the formulae II-1 and II-2 and/or 0-60% by weight of one or more compounds of formula III, and/or 0-80% by weight of one or more compounds of formula IV, and/or 0-50% by weight of one or more compounds of formula V, and/or 0-20% by weight of one or more compounds of formula VI, and/or 0-20% by weight of one or more compounds of formula VII, and/or 0-20% by weight of one or more compounds of formula VIII, preferably selected from the group of the compounds of the formulae VIII-1 and VIII-2 and/or 0-20% by weight of one or more compounds of formula IX, and/or 0-30% by weight of one or more compounds selected from the group of the compounds of formula X.

The latter condition holds for all media according to the present application.

The medium according to the invention in a particularly preferred embodiment comprises one or more compounds of formula I in a total concentration in the range from 1% or more to 40% or less, preferably in the range from 5% or more to 25% or less, and one or more compounds of formula H, in particular of formula H-1, especially H-1-1, in a total concentration in the range from 10 ppm to 3000 ppm, preferably 50 ppm to 2000 ppm and very particularly preferably 100 to 1000 ppm of compounds of the formula H, and one or more compounds of formula ST, in particular of formula ST-15 and or ST-18, in a total concentration in the range from 10 ppm to 3000 ppm, preferably 50 ppm to 2000 ppm and very particularly preferably 100 to 1000 ppm of compounds of the formula H, and/or one or more compounds of formula II in a total concentration in the range from 5% or more to 50% or less, preferably in the range from 10% or more to 40% or less, and/or one or more compounds of formula VII-1 in a total concentration in the range from 5% or more to 30% or less, and/or one or more compounds of formula VII-2 in a total concentration in the range from 3% or more to 30% or less and/or one or more compounds of formula XI in a total concentration in the range from 3% or more to 50% or less, preferably in the range from 5% or more to 30% or less, and/or one or more compounds of formula X in a total concentration in the range from 3% or more to 50% or less, preferably in the range from 5% or more to 30% or less.

Preferably the concentration of the compounds of formula Py in the media according to the invention is in the range from 1% or more to 20% or less, more preferably from 1.5% or more to 20% or less, most preferably from 2% or more to 10% or less.

In a preferred embodiment of the present invention the concentration of the compounds of formula II in the media is in the range from 3% or more to 60% or less, more preferably from 5% or more to 55% or less, more preferably from 10% or more to 50% or less and, most preferably, from 15% or more to 45% or less.

In a preferred embodiment of the present invention the concentration of the compounds of formula VII in the media is in the range from 2% or more to 50% or less, more preferably from 5% or more to 40% or less, more preferably from 10% or more to 35% or less and, most preferably, from 15% or more to 30% or less.

The present invention also relates to electro-optical displays or electrooptical components which contain liquid-crystalline media according to the invention. Preference is given to electro-optical displays which are based on the FFS, IPS, VA or ECB effect, preferably on the IPS or FFS effect, and in particular those which are addressed by means of an active-matrix addressing device.

Accordingly, the present invention likewise relates to the use of a liquid-crystalline medium according to the invention in an electro-optical display or in an electro-optical component, and to a process for the preparation of the liquid-crystalline media according to the invention, characterised in that one or more compounds of formula I are mixed with one or more compounds of formula H.

In a further preferred embodiment, the medium comprises one or more compounds of formula IV, selected from the group of the compounds of the formulae IV-2 and IV-3,

IV-2

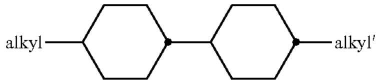

IV-3

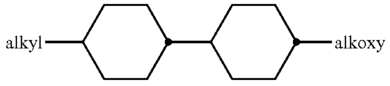

in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms.

In a further preferred embodiment, the medium comprises one or more compounds of formula V selected from the group of the compounds of the formulae V-1 to V-5, preferably one or more of formula V-3, V-4 and V-5,

V-1

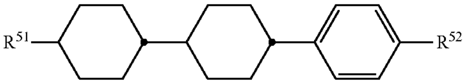

V-2

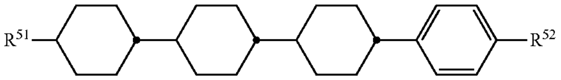

V-3

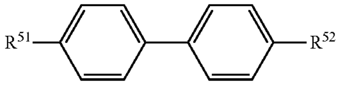

V-4

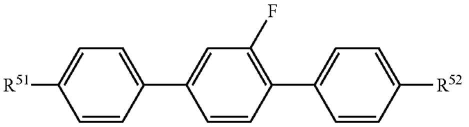

V-5

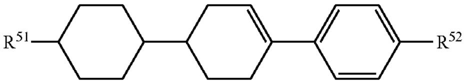

in which the parameters have the meanings given above under formula V, and preferably $R^{51}$ denotes alkyl having 1 to 7 C atoms or alkenyl having 2 to 7 C atoms, and $R^{52}$ denotes alkyl having 1 to 7 C atoms, alkenyl having 2 to 7 C atoms or alkoxy having 1 to 6 C atoms, preferably alkyl or alkenyl.

In a further preferred embodiment the medium contains one or more compounds of the formula V-3 in which at least one of the $R^{51}$ and $R^{52}$ radicals is alkenyl having 2 to 6 carbon atoms, preferably those selected from the following formulae:

V-3a

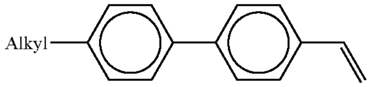

V-3b

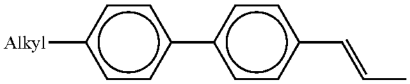

V-3c

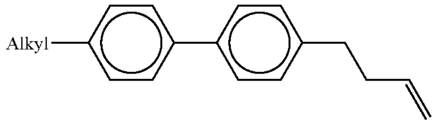

V-3d

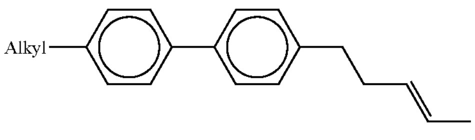

in which "Alkyl" has the definition given above, and is preferably methyl or ethyl. Particular preference is given to compounds of the formula V-3d.

In a further preferred embodiment, the medium comprises one or more compounds of formula V-4 selected from the group of the compounds of the formulae V-4a to V-4c, V-4a

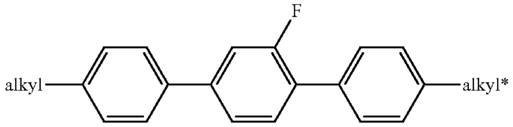

V-4b

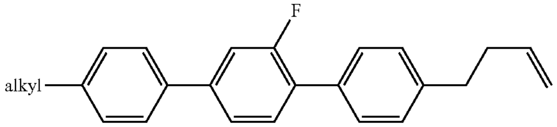

V-4c

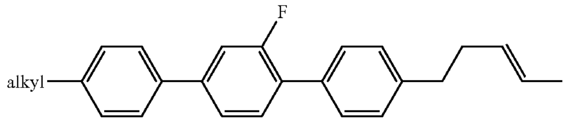

in which alkyl and alkyl* are each independently straight-chain alkyl radical having 1 to 6 carbon atoms, especially methyl, ethyl, n-propyl and pentyl.

The liquid crystalline medium preferably comprises two, three or more compounds selected from the group of compounds of formulae V-4a, V-4b and V-4c.

In a further preferred embodiment, the medium comprises one or more compounds of formula V-5 selected from the group of the compounds of the formulae V-5a to V-5c, preferably V-5a:

V-5a

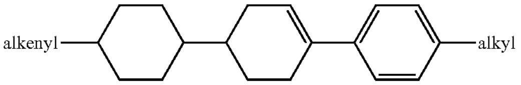

V-5b

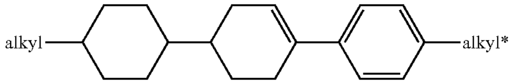

V-5c

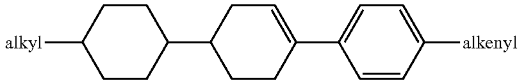

in which alkyl and alkyl* are each independently straight-chain alkyl radical having 1 to 6 carbon atoms, especially methyl, ethyl or n-propyl, and alkenyl preferably denotes alkenyl having 2 to 5 C atoms, preferably having 2 to 4 C atoms, particularly preferably vinyl.

Besides compounds of the formulae I, H, II to IX, L and X, other constituents may also be present, for example in an amount of up to 45%, but preferably up to 35%, in particular up to 10%, of the mixture as a whole.

The media according to the invention may optionally also comprise dielectrically negative compounds, whose total concentration is preferably 20% or less, more preferably 10% or less, based on the entire medium.

In a preferred embodiment, the liquid-crystal media according to the invention comprise in total, based on the mixture as a whole, a total concentration in the range from 10 ppm to 3000 ppm, preferably 50 ppm to 2000 ppm and very particularly preferably 100 to 1000 ppm of compounds of the formula H, and 1% or more to 35% or less, preferably 2% or more to 30% or less, particularly preferably 5% or more to 25% or less, of the compound of formula I, and in total 10 ppm to 3000 ppm, preferably 50 ppm to 2000 ppm and very particularly preferably 100 to 1000 ppm of compounds of the formula ST, and/or 3% or more to 50% or less, preferably 4% or more to 45% or less, particularly preferably 5% or more to 40% or less, of compounds of formulae II and/or III, and/or 40% or more to 70% or less, preferably 50% or more to 65% or less, particularly preferably 55% or more to 65% or less, of compounds of formulae IV and/or V, and/or 0% or more to 30% or less 0% or more to 20% or less, preferably 0% or more to 15% or less of compounds of the formulae VI and/or VII and/or VIII and/or IX.

The liquid-crystal media in accordance with the present invention may comprise one or more chiral compounds.

Particularly preferred embodiments of the present invention meet one or more of the following conditions, where the acronyms (abbreviations) are explained in Tables A to C.

Preferably the media according to the present invention comprise one or more compounds of formula I and one or more compounds of formula H and fulfil one or more of the following conditions.

i. The liquid-crystalline medium has a birefringence of 0.060 or more, particularly preferably 0.070 or more.
ii. The liquid-crystalline medium has a birefringence of 0.200 or less, particularly preferably 0.180 or less.
iii. The liquid-crystalline medium has a birefringence in the range from 0.090 or more to 0.180 or less.
iv. The total concentration of the compounds of formula II in the mixture as a whole is 0.5% or more, preferably 1% or more, and preferably 14% or less, particularly preferably 9% or less, and very particularly preferably in the range from 1% or more to 6% or less.
v. The liquid-crystalline medium comprises one or more compounds of formula IV selected from the group of the compounds of the following formulae: CC-n-V and/or CC-n-Vm and/or CC-V-V and/or CC-V-Vn and/or CC-nV-Vn, particularly preferably CC-3-V, preferably in a concentration of up to 60% or less, particularly preferably up to 50% or less, and optionally additionally to CC-3-V the compound(s) CC-3-V1, preferably in a concentration of up to 15% or less, and/or CC-3-2V1, preferably in a concentration of up to 15% or less, and/or CC-4-V, preferably in a concentration of up to 40% or less, particularly preferably up to 30% or less.
vi. The media comprise the compound of formula CC-n-V, preferably CC-3-V, preferably in a concentration of 1% or more to 60% or less, more preferably in a concentration of 20% or more to 55% or less.
vii. The liquid-crystalline medium comprises one or more compounds of formula IV, preferably of the formulae IV-1 and/or IV-2, preferably in a total concentration of 20% or more, in particular 30% or more, and very particularly preferably 40% or more, and is preferably in the range from 46% to 55% of compounds of formula IV-1.
viii. The total concentration of the compounds of formula V in the mixture as a whole is 15% or more, preferably 20% or more, and is preferably in the range from 15% or more to 40% or less, particularly preferably in the range from 20% or more to 30% or less.
ix. The total concentration of the compounds of formula V-3 in the mixture as a whole preferably is 5% or more to 25% or less, preferably 5% or more to 15% or less.
x. The total concentration of the compounds of formula V-4, preferably V-4a to V-4c, in the mixture as a whole preferably is 3% or more to 30% or less, preferably 10% or more to 25% or less.
xi. The total concentration of the compounds selected from formula V-5, preferably V-5-a, and III-1d, preferably III-1d-1, in the mixture as a whole preferably is 2% or more to 20% or less, preferably 4% or more to 15% or less.

The invention furthermore relates to an electro-optical display having active-matrix addressing based on the IPS, FFS or UB-FFS effect, characterised in that it contains, as dielectric, a liquid-crystalline medium in accordance with the present invention.

The liquid-crystal mixture preferably has a nematic phase range having a width of at least 70 degrees.

The rotational viscosity $\gamma_1$ is preferably 350 mPa·s or less, preferably 250 mPa·s or less and, in particular, 150 mPa·s or less.

The mixtures according to the invention are suitable for all IPS and FFS-TFT applications using dielectrically positive liquid crystalline media, such as, e.g. XB-FFS.

The liquid-crystalline media according to the invention preferably virtually completely consist of 4 to 15, in particular 5 to 12, and particularly preferably 10 or less, compounds. These are preferably selected from the group of the compounds of the formulae Py, T, II, III, IV, V, VI, VII, VIII and IX.

The liquid-crystalline media according to the invention may optionally also comprise more than 18 compounds. In this case, they preferably comprise 18 to 25 compounds.

In a preferred embodiment, the liquid-crystal media according to the invention predominantly comprise, preferably essentially consist of and, most preferably, virtually completely consist of compounds, which do not comprise a cyano group.

In a preferred embodiment, the liquid-crystal media according to the invention comprise compounds selected from the group of the compounds of the formulae I, H, II, III, and IV and V, preferably selected from the group of the compounds of the formulae I, H, II-1, II-2, III-1, III-2, IV, and V; they preferably consist predominantly, particularly preferably essentially and very particularly preferably virtually completely of the compounds of the said formulae.

The liquid-crystal media according to the invention preferably have a nematic phase from in each case at least −10° C. or less to 70° C. or more, particularly preferably from −20° C. or less to 80° C. or more, very particularly preferably from −30° C. or less to 85° C. or more and most preferably from −40° C. or less to 90° C. or more.

The expression "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1,000 h or more, the medium is regarded as stable at this temperature. At temperatures of −30° C. and −40° C., the corresponding times are 500 h and 250 h respectively. At high temperatures, the clearing point is measured in capillaries by conventional methods.

In a preferred embodiment, the liquid-crystal media according to the invention are characterised by optical anisotropy values in the moderate to low range. The birefringence values are preferably in the range from 0.075 or more to 0.130 or less, particularly preferably in the range from 0.085 or more to 0.120 or less and very particularly preferably in the range from 0.090 or more to 0.115 or less.

In this embodiment, the liquid-crystal media according to the invention have a positive dielectric anisotropy Δε, which preferably is in the range from 2.0 or more to 20 or less, more preferably to 15 or less, more preferably from 2.0 or more to 10 or less, particularly preferably from 2.0 or more to 9.0 or less and very particularly preferably from 2.5 or more to 8.0 or less.

The liquid-crystal media according to the invention preferably have relatively low values for the threshold voltage ($V_0$) in the range from 1.0 V or more to 5.0 V or less, preferably to 2.5 V or less, preferably from 1.2 V or more to 2.2 V or less, particularly preferably from 1.3 V or more to 2.0 V or less.

In addition, the liquid-crystal media according to the invention have high values for the VHR in liquid-crystal cells.

In general, liquid-crystal media having a low addressing voltage or threshold voltage here have a lower VHR than those having a higher addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

For the present invention, the following definitions apply in connection with the specification of the constituents of the compositions, unless indicated otherwise in individual cases:

- "comprise": the concentration of the constituents in question in the composition is preferably 5% or more, particularly preferably 10% or more, very particularly preferably 20% or more,
- "predominantly consist of": the concentration of the constituents in question in the composition is preferably 50% or more, particularly preferably 55% or more and very particularly preferably 60% or more,
- "essentially consist of": the concentration of the constituents in question in the composition is preferably 80% or more, particularly preferably 90% or more and very particularly preferably 95% or more, and
- "virtually completely consist of": the concentration of the constituents in question in the composition is preferably 98% or more, particularly preferably 99% or more and very particularly preferably 100.0%.

This applies both to the media as compositions with their constituents, which can be groups of compounds as well as individual compounds, and also to the groups of compounds with their respective constituents, the compounds. Only in relation to the concentration of an individual compound relative to the medium as a whole does the term comprise mean: the concentration of the compound or compounds in question is preferably 1% or more, particularly preferably 2% or more, very particularly preferably 4% or more.

For the present invention, "≤" means less than or equal to, preferably less than, and "≥" means greater than or equal to, preferably greater than.

For the Present Invention

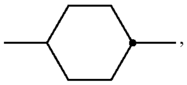
,
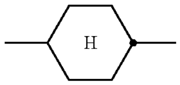
and
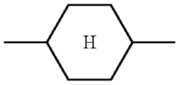

denote trans-1,4-cyclohexylene,

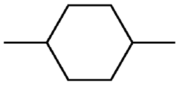

denotes a mixture of both cis- and trans-1,4-cyclohexylene and

and
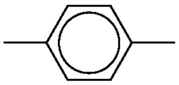

denote 1,4-phenylene.

Throughout this application 1,3-cyclopentenylene is a moiety selected from the group of the formulae

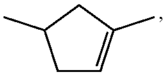
,
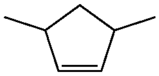
,
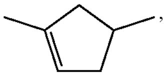
,
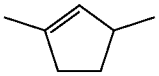
and
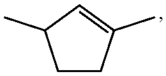
, preferably

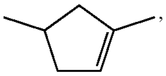
,
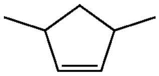
or
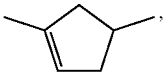
, most preferably

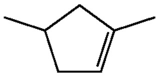
or
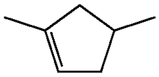
,

For the present invention, the expression "dielectrically positive compounds" means compounds having a Δε of >1.5, the expression "dielectrically neutral compounds" means compounds having −1.5≤Δε≤1.5 and the expression "dielectrically negative compounds" means compounds having Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroitic, e.g. dichroitic, dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the compounds used in lesser amount is dissolved in the compounds making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multi-bottle system".

The mixtures according to the invention exhibit very broad nematic phase ranges having clearing points of 65° C. or more, very favourable values for the capacitive threshold, relatively high values for the holding ratio and at the same time very good low-temperature stabilities at −30° C. and −40° C. Furthermore, the mixtures according to the invention are distinguished by low rotational viscosities $\gamma_1$.

It goes without saying to the person skilled in the art that the media according to the invention for use in VA, IPS, FFS or PALC displays may also comprise compounds in which, for example, H, N, O, Cl, F have been replaced by the corresponding isotopes.

The structure of the FFS liquid-crystal displays according to the invention corresponds to the usual geometry, as described, for example, in US 2002/0041354 A1.

The liquid-crystal phases according to the invention can be modified by means of suitable additives in such a way that they can be employed in any type of, for example, IPS and FFS LCD display that has been disclosed to date.

For the purposes of the present invention, all concentrations are, unless explicitly noted otherwise, indicated in percent by weight and relate to the corresponding mixture as a whole or mixture constituents, again a whole, unless explicitly indicated otherwise. In this context the term "the mixture" describes the liquid crystalline medium.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply for a temperature of 20° C., and Δn is determined at 436 nm, 589 nm and at 633 nm, and Δε at 1 kHz, unless explicitly indicated otherwise in each case.

The electro-optical properties, for example the threshold voltage ($V_0$) (capacitive measurement), are, as is the switching behaviour, determined in test cells produced at Merck Japan. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicularly to one another and effect homeotropic alignment of the liquid crystals. The surface area of the transparent, virtually square ITO electrodes is 1 $cm^2$.

Unless indicated otherwise, a chiral dopant is not added to the liquid-crystal mixtures used, but the latter are also particularly suitable for applications in which doping of this type is necessary.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 $mm^2 \cdot s^{-1}$, 14 $mm^2 \cdot s^{-1}$ and 27 $mm^2 \cdot s^{-1}$, respectively.

The dispersion of the materials may for practical purposes be conveniently characterized in the following way, which is used throughout this application unless explicitly stated otherwise. The values of the birefringence are determined at a temperature of 20° C. at several fixed wavelengths using a modified Abbe refractometer with homeotropically aligning surfaces on the sides of the prisms in contact with the material. The birefringence values are determined at the specific wavelength values of 436 nm (respective selected spectral line of a low pressure mercury lamp), 589 nm (sodium "D" line) and 633 nm (wavelength of a HE-Ne laser (used in combination with an attenuator/diffusor in order to prevent damage to the eyes of the observers. In the following table Δn is given at 589 nm and Δ(Δn) is given as Δ(Δn) =Δn(436 nm)−Δn(633 nm).

The following symbols are used, unless explicitly indicated otherwise:

| | |
|---|---|
| $V_0$ | threshold voltage, capacitive [V] at 20° C., |
| $n_e$ | extraordinary refractive index measured at 20° C. and 589 nm, |
| $n_o$ | ordinary refractive index measured at 20° C. and 589 nm, |
| Δn | optical anisotropy measured at 20° C. and 589 nm, |
| λ | wavelength λ [nm], |
| Δn(λ) | optical anisotropy measured at 20° C. and wavelength λ, |
| Δ(Δn) | change in optical anisotropy defined as: Δn(20° C., 436 nm) − Δn(20° C., 633 nm), |
| Δ(Δn*) | "relative change in optical anisotropy" defined as: Δ(Δn)/Δn(20° C., 589 nm), |
| $\varepsilon_\perp$ | dielectric susceptibility perpendicular to the director at 20° C. and 1 kHz, |
| $\varepsilon_\parallel$ | dielectric susceptibility parallel to the director at 20° C. and 1 kHz, |
| Δε | dielectric anisotropy at 20° C. and 1 kHz, |
| T(N, I) or clp. | clearing point [° C.], |
| ν | flow viscosity measured at 20° C. [$mm^2 \cdot s^{-1}$], |
| γ1 | rotational viscosity measured at 20° C. [mPa · s], |
| $K_{11}$ | elastic constant, "splay" deformation at 20° C. [pN], |
| $K_{22}$ | elastic constant, "twist" deformation at 20° C. [pN] ($K_{22} \approx 1/2\ K_{11}$), |
| $K_{33}$ | elastic constant, "bend" deformation at 20° C. [pN], |
| $K_{av.}$ | average eleastic constant at 20° C. [pN] defined here as $K_{av.} \equiv (3/2\ K_{11} + K_{33})/3 \approx (K_{11} + K_{22} + K_{33})/3$, |
| LTS | low-temperature stability of the phase, determined in test cells, |
| VHR | voltage holding ratio, |
| ΔVHR | decrease in the voltage holding ratio, and |
| $S_{rel}$ | relative stability of the VHR, |

However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group.

TABLE A

| Ring elements | |
|---|---|
| C | 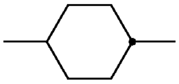 |
| D | 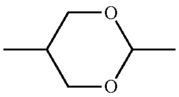 |

TABLE A-continued

| Ring elements | |
|---|---|
| A | 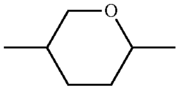 |
| P | 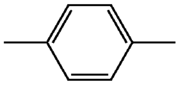 |
| G | 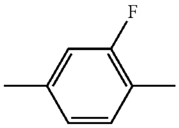 |
| U | 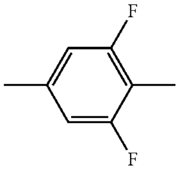 |
| Y | 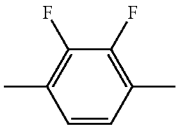 |
| P(F, Cl)Y | 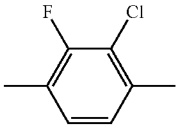 |
| DI | 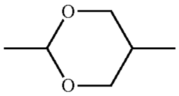 |
| AI | 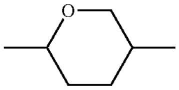 |
| GI | 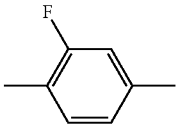 |
| UI | 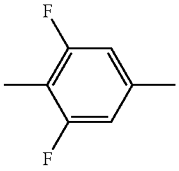 |
| P(Cl, F)Y | 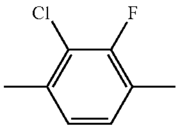 |

TABLE A-continued
| Ring elements | |
|---|---|
| np | 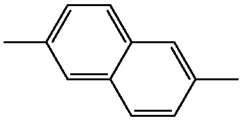 |
| n3f | 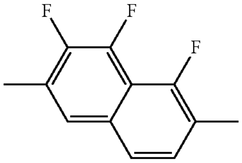 |
| th | 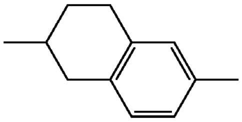 |
| tH2f | 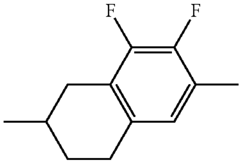 |
| o2f | 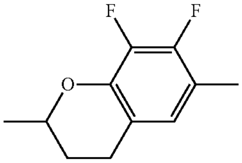 |
| dh | 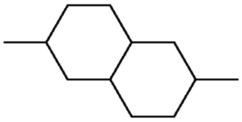 |
| B | 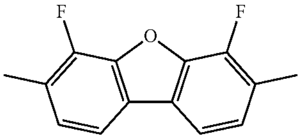 |
| O | 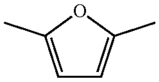 |
| K | 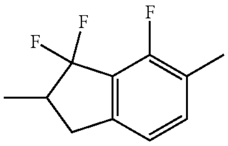 |
| L | 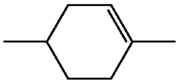 |
| nN3fl | 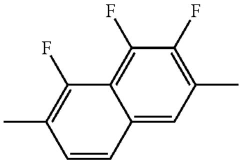 |
TABLE A-continued
| Ring elements | |
|---|---|
| thl | 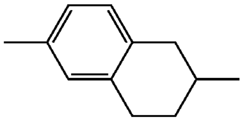 |
| tH2fl | 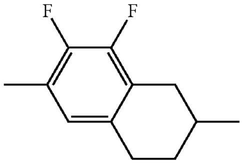 |
| o2fl | 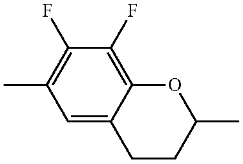 |
| nf | 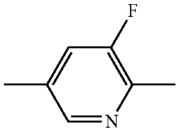 |
| S | 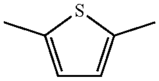 |
| Kl | 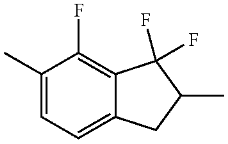 |
| Ll | 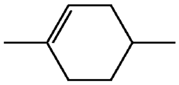 |
| F | 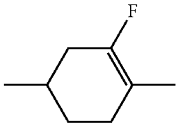 |
| Bh | 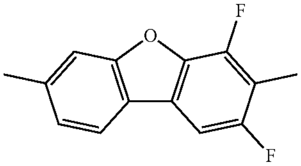 |
| Bf | 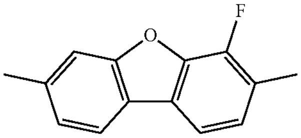 |

TABLE A-continued

| Ring elements | |
|---|---|
| Bfi | 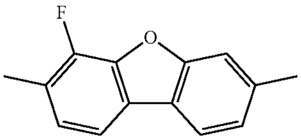 |
| Fl | 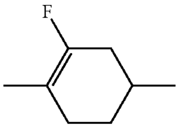 |
| Bh(S) | 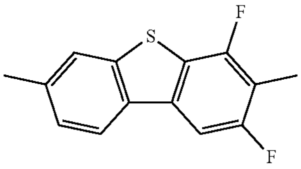 |
| Bf(S) | 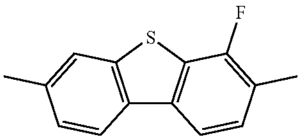 |

TABLE A-continued

| Ring elements | |
|---|---|
| Bfi(S) | 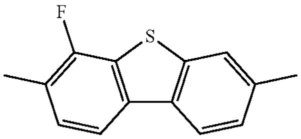 |

TABLE B

| Bridging units | | | |
|---|---|---|---|
| E | $—CH_2—CH_2—$ | | |
| V | —CH═CH— | | |
| T | —C≡C— | | |
| W | $—CF_2—CF_2—$ | | |
| B | —CF═CF— | | |
| Z | —CO—O— | ZI | —O—CO— |
| X | —CF═CH— | XI | —CH═CF— |
| O | $—CH_2—O—$ | OI | $—O—CH_2—$ |
| Q | $—CF_2—O—$ | QI | $—O—CF_2—$ |

TABLE C

| End groups | | | |
|---|---|---|---|
| On the left individually or in combination | | On the right individually or in combination | |
| -n- | $C_nH_{2n+1}—$ | -n | $—C_nH_{2n+1}$ |
| -nO— | $C_nH_{2n+1}—O—$ | —On | $—O—C_nH_{2n+1}$ |
| —V— | $CH_2$═CH— | —V | —CH═$CH_2$ |
| -nV— | $C_nH_{2n+1}$—CH═CH— | -nV | $—C_nH_{2n}$—CH═$CH_2$ |
| —Vn- | $CH_2$═CH—$C_nH_{2n}$— | —VN | —CH═CH—$C_nH_{2n+1}$ |
| -nVm- | $C_nH_{2n+1}$—CH═CH—$C_mH_{2m}$— | -nVm | —$C_nH_{2n}$—CH═CH—$C_mH_{2m+1}$ |
| —N— | N≡C— | —N | —C≡N |
| —S— | S═C═N— | —S | —N═C═S |
| —F— | F— | —F | —F |
| —CL— | Cl— | —CL | —Cl |
| —M— | $CFH_2—$ | —M | $—CFH_2$ |
| —D— | $CF_2H—$ | —D | $—CF_2H$ |
| —T— | $CF_3—$ | —T | $—CF_3$ |
| —MO— | $CFH_2O—$ | —OM | $—OCFH_2$ |
| —DO— | $CF_2HO—$ | —OD | $—OCF_2H$ |
| —TO— | $CF_3O—$ | —OT | $—OCF_3$ |
| —A— | H—C≡C— | —A | —C≡C—H |
| -nA— | $C_nH_{2n+1}$—C≡C— | —An | —C≡C—$C_nH_{2n+1}$ |
| —NA— | N≡C—C≡C— | —AN | —C≡C—C≡N |
| -cp- | cyclopentyl | -cp | cyclopentyl |
| -cpr- | cyclopropyl | -cpr | cyclopropyl |
| On the left only in combination | | On the right only in combination | |
| - . . . n . . . - | $—C_nH_{2n}—$ | - . . . n . . . | $—C_nH_{2n}—$ |
| - . . . M . . . - | —CFH— | - . . . M . . . | —CFH— |
| - . . . D . . . - | $—CF_2—$ | - . . . D . . . | $—CF_2—$ |
| - . . . V . . . - | —CH═CH— | - . . . V . . . | —CH═CH— |
| - . . . Z . . . - | —CO—O— | - . . . Z . . . | —CO—O— |
| - . . . Zl . . . - | —O—CO— | - . . . Zl . . . | —O—CO— |
| - . . . K . . . - | —CO— | - . . . K . . . | —CO— |
| - . . . W . . . - | —CF═CF— | - . . . W . . . | —CF═CF— |
| - . . . O . . . - | —O— | - . . . O . . . - | —O— |

in which n and m are each integers, and the three dots " . . . " are placeholders for other abbreviations from this table.

Besides the compounds of formula B, the mixtures according to the invention preferably comprise one or more compounds of the compounds mentioned below.

The following abbreviations are used:

(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "—Om" it preferably is 1, 2, 3 or 4, more preferably 2 or 4. The combination "-lVm" preferably is "2V1".)

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 22167885.7, filed Apr. 12, 2022, are incorporated by reference herein.

EXAMPLES

Utilized Stabilizers

S-1

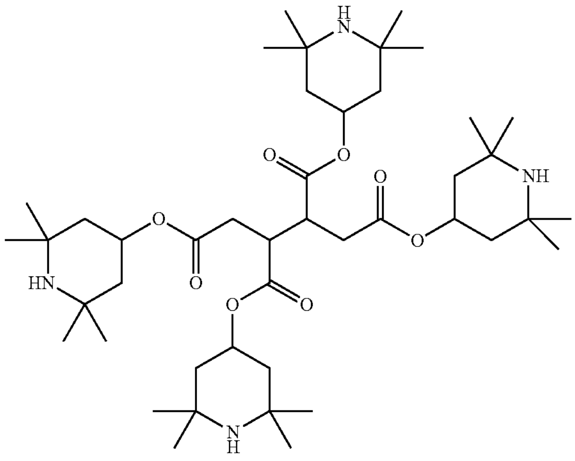

S-2

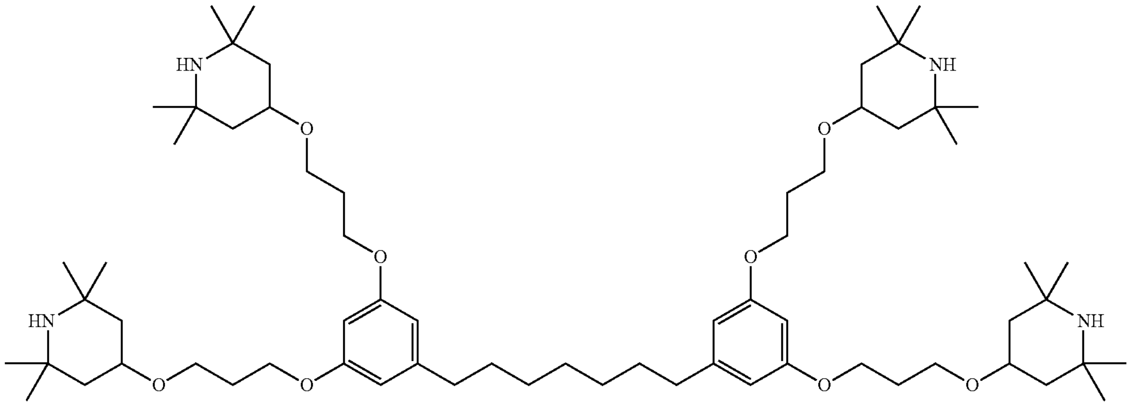

S-3

Tinuvin®770 (comparative)

Mixture Examples

For measuring the VHR the corresponding mixture is filled into electrooptic test cells which consist of two AF glass substrates with an approximately 20 nm thick ITO layer and a 100 nm thick polyimide layer.

The VHR is measured at 60° C. with application of a voltage of 1 V/60 Hz before and after the given time. The difference in VHR before and after stress is expressed according to:

$$\Delta VHR = VHR\ (\text{after stress}) - VHR\ (\text{initial})$$

Thermal stress usually causes the decrease of VHR in LC mixtures, therefore the smaller the absolute decrease of VHR value after stress, the better performance for display applications.

Host Mixture—H-1

The following mixture is prepared according to the following table:

| | | | |
|---|---|---|---|
| CP-5-3 | 20.0 | cl.p. [° C.]: | 74 |
| CC-3-5 | 10.0 | Δn [589 nm, 20° C.]: | 0.0730 |
| CCU-2-F | 12.0 | $n_e$ [589 nm, 20° C.]: | 1.5484 |
| CCU-3-F | 10.0 | $n_o$ [589 nm, 20° C.]: | 1.4754 |
| CCU-5-F | 8.0 | Δε [1 kHz, 20° C.]: | 5.4 |
| CCEG-3-F | 10.0 | $\varepsilon_{\parallel}$ [1 kHz, 20° C.]: | 8.6 |
| CCEG-5-F | 10.0 | $\varepsilon_{\perp}$ [1 kHz, 20° C.]: | 3.2 |
| CCG-3-OT | 10.0 | $K_1$ [pN, 20° C.]: | 12.6 |
| CCG-5-OT | 10.0 | $K_3$ [pN, 20° C.]: | 15.6 |
| Σ | 100.0 | $K_3/K_1$ [pN, 20° C.]: | 1.23 |
| | | $V_0$ [V, 20° C.]: | 1.62 |

and 10% w/w of PUS-3-2 according to the above-given acronym tables are added resulting in Host Mixture H-1

| Mixture | | Initial | After 1000 h |
|---|---|---|---|
| H-1 | ΔVHR/% | 95.1 | 19.5 |

Host Mixture—H-2

The following mixture is prepared according to the following table:

| | | | |
|---|---|---|---|
| CP-5-3 | 20.0 | cl.p. [° C.]: | 74 |
| CC-3-5 | 10.0 | Δn [589 nm, 20° C.]: | 0.0730 |
| CCU-2-F | 12.0 | $n_e$ [589 nm, 20° C.]: | 1.5484 |
| CCU-3-F | 10.0 | $n_o$ [589 nm, 20° C.]: | 1.4754 |
| CCU-5-F | 8.0 | Δε [1 kHz, 20° C.]: | 5.4 |
| CCEG-3-F | 10.0 | $\varepsilon_{\parallel}$ [1 kHz, 20° C.]: | 8.6 |
| CCEG-5-F | 10.0 | $\varepsilon_{\perp}$ [1 kHz, 20° C.]: | 3.2 |
| CCG-3-OT | 10.0 | $K_1$ [pN, 20° C.]: | 12.6 |
| CCG-5-OT | 10.0 | $K_3$ [pN, 20° C.]: | 15.6 |
| Σ | 100.0 | $K_3/K_1$ [pN, 20° C.]: | 1.23 |
| | | $V_0$ [V, 20° C.]: | 1.62 |

and 10% w/w of PUS-2-2 according to the above-given acronym tables are added resulting in Host Mixture H-2

Mixture M-1

To mixture H-1, 0.03% w/w of the stabilizer S-1 is added resulting in Mixture M-1

| Mixture | | Initial | After 1000 h |
|---|---|---|---|
| M-1 | ΔVHR/% | 73.5 | 82.4 |

Comparative Mixture CM-1

To mixture H-1, 0.03% w/w of Tinuvin®770 is added resulting in Comparative mixture CM-1 comparative to mixture M-1.

| Mixture | | Initial | After 1000 h |
|---|---|---|---|
| CM-1 | ΔVHR/% | 40.1 | 66.0 |

Mixture M-2

To mixture H-1, 0.1% w/w of S-1 is added resulting in Mixture M-2

| Mixture | | Initial | After 1000 h |
|---|---|---|---|
| M-2 | ΔVHR/% | 82.9 | 74.6 |

Mixture M-3

To mixture H-1, 0.1% w/w of S-2 is added resulting in Mixture M-4.

| Mixture | | Initial | After 1000 h |
|---|---|---|---|
| M-3 | ΔVHR/% | 78.9 | 83.8 |

Comparative Mixture CM-2

To mixture H-1, 0.1% w/w of Tinuvin®770 is added resulting in Comparative Mixture CM-2 comparative to mixture M-2 and M-3.

| Mixture | | Initial | After 1000 h |
|---|---|---|---|
| CM-2 | ΔVHR/% | 67.9 | 53.2 |

Mixture M-4

To mixture H-1, 10% w/w of mixture M-2 is added resulting in Mixture M-4

Mixture M-5

To mixture H-1, 10% w/w of mixture M-3 is added resulting in Mixture M-5

Comparative Mixture CM-3

To mixture H-1, 10% w/w of mixture CM-2 is added resulting in Comparative Mixture CM-3 comparative to mixture M-4 and M-5.

Mixture M-6

To mixture H-2, 0.1% w/w of S-1 is added resulting in Mixture M-6.

Mixture M-7

The following mixture is prepared according to the following table resulting in Mixture M-7

| | |
|---|---|
| CC-3-V | 47.0 |
| CC-3-V1 | 4.5 |
| CLP-3-T | 7.0 |
| PGP-1-2V | 5.5 |
| PGP-2-2V | 10.0 |
| PGU-2-F | 1.0 |
| PGUQU-3-F | 4.0 |
| PGUQU-4-F | 2.5 |

-continued

| | |
|---|---|
| PP-1-2V1 | 7.5 |
| PPGU-3-F | 0.99 |
| PUS-3-2 | 10.0 |
| S-1 | 0.01 |
| Σ | 100 |

Mixture M-8

The following mixture is prepared according to the following table resulting in Mixture M-8

| | |
|---|---|
| CC-3-V | 47.0 |
| CC-3-V1 | 4.5 |
| CLP-3-T | 7.0 |
| PGP-1-2V | 5.5 |
| PGP-2-2V | 10.0 |
| PGU-2-F | 1.0 |
| PGUQU-3-F | 4.0 |
| PGUQU-4-F | 2.5 |
| PP-1-2V1 | 7.5 |
| PPGU-3-F | 0.99 |
| PUS-3-2 | 10.0 |
| S-2 | 0.01 |
| Σ | 100 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An LC medium, comprising one or more compounds of the formula I-3-9 and/or I-3-10 in an amount of 1% to 40%,

I-3-9

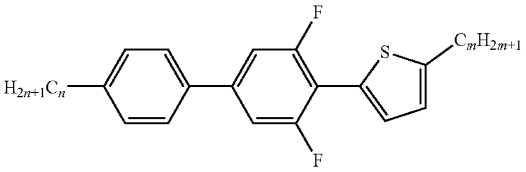

I-3-10

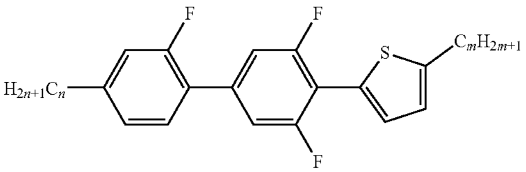

in which n and m independently from one another, denote an integer from 1 to 12;

and 100 ppm to 1,000 ppm of compound H-10

H-10

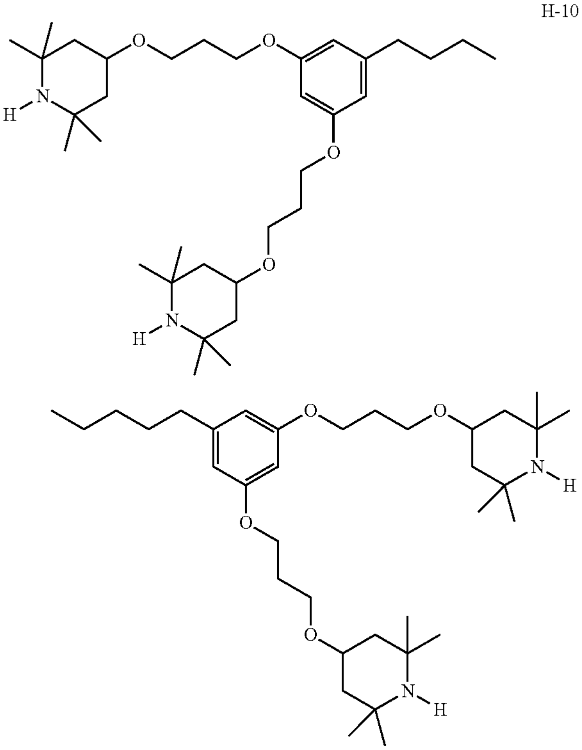

and one or more of the following compounds

III-1a

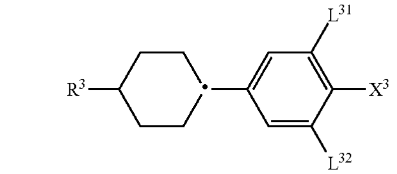

III-1b

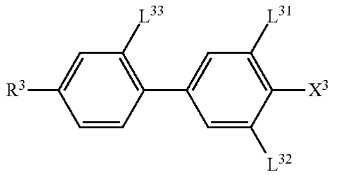

III-1e

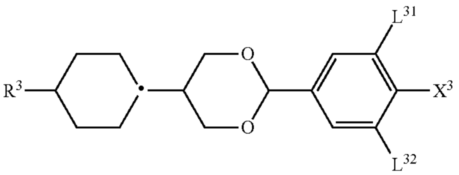

-continued

III-1f

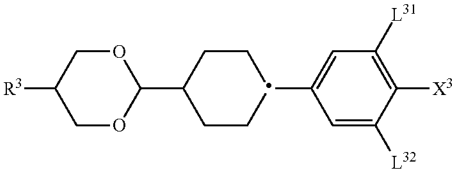

III-2

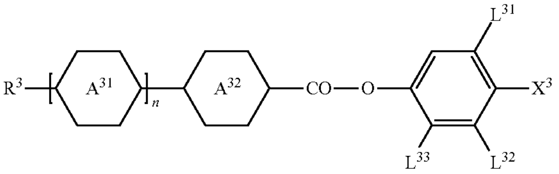

III-3

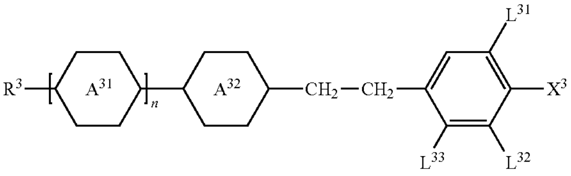

in which $R^3$ is an alkyl radical having 1 to 15 C atoms, wherein one or more $CH_2$ groups, including terminal C atoms, may each be replaced, independently of one another, by —C≡C—, —CH═CH—,

, 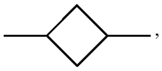, 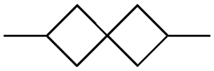, 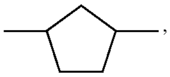,

—O—, —S—, —(CO)—O—, or —O—(CO)— in such a way that O or S atoms are not linked directly to one another, and in which one or more H atoms may be replaced by F or Cl, or H,

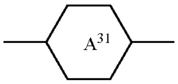 and 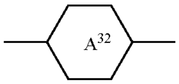

on each appearance, independently of one another, are

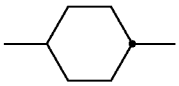, 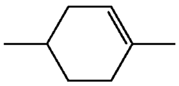, 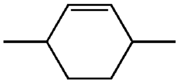, 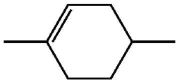, 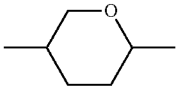, 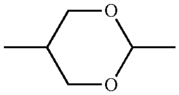,

-continued

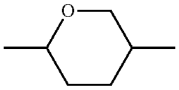, 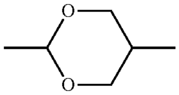, 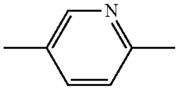, 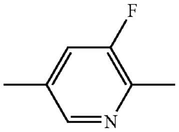, 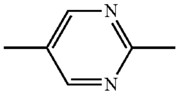, 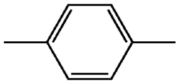, 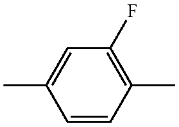, 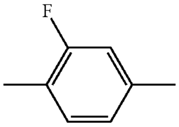, 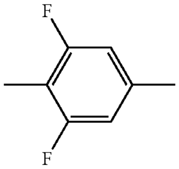 or 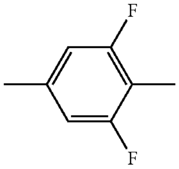, $L^{31}$ and $L^{32}$ independently of one another, denote H or F, $L^{33}$ is H or $CH_3$, $X^3$ denotes halogen, halogenated alkyl or alkoxy having 1 to 3 C atoms or halogenated alkenyl or alkenyloxy having 2 or 3 C atoms, and n denotes 0, 1, 2 or 3;

and wherein the LC medium has a positive dielectric anisotropy.

2. The LC medium according to claim 1, further comprising one or more compounds of the following formulae

I1

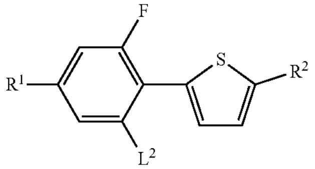

I2

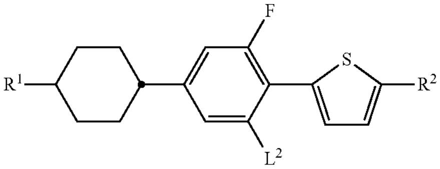

-continued

I4

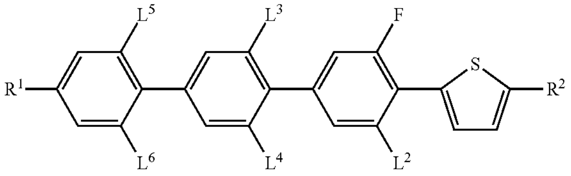

I5

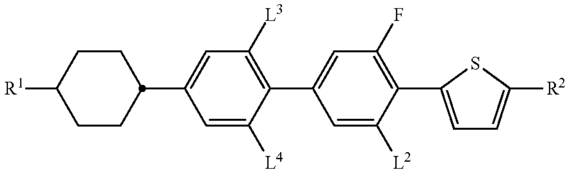

I6

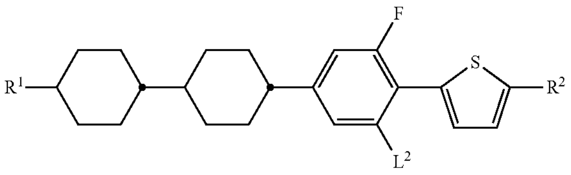

I7

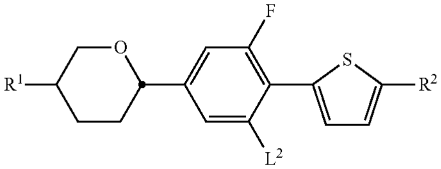

I8

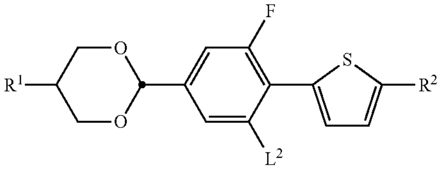

I9

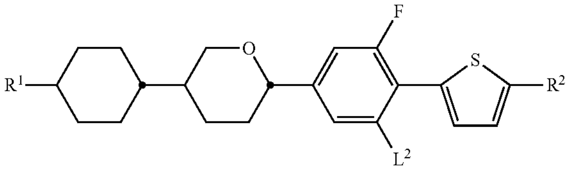

I10

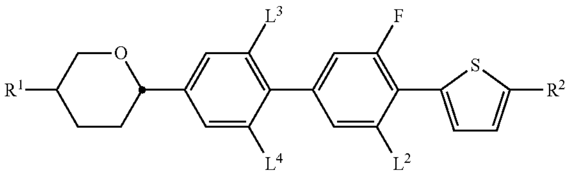

I11

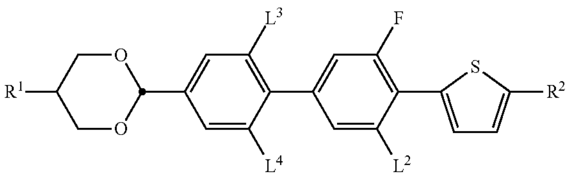

-continued

I12

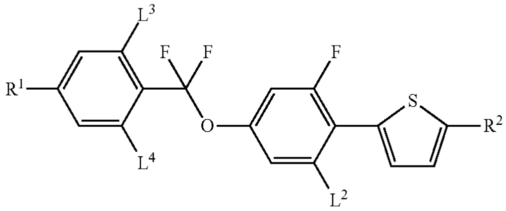

I13

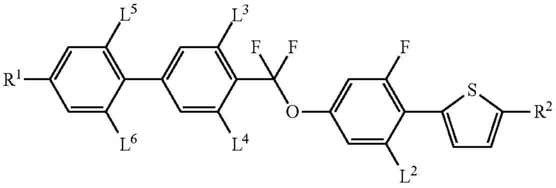

I14

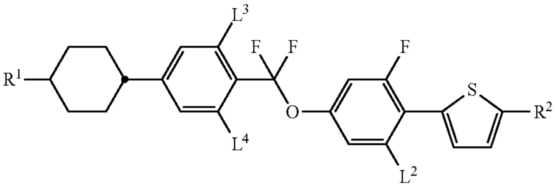

I15

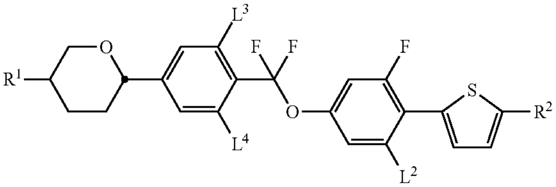

I16

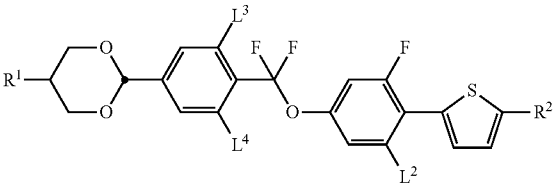

in which $R^1$ and $R^2$ denote, each independently, H, F, Cl, Br, —CN, —SCN, —NCS, $SF_5$ or a straight-chain alkyl having 1 to 12 C atoms or a branched alkyl having 3 to 12 C atoms, in which one or more non-adjacent $CH_2$ groups may each be replaced, independently of one another, by —CH═CH—, —C≡C—, —O—, —CO—, —CO—O—, —O—CO—, or —O—CO—O— in such a way that O atoms are not linked directly to one another, and in which one or more H atoms may be replaced by F, Cl or Br, and $L^2$ to $L^6$ each independently denotes H or F.

3. The LC medium according to claim 1, additionally comprising one or more compounds of formula II and/or III, from which the compounds of formulae III-1a, III-1b, III-1e, III-1f, III-2 and III-3 are excluded:

II

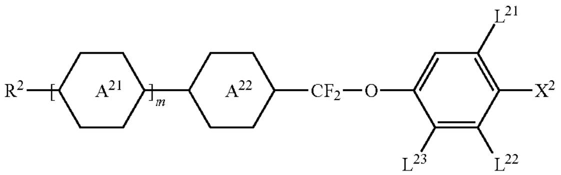

III

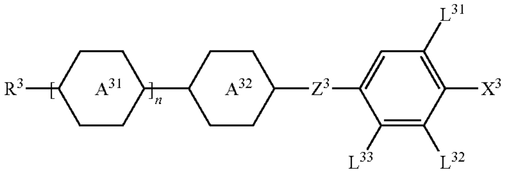

in which $R^2$ is an alkyl radical having 1 to 15 C atoms, wherein one or more $CH_2$ groups, including terminal C atoms, may each be replaced, independently of one another, by —C≡C—, —CH═CH—,

, 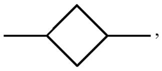, 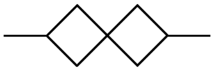,

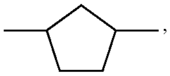,

—O—, —S—, —(CO)—O—, or —O—(CO)— in such a way that O or S atoms are not linked directly to one another, and in which one or more H atoms may be replaced by F or Cl, or H,

 and 

on each appearance, independently of one another, denote

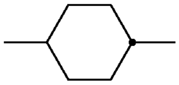, 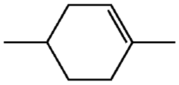,

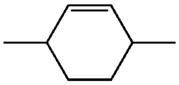, 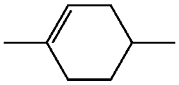,

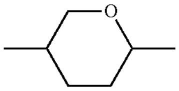, 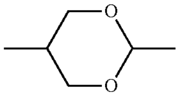,

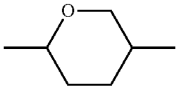, 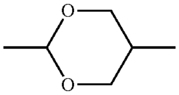,

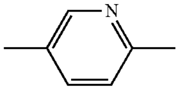,

-continued

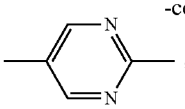, 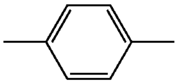,

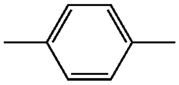,

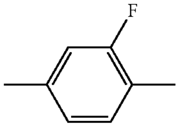, 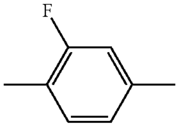,

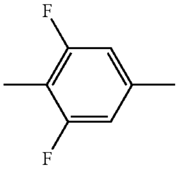 or 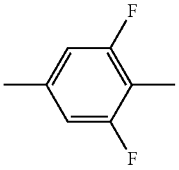, $L^{21}$ and $L^{22}$ denote H or F, $L^{23}$ is H or $CH_3$, $X^2$ denotes halogen, halogenated alkyl or alkoxy having 1 to 3 C atoms or halogenated alkenyl or alkenyloxy having 2 or 3 C atoms, m denotes 0, 1, 2 or 3, $R^3$ is an alkyl radical having 1 to 15 C atoms, wherein one or more $CH_2$ groups, including terminal C atoms, may each be replaced independently of one another, by —C≡C—, —CH═CH—,

, 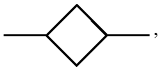, 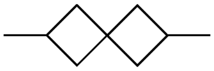,

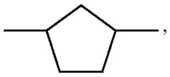,

—O—, —S—, —(CO)—O—, or —O—(CO)— in such a way that O or S atoms are not linked directly to one another, and in which one or more H atoms may be replaced by F or Cl, or H,

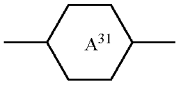 and 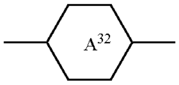

on each appearance, independently of one another, are

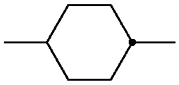, 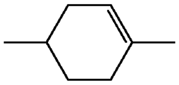,

, 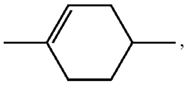,

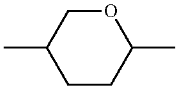, 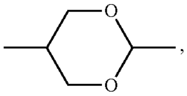,

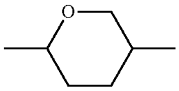, 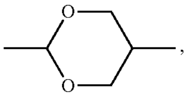,

-continued

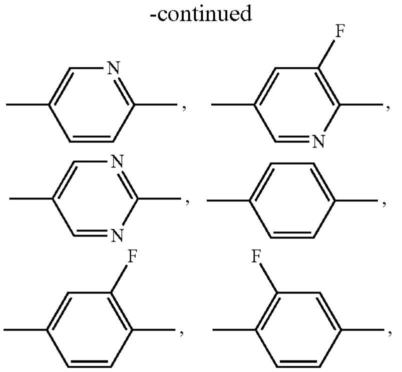

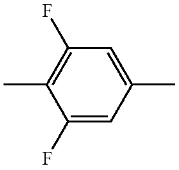

or

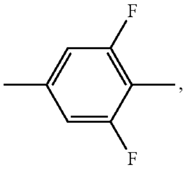

$L^{31}$ and $L^{32}$ independently of one another, denote H or F, $L^{33}$ is H or $CH_3$, $X^{31}$ denotes halogen, halogenated alkyl or alkoxy having 1 to 3 C atoms or halogenated alkenyl or alkenyloxy having 2 or 3 C atoms, $Z^3$ denotes $-CH_2CH_2-$, $-CF_2CF_2-$, $-COO-$, trans-$CH{=}CH-$, trans-$CF{=}CF-$, $-CH_2O-$ or a single bond, and n denotes 0, 1, 2 or 3.

4. The LC medium according to claim 1, additionally comprising one or more compounds of the following formulae,

IV

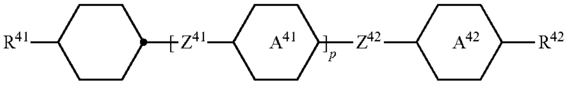

V

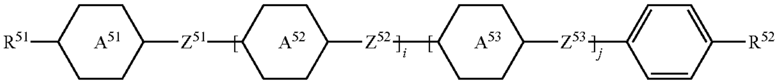

in which $R^{41}$ and $R^{42}$ each, independently of one another, is an alkyl radical having 1 to 15 C atoms, wherein one or more $CH_2$ groups, including terminal C atoms, may each be replaced, independently of one another, by $-C{\equiv}C-$, $-CH{=}CH-$,

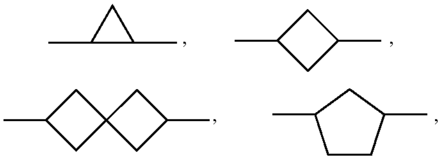

$-O-$, $-S-$, $-(CO)-O-$, or $-O-(CO)-$ in such a way that O or S atoms are not linked directly to one another, and in which one or more H atoms may be replaced by F or Cl, or H,

and

independently of one another and, if

occurs twice, also these independently of one another, denote

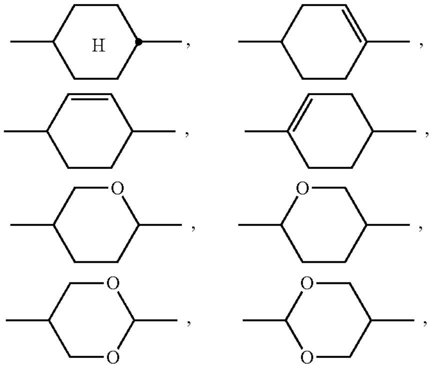

-continued

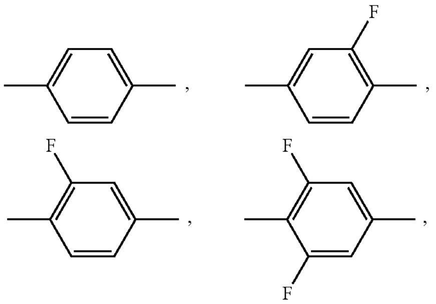

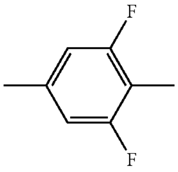

or

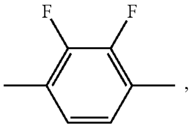

$Z^{41}$ and $Z^{42}$ each, independently of one another and, if $Z^{41}$ occurs twice, also these independently of one another, denotes —$CH_2CH_2$—, —COO—, trans-CH═CH—, trans-CF═CF—, —$CH_2O$—, —$CF_2O$—, —C≡C— or a single bond, p denotes 0, 1 or 2, and $R^{51}$ and $R^{52}$ each, independently of one another, is an alkyl radical having 1 to 15 C atoms, wherein one or more $CH_2$ groups, including terminal C atoms, may each be replaced, independently of one another, by —C≡C—, —CH═CH—,

, 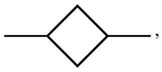, 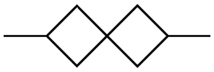, 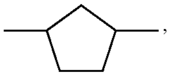,

—O—, —S—, —(CO)—O—, or —O—(CO)— in such a way that O or S atoms are not linked directly to one another, and in which one or more H atoms may be replaced by F or Cl, or H,

 to 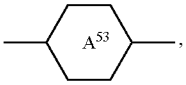, if present, each, independently of one another, denote

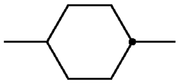, 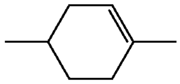,
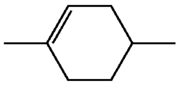, 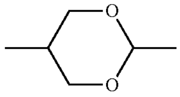,
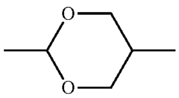, 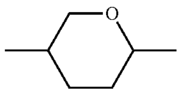,
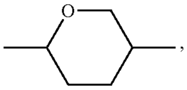, 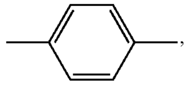,
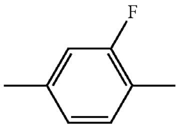 or 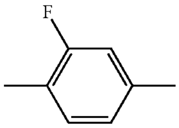, $Z^{51}$ to $Z^{53}$ each, independently of one another, denotes —$CH_2$—$CH_2$—, —$CH_2$—O—, —CH═CH—, —C≡C—, —COO— or a single bond, i and j each, independently of one another, denotes 0 or 1, (i+j) denotes 0, 1 or 2, wherein the rings optionally may each be substituted by one or two alkyl groups.

5. The LC medium according to claim 1, additionally comprising one or more compounds of the following formulae,

VI

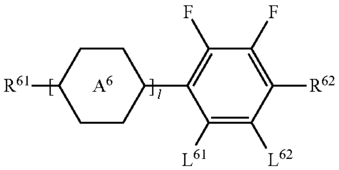

VII

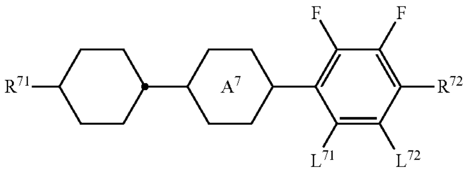

VIII

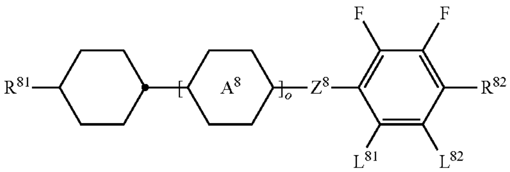

IX

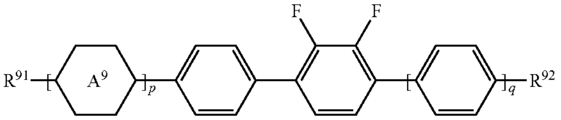

wherein $R^{61}$ denotes an unsubstituted alkyl radical having 1 to 7 C atoms, $R^{62}$ denotes an unsubstituted alkyl radical having 1 to 7 C atoms, an unsubstituted alkoxy radical having 1 to 6 C atoms, $C_{3-5}$-cycloalkyloxy or an unsubstituted alkenyloxy radical having 2 to 6 C atoms, $L^{61}$, $L^{62}$ are independently H or methyl, 1 denotes 0 or 1, $R^{71}$ denotes an unsubstituted alkyl radical having 1 to 7 C atoms, $R^{72}$ denotes an unsubstituted alkyl radical having 1 to 7 C atoms, $L^{71}$, $L^{72}$ are independently H or methyl,

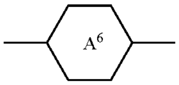 and 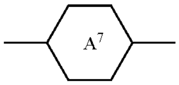

independently denote

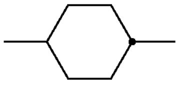, 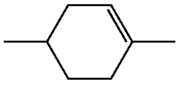 or
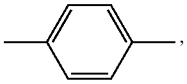, $R^{81}$ denotes an unsubstituted alkyl radical having 1 to 7 C atoms, or an unsubstituted alkoxy radical having 1 to 6 C atoms, $R^{82}$ denotes an unsubstituted alkyl radical having 1 to 7 C atoms, or an unsubstituted alkoxy radical having 1 to 6 C atoms, $L^{81}$, $L^{82}$ are independently H or methyl,

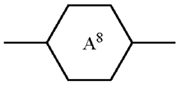

denotes

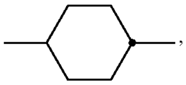, 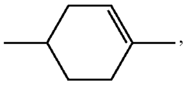, or

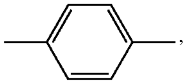, $Z^8$ denotes —(C═O)—O—, —$CH_2$—O—, —$CF_2$—O— or —$CH_2$—$CH_2$—, denotes 0 or 1, $R^{91}$ and $R^{92}$ independently of one another denote an unsubstituted alkyl radical having 1 to 7 C atoms, $R^{91}$ denotes an alkyl radical having 2 to 5 C atoms, $R^{92}$ denotes an alkyl or alkoxy radical having 2 to 5 C atoms, or an alkenyloxy radical having 2 to 4 C atoms,

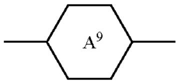

denotes

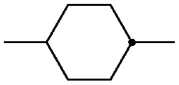 or 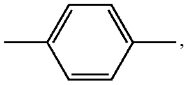, p and q independently of each other denote 0 or 1.

6. The LC medium according to claim 1, further comprising one or more compounds of formula IVa IVa

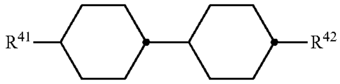

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms, an unsubstituted alkenyl radical having 2 to 7 C atoms, or an unsubstituted alkoxy radical having 1 to 6 C atoms.

7. The LC medium according to claim 1, wherein the total concentration of the one or more compounds of formula I-3-9 and/or I-3-10 in the medium as a whole is 1% to 25%.

8. The LC medium according to claim 1, wherein the total concentration of the compound of formula H-10 in the LC medium is 1,000 ppm.

9. An electro-optical device comprising an LC display comprising an LC medium according to claim 1.

10. An LC display containing the LC medium according to claim 1.

11. The display according to claim 10, which is based on an IPS or FFS effect.

12. A process for preparing the LC medium according to claim 1, comprising mixing one or more compounds of formula I-3-9 and/or I-3-10 with the compound of formula H-10 and with one or more compounds of formula III-1a, III-1b, III-1e, III-1f, III-2 and/or III-3.

13. The LC medium according to claim 1, wherein the total concentration of the one or more compounds of formula I-3-9 and/or I-3-10 in the medium as a whole is 5% to 25%.

14. The LC medium according to claim 1, which has a positive dielectric anisotropy of 2.0 to 20.

15. The LC medium according to claim 1, which comprises one or more compounds of formulae

I-3-9-1

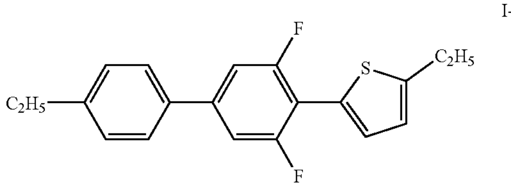

I-3-9-2

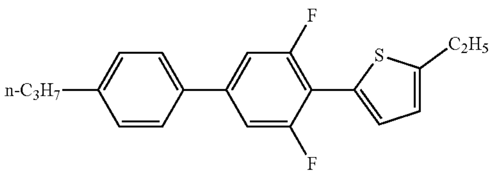

I-3-9-3

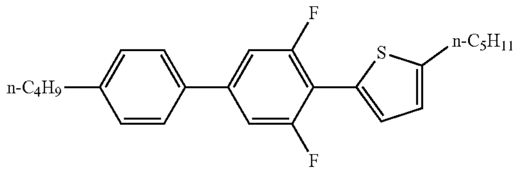

I-3-9-4

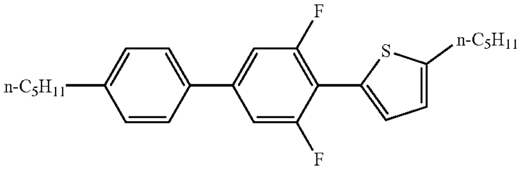

I-3-9-5

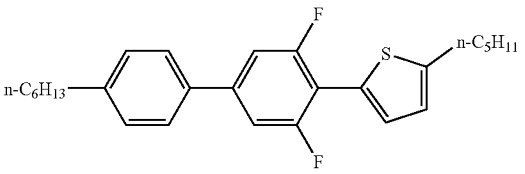

I-3-9-6

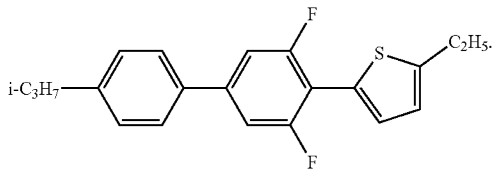

* * * * *